United States Patent
Shapiro

(10) Patent No.: US 12,347,330 B2
(45) Date of Patent: Jul. 1, 2025

(54) MUSIC THEORY TEACHING METHOD AND SYSTEM

(71) Applicant: AYOU, LLC, Old Bethpage, NY (US)

(72) Inventor: Akiva Shapiro, Old Bethpage, NY (US)

(73) Assignee: AYOU, LLC, Old Bethpage, NY (US)

( * ) Notice: Subject to any disclaimer, the term of this patent is extended or adjusted under 35 U.S.C. 154(b) by 0 days.

(21) Appl. No.: 18/793,446

(22) Filed: Aug. 2, 2024

(65) Prior Publication Data
US 2025/0046210 A1    Feb. 6, 2025

Related U.S. Application Data

(60) Provisional application No. 63/530,569, filed on Aug. 3, 2023.

(51) Int. Cl.
G09B 15/00 (2006.01)

(52) U.S. Cl.
CPC .................................. G09B 15/004 (2013.01)

(58) Field of Classification Search
CPC .................................................... G09B 15/004
See application file for complete search history.

(56) References Cited

U.S. PATENT DOCUMENTS

| | | | | |
|---|---|---|---|---|
| 8,455,747 | B2 * | 6/2013 | Lozano, Jr. | G09B 15/00 84/474 |
| 9,076,346 | B2 * | 7/2015 | Quattrocchi | G09B 15/002 |
| 11,551,649 | B2 * | 1/2023 | Collings | G09B 15/009 |
| 2024/0395164 | A1 * | 11/2024 | George | G09B 15/007 |
| 2025/0046210 | A1 * | 2/2025 | Shapiro | G09B 15/004 |

OTHER PUBLICATIONS

Jensen, Music Theory Worksheets, The Circle of Fifths. © 2013 EarTrainingandInprov.com. viewed at https://www.myfunpianostudio.com/music-theory/circle-of-fifths-worksheet/ (Year: 2013).*
Fretboardia, Blank fretboard charts, Apr. 3, 2020, viewed at https://fretboardia.com/blank-guitar-fretboard-charts/ (Year: 2020).*
International Search Report in counterpart International Application No. PCT/US2024/040798, dated Oct. 1, 2024.
Written Opinion in counterpart International Application No. PCT/US2024/040798, dated Oct. 1, 2024.

* cited by examiner

Primary Examiner — Robert W Horn
(74) Attorney, Agent, or Firm — Greenblum & Bernstein, P.L.C.

(57) ABSTRACT

A system for teaching music theory. The system includes a music theory teaching methodology worksheet having: a starting section; a note teaching section; and a circle of fifths chart. Each of the starting section, the note teaching section, and the circle of fifths chart comprise fillable fields that are fillable by a user of the worksheet.

28 Claims, 72 Drawing Sheets

Expanding the Theory to Other Guitar Finger Shapes which require more than one finger

Fig. 63

MUSIC THEORY TEACHING METHOD AND SYSTEM

CROSS REFERENCE TO RELATED APPLICATION

The present application claims the benefit of U.S. Provisional Application No. 63/530,569, filed Aug. 3, 2023, the contents of which are expressly incorporated herein by reference in its entirety.

BACKGROUND OF THE DISCLOSURE

1. Field of the Disclosure

The present disclosure relates to a teaching system and method, and more specifically relates to a method and system for teaching music theory, and to a method and system for applying the teaching music theory methodology to learn how to play the guitar with one finger.

2. Background of the Disclosure

Research has established that studying music enhances academic achievement including areas of mathematics, science, geography, history, foreign language, physical education, and vocational training. Studies have shown that students with piano or keyboard experience performed 34% higher on tests that measure spatial-temporal lobe activity, which is the part of the brain that is used when doing mathematics, science, and engineering.

Studies have shown that music education can be used to enhance cognitive achievement in students. When a student is singing a melody with text, they are using multiple areas of their brain to multitask. Music positively impacts language development, increases IQ, spatial-temporal skills, and improves test scores. For example, music education has also been noted to have the ability to increase someone's overall IQ, especially in children during peak development years. Spatial ability, verbal memory, reading and mathematical ability are seen to be increased alongside music education (primarily through the learning of an instrument). Researchers also note that a correlation between general attendance and IQ increases is evident, and due to students' involvement in music education, general attendance rates increase along with their IQ. Fine motor skills, social behaviors, and emotional well-being can also be increased through music and music education. The learning of an instrument, such as guitar, increases fine motor skills in students with physical disabilities. Emotional well-being can be increased as students find meaning in songs and connect them to their everyday life. Through social interactions of playing in groups like jazz and concert bands, students learn to socialize, and this can be linked to emotional and mental well-being.

Thus, the benefits of incorporating music, and specifically music making, on a person's well-being is well established. While these benefits of music making are clear, there are still many individuals who never learn or attempt to learn how to make music. For example, many individuals never learn or attempt to learn music theory. Additionally, many individuals may deem aspects of music theory to be too difficult to understand and thus, may find learning about music theory unappealing and/or unapproachable.

Also, for similar reasons, many individuals never learn or attempt to learn a musical instrument, such as guitar. For example, learning to play a new musical instrument, such as a piano or a guitar, can be intimidating and an imposing task. With a guitar, for example, it can usually take many months of daily practice to progress enough to actually produce musical tones. Additionally, with guitars and pianos, for example, a player may learn different fingerings for the different chords, and may need to achieve the dexterity to move quickly between the different fingerings to achieve the desired chord changes. In other words, with a musical instrument, it usually takes significant time for a user to learn how to play the instrument in order to actually make music.

Due to such impediments, many people never attempt to learn music theory or never attempt to play a musical instrument. Other people may begin to learn music theory and learn to play a musical instrument, but give up their endeavor before achieving sufficient comprehension of music theory and/or proficiency with the musical instrument. As such, many people never experience or maintain the benefits of music making on their well-being.

Thus, there is a need for an improved method and system for teaching music theory, and an improved method and system for teaching music theory on a guitar that enables beginner players to quickly play major and minor chords, in order to provide new creative avenues for beginner and experienced musicians alike.

SUMMARY OF THE EMBODIMENTS OF THE DISCLOSURE

Aspects of the disclosure are directed to a system for teaching music theory. The system includes a music theory teaching methodology worksheet having: a starting section; a note teaching section; and a circle of fifths chart. Each of the starting section, the note teaching section, and the circle of fifths chart comprise fillable fields that are fillable by a user of the worksheet.

In embodiments, the starting section is an "F Chord" section.

In further embodiments, the note teaching section teaches notes of a Western music system.

In additional embodiments, the system further comprises guidance instructions for a user to fill in the fillable fields.

In yet further embodiments, the system further comprises a graphical user interface, wherein the worksheet is provided on the graphical user interface.

In embodiments, the starting section comprises four fillable fields in a single row with an additional fillable field above the right-most fillable field of the single row forming a column.

In further embodiments, fillable fields of the column have a distinguishing feature from a remainder of the fillable fields of the starting section.

In additional embodiments, the starting section further comprises numerical note notation labels identifying a first, a third, and a fifth.

In yet further embodiments, the note teaching section comprises: a 14-note row with fourteen fillable fields; and a 12-note row with twelve fillable fields.

In embodiments, a fourth fillable field and a tenth fillable field of the 14-note row have a distinguishing feature from a remainder of the fillable fields of the 14-note row.

In further embodiments, the note teaching section further comprises guidance information for at least one of the fillable fields to assist a user in completing the worksheet.

In additional embodiments, the note teaching section further comprises a half-step marker and a whole-step marker.

In yet further embodiments, the circle of fifths chart comprises twelve chord sections circumferentially-arranged, with each chord section including a root note fillable field, a major notes section having three fillable fields, and a relative minor notes section having three fillable fields.

In embodiments, the circle of fifths chart further comprises a chords-in-key identifier, which identifies three adjacent chord sections as a group of chords that are in a particular key.

In further embodiments, the chords-in-key identifier is selectively positionable around the circle of fifths chart.

Additional aspects of the disclosure are directed to a system for applying a music theory methodology to teaching how to play a guitar with one finger. The system includes a music theory teaching methodology worksheet. The worksheet includes a fretboard/scale visual aid operable to show relations between a fretboard of a guitar and a 12-note chromatic scale. The fretboard/scale visual aid includes: a fret/note correlation chart; and a guitar fretboard display having a displayed guitar. The fret/note correlation chart comprises fillable fields that are fillable by a user of the worksheet.

In embodiments, the fret/note correlation chart comprises at least one note row, which includes all of the notes of the 12-note chromatic scale (and then repeats the first note) for a particular guitar string.

In further embodiments, the fret/note correlation chart further comprises a fret row, which includes a numerical indicator of a fret of the guitar.

In additional embodiments, the fret/note correlation chart further comprises a half-step marker and a whole-step marker.

In yet further embodiments, the fretboard/scale visual aid further comprises a portion of a circle of fifths chart.

In embodiments, the guitar fretboard display further comprises at least one of a minor chord shape and a major chord shape overlaid on three strings of the displayed guitar showing how minor chords and major chords may be played on the guitar with one finger.

In further embodiments, the fret/note correlation chart further comprises a wing region and 1-2-3 region row, which identify wings and notes thereof and identifies notes of the 1-2-3 region, respectively.

In additional embodiments, the fretboard/scale visual aid further includes a wings/1-2-3 range visualization, which depicts a wings region that encompasses the wings and depicts the 1-2-3 region.

In yet further embodiments, notes identified by each wing are three frets apart from each other.

In embodiments, the wings are spaced apart from each other by one fret.

In further embodiments, notes of the 1-2-3 region include a first note, a second note, and a third note, wherein a single fret is skipped between the first note and the second note, and a single fret is skipped between the second note and third note.

Further aspects of the disclosure are directed to a method for teaching music theory. The method includes providing a music theory teaching methodology worksheet having: a starting section; a note teaching section; and a circle of fifths chart. Each of the starting section, the note teaching section, and the circle of fifths chart comprise fillable fields that are fillable by a user of the worksheet. The method further includes guiding a user to fill in the fillable fields of the music theory teaching methodology worksheet.

In embodiments, the starting section comprises four fillable fields in a single row with an additional fillable field above the right-most fillable field of the single row forming a column.

In further embodiments, the note teaching section comprises: a 14-note row with fourteen fillable fields; and a 12-note row with twelve fillable fields.

In additional embodiments, the circle of fifths chart comprises twelve chord sections circumferentially-arranged, with each chord section including a root note fillable field, a major notes section having three fillable fields, and a relative minor notes section having three fillable fields.

Implementing aspects of the disclosure provides an improved method and system for teaching music theory and an improved method and system for teaching music theory on guitar that does not pose impediments (e.g., extensive knowledge and/or physical dexterity) to immediate musical satisfaction. For example, in contrast to learning to play a piano or a guitar, where it can usually take many months of daily practice to progress enough to actually produce musical tones, and where a player must both learn different fingerings for the different chords and achieve the dexterity to move quickly between the different fingerings to achieve the desired chord changes, with embodiments of the present disclosure, a method and system for teaching music theory and an improved method and system for teaching music theory on guitar is provided in which neither extensive knowledge of chord fingerings nor dexterity are necessary to achieve immediate musical satisfaction. In other words, with method and system for teaching music theory of the present disclosure, it does not take significant time for a user to learn how to play the instrument in order to actually make music, thus providing new creative avenues for beginner and experienced musicians alike.

Embodiments of the disclosure are operable to teach basic music theory that teaches all the chords, the notes of each chord, major/minor and relative minor relationships, and circle of fifths in a single session of, for example thirty to forty-five minutes. Implementing aspects of the disclosure allow a user to go from zero to sixty in record time and achieve greater comprehension than traditional music theory teaching methods.

As such, by implementing aspects of the disclosure, many more people may more readily access music theory comprehension, more readily develop an understanding of music theory, and more readily experience playing music, and thereby experience the resulting benefits of music making on their well-being.

BRIEF DESCRIPTION OF THE DRAWINGS

The novel features which are characteristic of the musical instrument, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein:

FIG. 63 shows additional exemplary processes for major chords (e.g., using a multi-finger chord shape) in accordance with aspects of the disclosure;

DETAILED DESCRIPTION OF THE EMBODIMENTS OF THE DISCLOSURE

Figure 1:
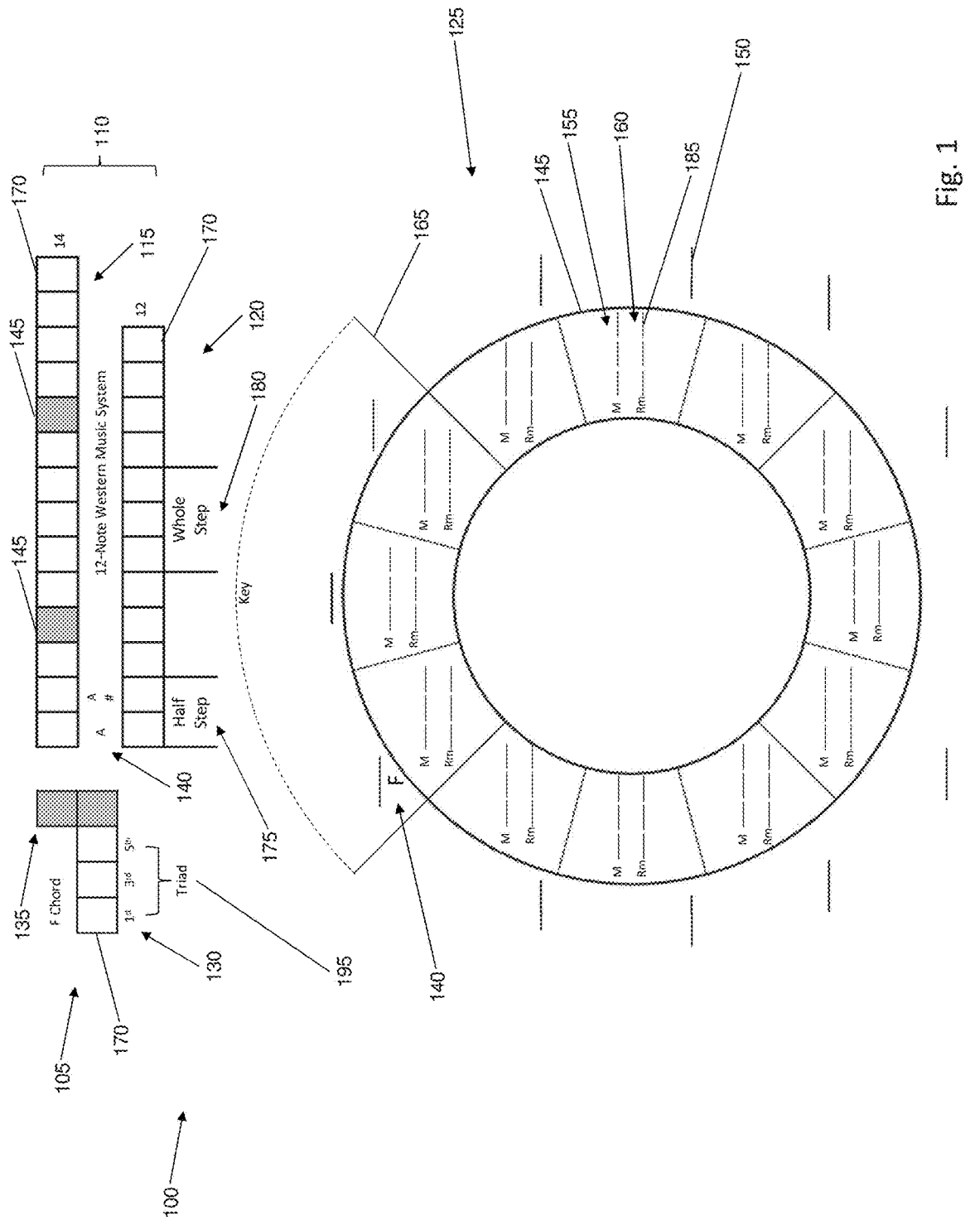
FIG. 1 shows an exemplary depiction of a music theory beginner teaching methodology worksheet based on the circle of fifths in accordance with aspects of the disclosure.

The novel features which are characteristic of the disclosure, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the embodiments of the present disclosure. In this regard, no attempt is made to show structural details of the embodiments of the present disclosure in more detail than is necessary for the fundamental understanding of the embodiments of the present disclosure, such that the description, taken with the drawings, making apparent to those skilled in the art how the forms of the embodiments of the present disclosure may be embodied in practice.

As used herein, the singular forms "a," "an," and "the" include the plural reference unless the context clearly dictates otherwise. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e., the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly, "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

A chord, in music, is any harmonic set of pitches/frequencies comprising multiple notes (also called "pitches") that are heard as if sounding simultaneously. For many practical and theoretical purposes, arpeggios and broken chords (in which the notes of the chord are sounded one after the other, rather than simultaneously), or sequences of chord tones, may also be considered as chords in the right musical context.

In tonal Western classical music (music with a tonic key or "home key"), the most frequently encountered chords are triads, so called because they consist of three distinct notes: the root note, and intervals of a third and a fifth above the root note. Chords with more than three notes include added tone chords, extended chords and tone clusters, which are used in contemporary classical music, jazz and almost any other music genre.

The chromatic scale (or twelve-tone scale) is a set of twelve pitches used in tonal music, with notes separated by the interval of a semitone. The chromatic scale is a musical scale with twelve pitches, each a semitone (or half-step), above or below its adjacent pitches. As a result, in 12-tone equal temperament (the most common tuning in Western music), the chromatic scale covers all 12 of the available pitches, namely:

A-A #/Bb-B-C-C #/Db-D-D #/Eb-E-F-F #/Gb-G-G #/Ab
Thus, there is only one chromatic scale. As a result, the notes of an equal-tempered chromatic scale are equally-spaced.

Almost all western musical instruments, such as the piano and most fretted instruments, are made to produce the chromatic scale. (Other instruments capable of continuously variable pitch, such as the trombone and violin (and other fretless instruments), can also produce microtones, or notes between those available on a piano or a fretted guitar.) Most music uses subsets of the chromatic scale such as diatonic scales. While the chromatic scale is fundamental in western music theory, it is seldom directly used in its entirety in musical compositions or improvisation.

FIG. 1 shows an exemplary depiction of a music theory beginner teaching methodology worksheet 100 based on the circle of fifths in accordance with aspects of the disclosure. As shown in FIG. 1, the worksheet 100 includes an "F Chord" section 105, a Western music system note teaching section (or note teaching section) 110, and a circle of fifths chart 125.

In embodiments, the worksheet 100 may be a piece of paper that is manually filled in by a user (e.g., with a pen or pencil). In other contemplated embodiments, the worksheet 100 may be rendered as a virtual worksheet on a touch screen, wherein the user may virtually fill in the virtual worksheet. In use, a user may fill in (or complete) the different sections of the worksheet 100 to gain an increased understanding of musical theory, in accordance with aspects of the disclosure.

As shown in FIG. 1, the F Chord section 105 includes four fillable fields (or boxes) 170 in a single row with an additional fillable field (or box) above the right-most fillable field (or box) of the single row. The F Chord section 105 also includes numerical note notation labels 130 (e.g., "$1^{st}$," "$3^{rd}$," and "$5^{th}$") for the three left-most fillable fields (or boxes) 170 of the single row. As shown in FIG. 1, the numerical note notation labels 130 include a triad identifier 195 As shown in FIG. 1, the two right-most fillable fields (or boxes) form a column 135 may have a distinguishing feature (e.g., different color or shading) from the remaining fillable fields (or boxes) 170 of the F Chord section 105.

As shown in FIG. 1, the note teaching section 110 includes a 14-note row 115 with fourteen fillable fields (or boxes) 170 and a 12-note row 120 with twelve fillable fields (or boxes) 170. As shown in FIG. 1, the fourth and the tenth fillable fields (or boxes) 145 may have a distinguishing feature (e.g., different color or shading) from the remaining fillable fields (or boxes) of the 14-note row 115. As shown in the exemplary embodiment of FIG. 1, the note teaching section 110 may include guidance information 140 (e.g., "A" and "A #") for one or more of the fillable fields (or boxes) 170 to assist a user in completing the worksheet 100. The 12-note row 120 includes a "half step" marker 175 and a "whole step" marker 180.

As shown in FIG. 1, the circle of fifths chart 125 includes twelve chord sections 145 circumferentially-arranged. Each chord section 145 includes a root note fillable field 150, a major notes section 155 having three fillable fields 185, and a relative minor notes section 160 having three fillable fields 185. As shown in the exemplary embodiment of FIG. 1, the note teaching section 110 may include guidance information 140 (e.g., "F") for one or more of the root note fillable fields 150. The circle of fifths chart 125 also includes a chords-in-key identifier 165, which identifies three adjacent chord sections 145 as a group of chords that are in a particular key.

Figure 2:
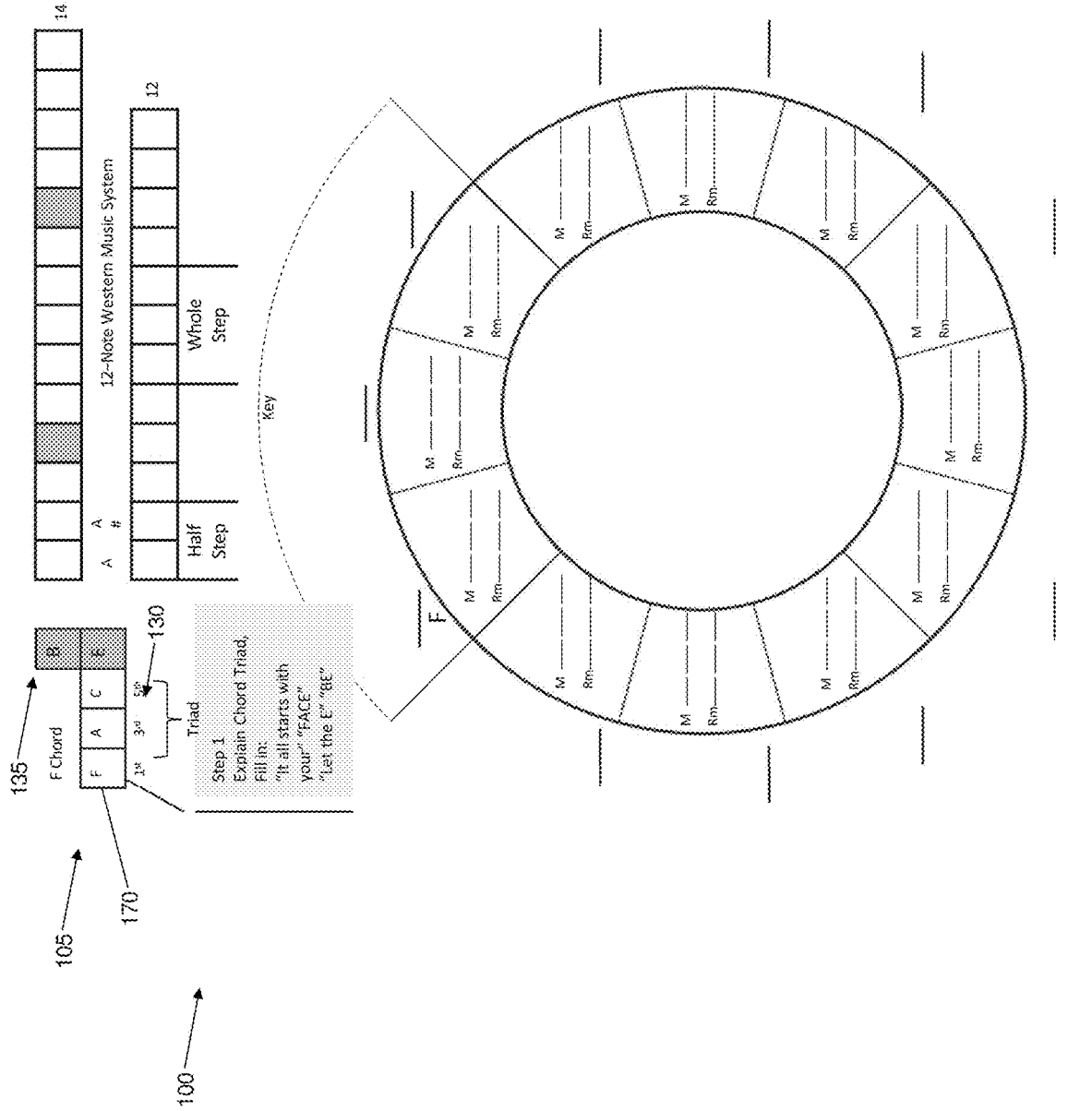
FIGS. 2-13 show exemplary depictions of proceeding through (or filing in) the music theory beginner teaching methodology worksheet in accordance with aspects of the disclosure.

FIGS. 2-13 show exemplary depictions of proceeding through (or filing in) the music theory beginner teaching methodology worksheet 100 in accordance with aspects of the disclosure. As shown in FIG. 2, the process commences with a user filling in the F Chord section 105. Initially, the user is provided with two mnemonic devices for filing in the F Chord section 105. For example, a teacher could provide the user with the two mnemonic devices. In other contemplated embodiments, a computer having a touch-screen may be configured to provide the user the two mnemonic devices (e.g., audibly and/or textually).

As shown in FIG. 2, the first mnemonic device may be "It all starts with your FACE" and the second mnemonic device may be "Let the E. . . . BE." Utilizing the first mnemonic device, the user may fill in the four fillable fields (or boxes) 170 of the single row with the letters F, A, C, and E (to form the word "FACE"). Then, utilizing the second mnemonic device, the user can complete the column 135 (forming the word "BE") by filing in the upper fillable field (or box) thereof with the letter B. As shown in FIG. 2, the word "BE" is in the fillable fields (or boxes) having the distinguishing feature (e.g., different color or shading) from the remaining fillable fields (or boxes) of the F Chord section 105.

Once the F Chord section 105 is filled in, the numerical note notation labels 130 (e.g., "$1^{st}$," "$3^{rd}$," and "$5^{th}$") for the three left-most fillable fields (or boxes) respectively correspond with the "F", the "A," and the "C" of the now-filled fields (or boxes) 170. In accordance with aspects of the disclosure, the F Chord section 105 may be used to teach a user about the notes of an F major chord triad. That is, the F Chord section 105 (once filled in) provides the user a visual indicator that the F note is the $1^{st}$ (or root note) of the F chord, the A note is the $3^{rd}$ of the F chord, and the C note is the $5^{th}$ of the F chord. In such a manner, in accordance with aspects of the disclosure, the F Chord section 105 may be used to teach a user about the notes of an F major chord triad.

Figure 3:
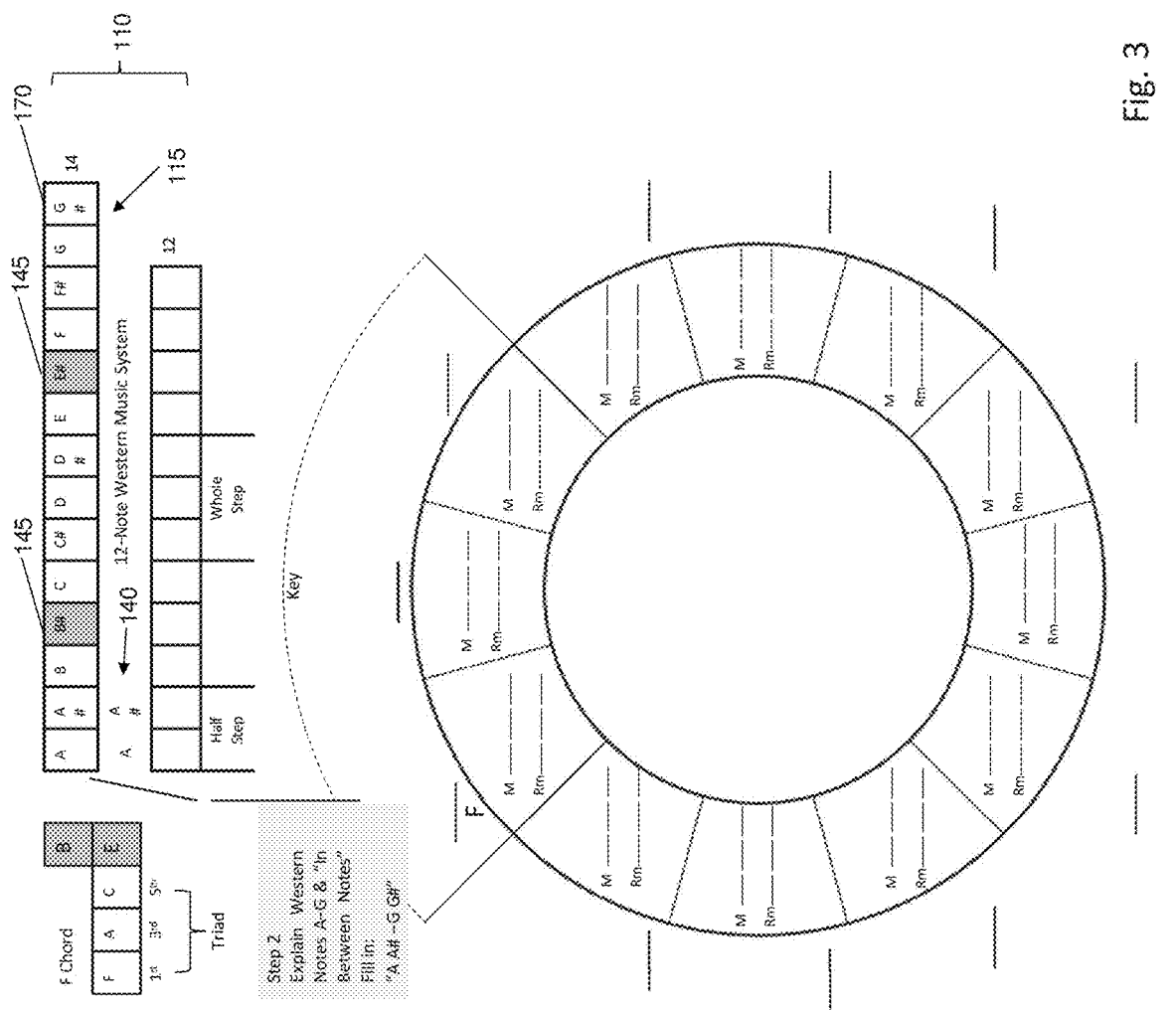

As shown in FIG. 3, next a user may be explained that music notes include the letters A-G and the user is directed to fill in the 14-note row 115 of the note teaching section 110 with the letters A-G with sharp notes between each letter note (i.e., A, A #, B, B #, C, C #, . . . . G, G #). As shown in FIG. 3, guidance information 140 (e.g., "A" and "A #") may be provided on the worksheet 100 for one or more of the fillable fields (or boxes) 170 to assist a user in completing the 14-note row 115.

Once the 14-note row 115 is completed, as shown in FIG. 3, the fourth and the tenth fillable fields (or boxes) 145 have the distinguishing feature (e.g., different color or shading) from the remaining fillable fields (or boxes) of the 14-note row 115 so as to identify for the user the "B #" and the "E #". It should be understood that the "B #" and the "E #" are not a part of the 12-note Western music system. That is, as explained above, in the 12-note Western music system, there is no note between the B note and the C note and there is no note between the E note and the F note. Thus, in accordance with aspects of the disclosure, the 14-note row 115 may be used to identify the two "notes" that are not a part of the 12-note Western music system. Thus, as should be understood, the second mnemonic device (e.g., "Let the E. . . . BE.") may be used to identify the two "notes" (i.e., "B #" and "E #") that are not a part of the 12-note Western music system.

Figure 4:
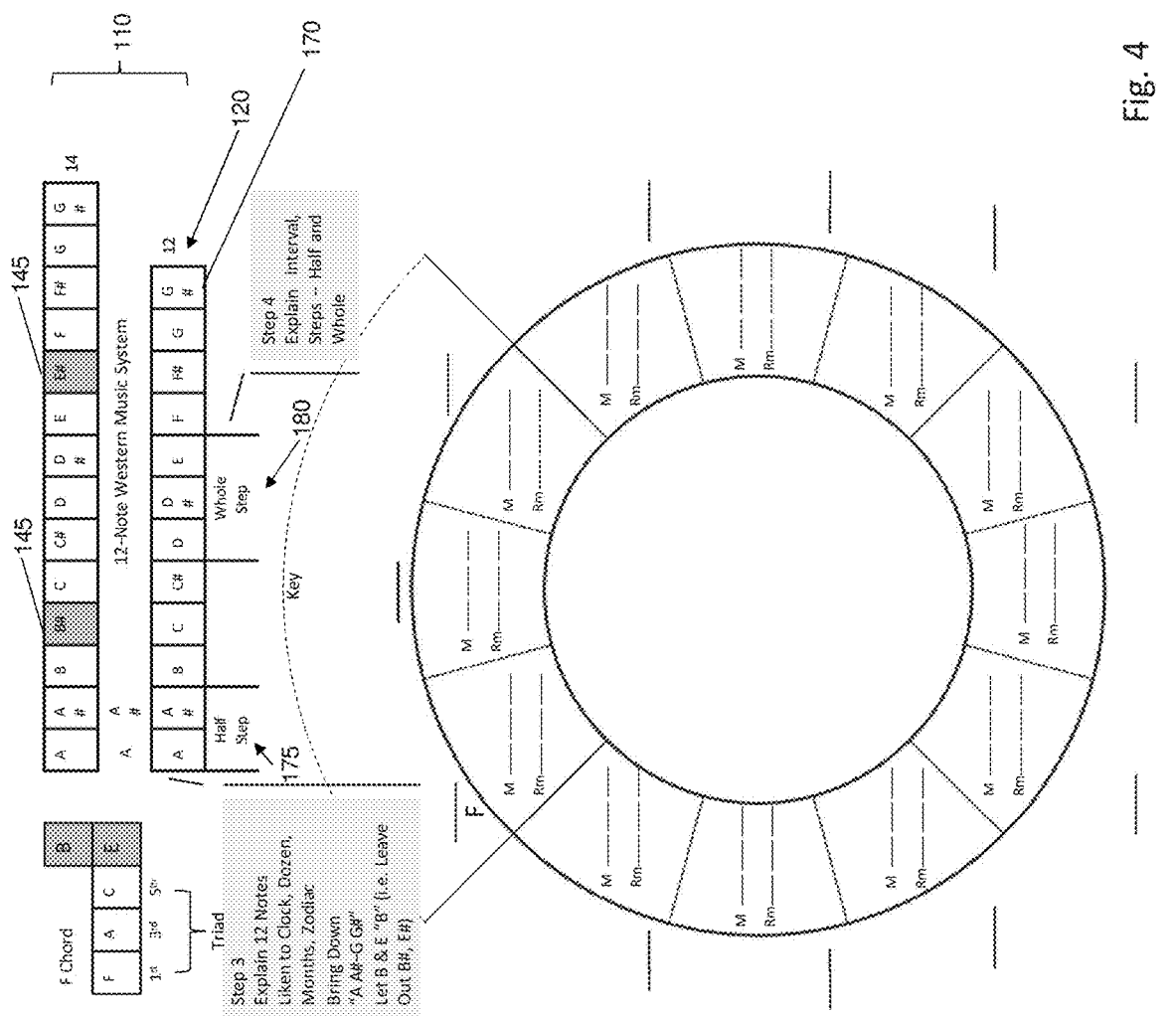

As shown in FIG. 4, a user may next fill in the twelve fillable fields (or boxes) 170 of the 12-note row 120 by copying the entered information of the 14-note row 115 (in order) without including the entered information (i.e., "B #" and "E #") the from the fourth and the tenth now-filled fields (or boxes) 145 having the distinguishing feature. In such a manner, as shown in FIG. 4, the user fills in the 12-note row 120 with the twelve notes of the Western musical system. Thus, in accordance with aspects of the disclosure, the note teaching section 110 may be utilized to instruct a user about the 12-note Western music system and the individual notes (i.e., A-A #/Bb-B-C-C #/Db-D-D #/Eb-E-F-F #/Gb-G-G #/Ab) of the 12-note Western music system.

As shown in FIG. 4, the "half step" marker 175 identifies a half step interval between notes (e.g., from an "A" to an "A #"). Additionally, the "whole step" marker 180 identifies a whole step interval between notes (e.g., from a "D" to an "E"). In such a manner and in accordance with aspects of the disclosure, the "half step" marker 175 and the "whole step" marker 180 visually depict intervals of half steps and whole steps, respectively. As shown in FIG. 4, the "half step" marker 175 illustrates that a half step is from one of the twelve notes to an immediately adjacent note (e.g., "A" to "A #" or "B" to "C"), whereas the "whole step" marker 180 illustrates that a whole step is from one of the twelve notes to a note two away from the initial note (e.g., "A" to "B" of "B" to "C #"). Thus, implementing these aspects of the disclosure can assist a user in understanding half step intervals and whole steps intervals between notes of the 12-note Western music system.

Figure 5:
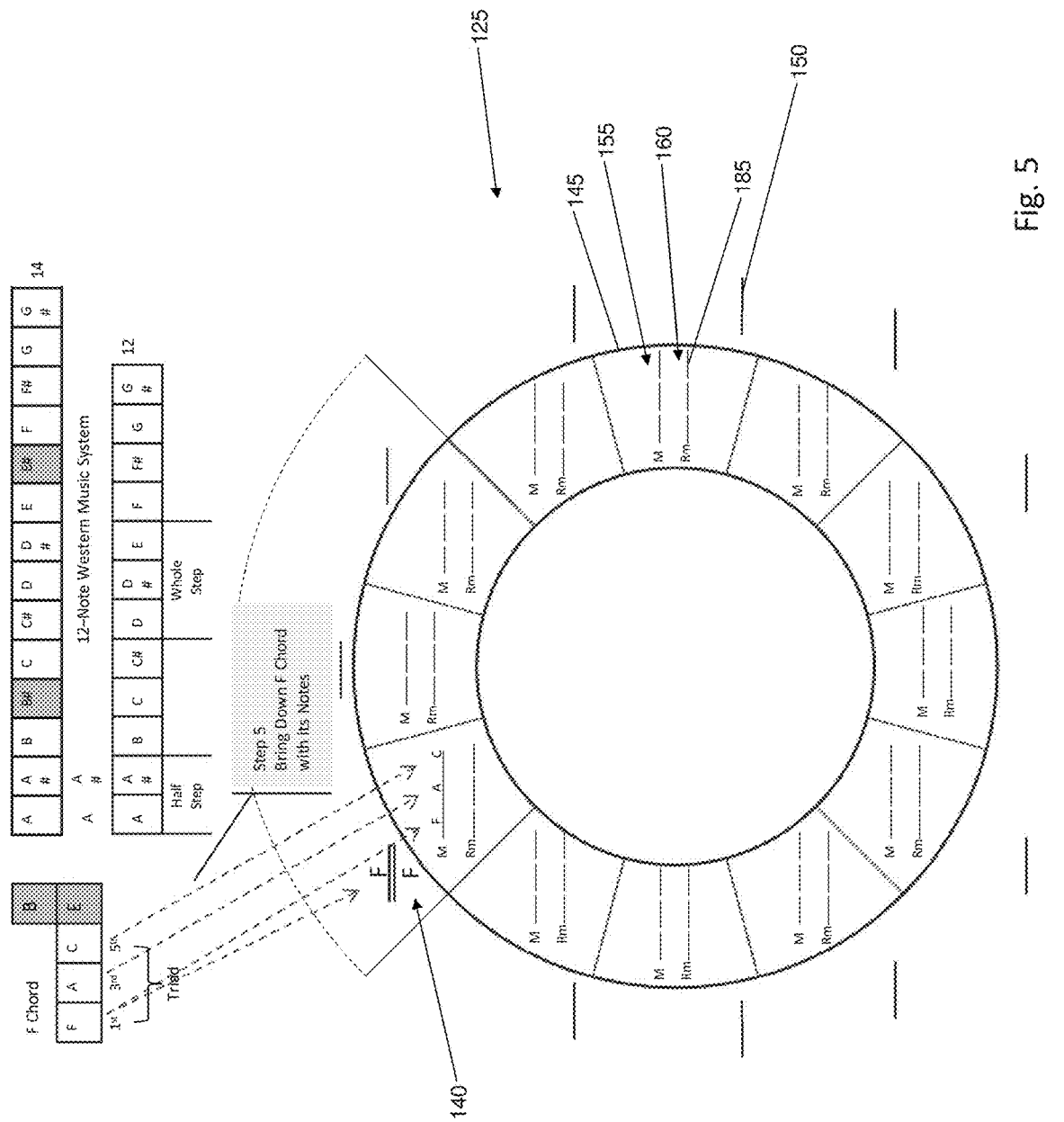

As shown in FIG. 5, a user next begins filing in the circle of fifths chart 125 of the worksheet 100. For example, a user utilizes the guidance information 140 to identify the chord section 145 of the circle of fifths chart 125 designated for the F chord, and the user fills in the root note fillable field 150 of the chord section 145 with an "F." Next, as shown in FIG. 5, the user copies the information from the three left-most fillable fields (or boxes) of the F Chord section 105 (i.e., the "F," the "A," and the "C") into the three fillable fields 185 of the major notes section 155. Thus, the major notes section 155 provides the user a visual indicator that the F major chord includes the F note as the $1^{st}$ (or root note), the A note as the $3^{rd}$, and the C note as the $5^{th}$. In such a manner, in accordance with aspects of the disclosure, the major notes section 155 may be used to teach a user about the notes of a major chord (e.g., an F major chord).

Figure 6:
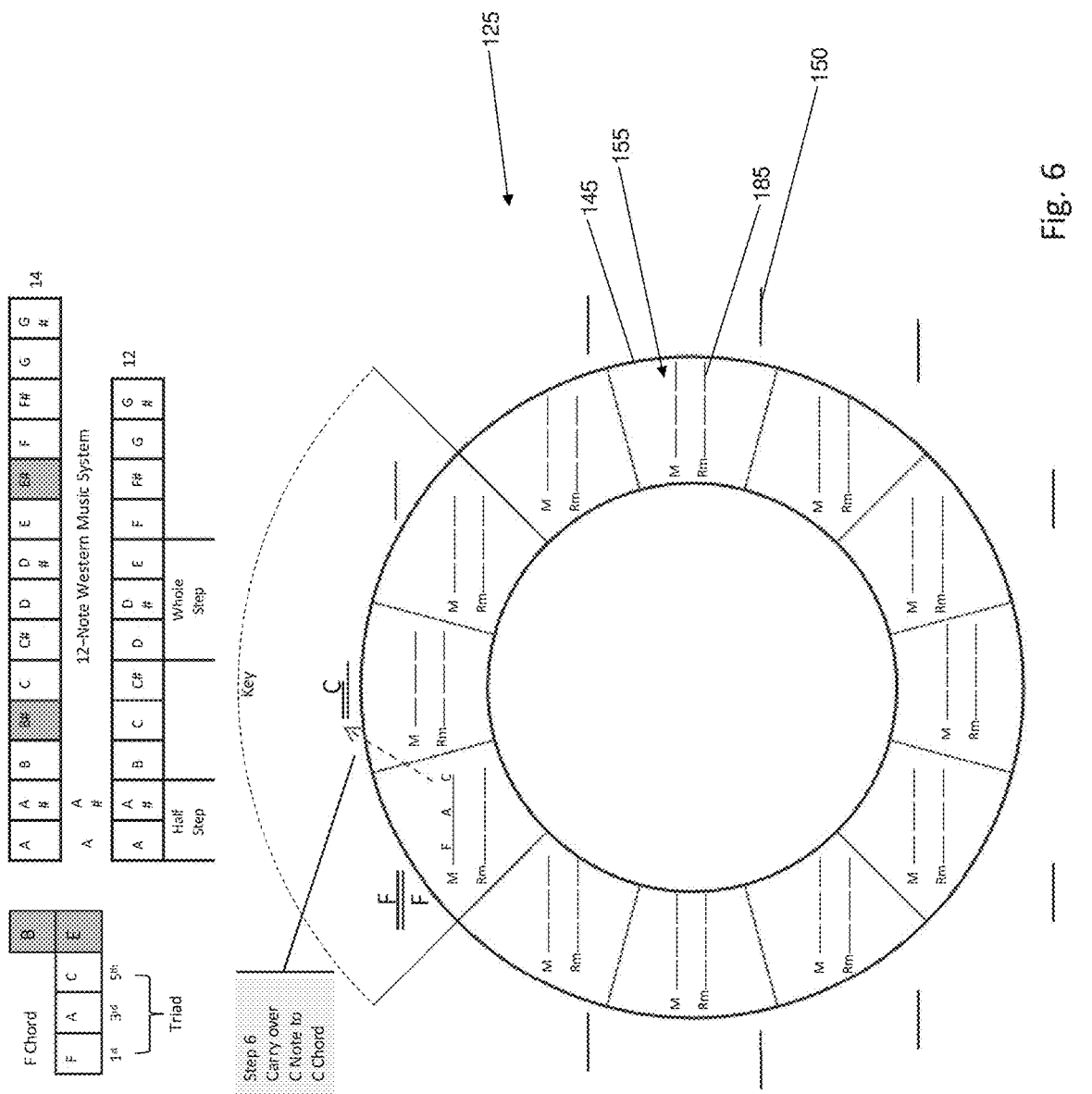

As shown in FIG. 6, a user next uses the last note identified in the major notes section 155 of the chord section 145 of the circle of fifths chart 125 designated for the F chord (that is, the previous chord section) to identify the root note of the adjacent chord section. Thus, a user copies the "C" from the right-most of the three fillable fields 185 of the major notes section 155 to the root note fillable field 150 of the adjacent chord section 145 (in a clockwise direction).

Figure 7:
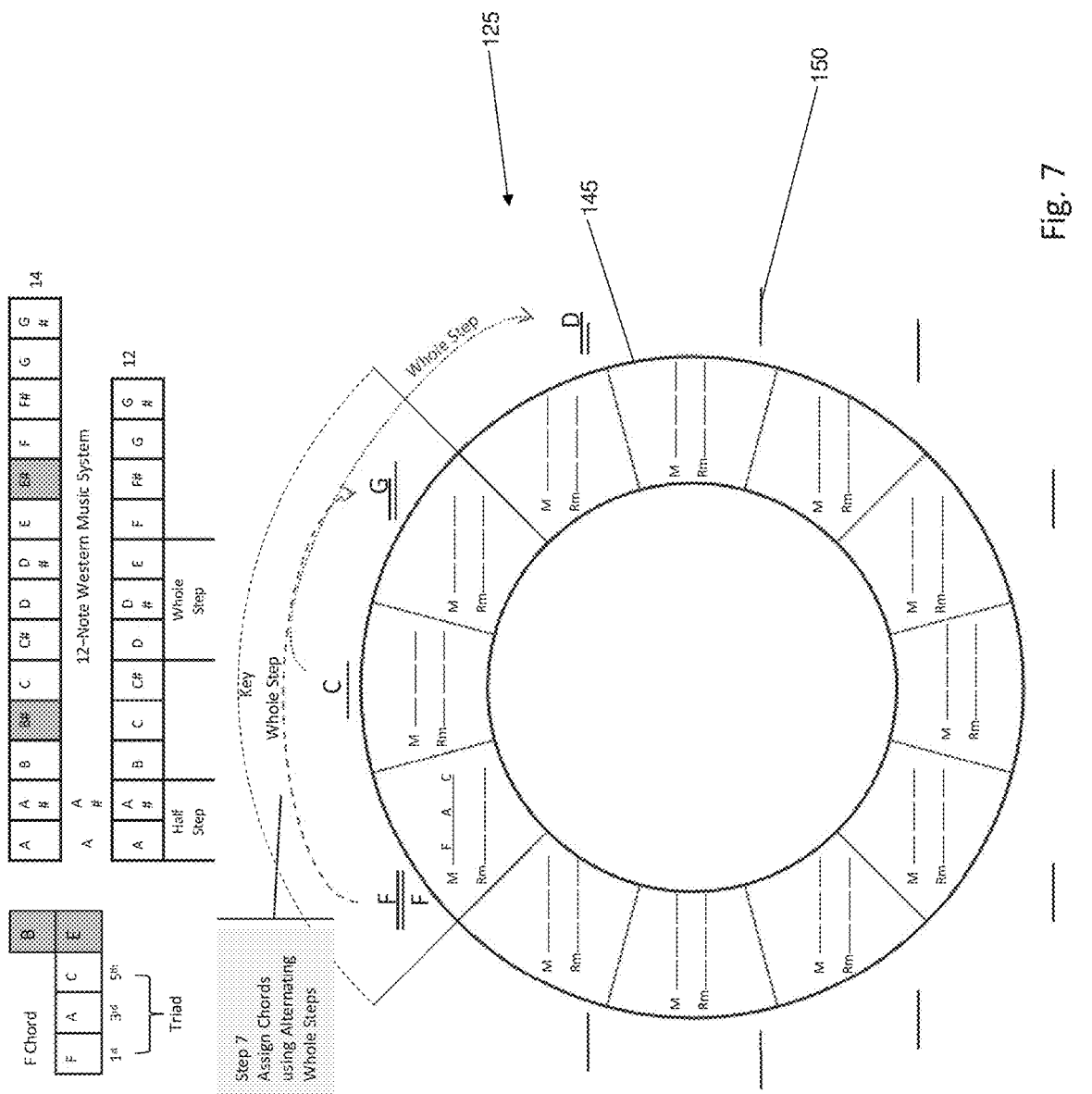

As shown in FIG. 7, a user next assigns root notes to the remaining root note fillable fields 150. Specifically, a user is instructed to fill in each next chord section 145 of the circle of fifths chart 125 by skipping a whole step from the root note of a chord section 145 two prior in the circle of fifths chart 125 (i.e., two prior in the counter-clockwise direction). Another way of putting this is assigning chords around the circle of fifths chart 125 in alternating whole steps. In accordance with aspects of the disclosure, a user can utilize the 12-note row 120 of the note teaching section 110 to more easily identify the whole step interval. Thus, as shown in FIG. 7, in filing in the root note fillable field 150 for the next chord section, the user skips a whole step from the root note of a chord section 145 two prior (i.e., a whole step from the "F") in the circle of fifths chart 125 to identify the "G" root note. Likewise, once the user has filed in the "G" in the root note fillable field 150 for the G chord section, in filing in the root note fillable field 150 for the next chord section, the user skips a whole step from the root note of a chord section 145 two prior (i.e., a whole step from the "C") in the circle of fifths chart 125 to identify the "D" root note.

Figure 8:
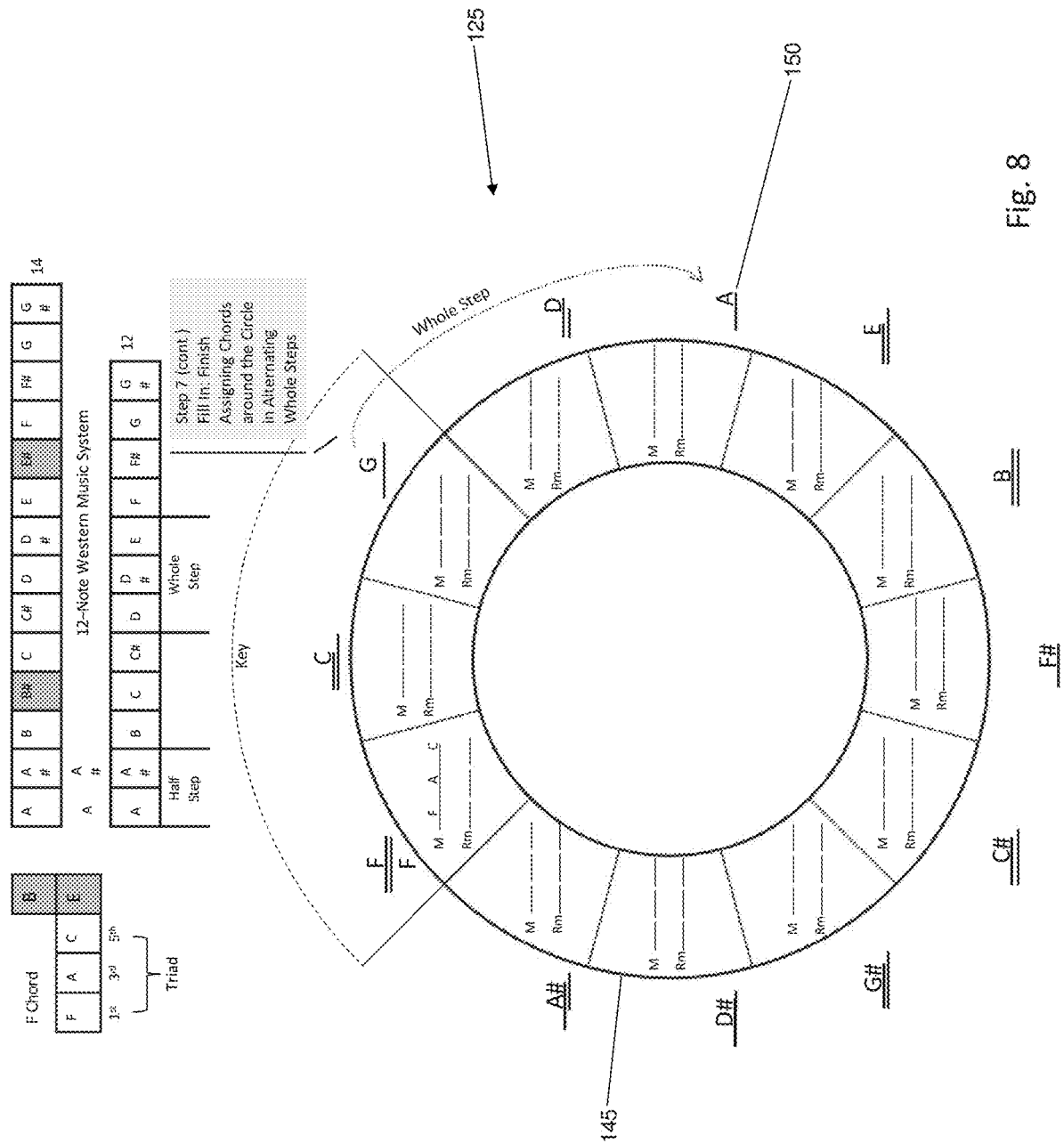

Additionally, as shown in FIG. 8, once the user has filed in the "D" in the root note fillable field 150 for the D chord section, in filing in the root note fillable field 150 for the next chord section, the user skips a whole step from the root note of a chord section 145 two prior (i.e., a whole step from the "G") in the circle of fifths chart 125 to identify the "A" root note. In such a manner, a user continues assigning the root notes to the remaining root note fillable fields 150 so that each of the chord sections are identified by their respective root notes as shown in FIG. 8.

Figure 9:
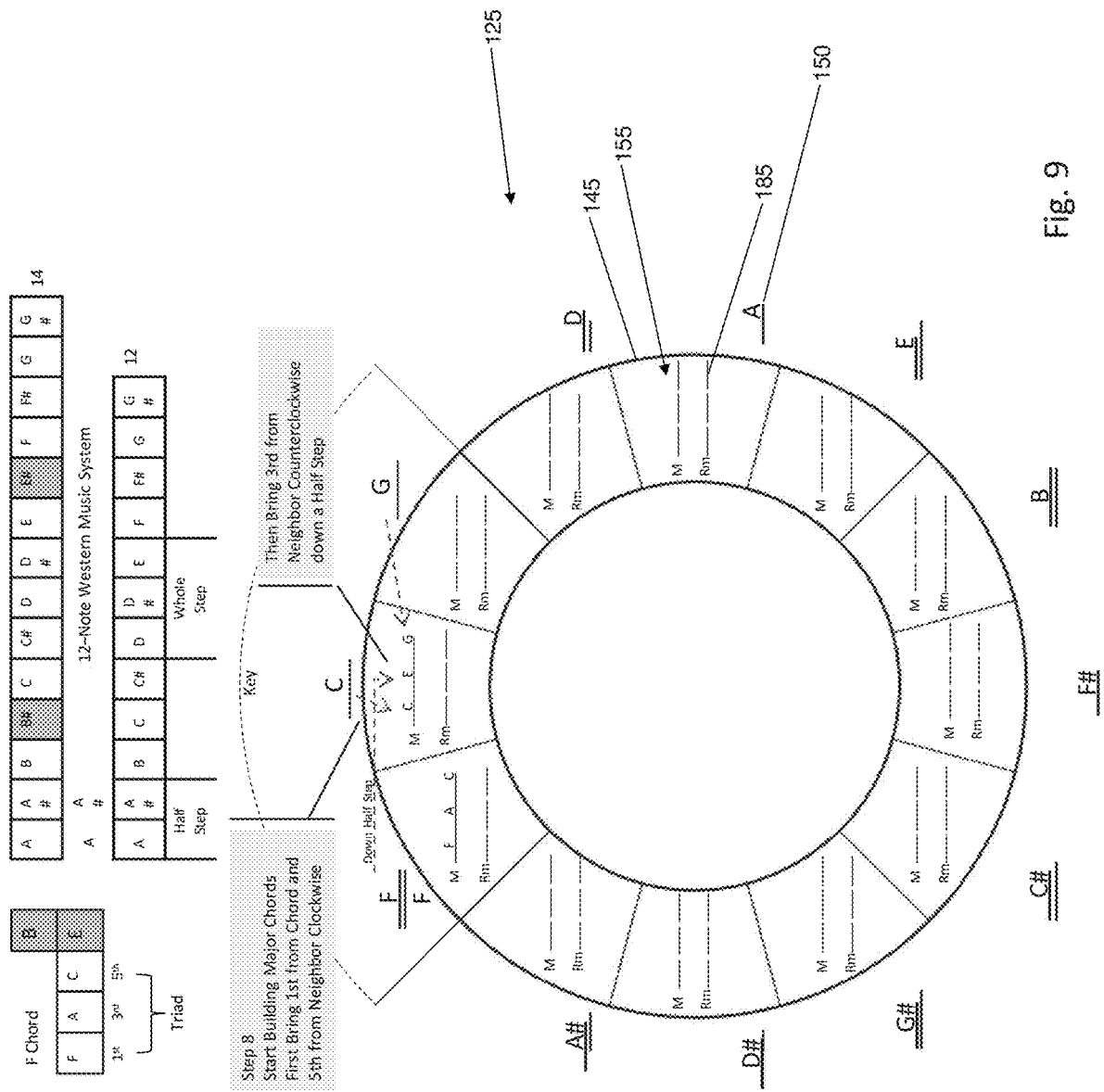

As shown in FIG. 9, the user builds a major chord for the next chord section 145 (that is, for the "C" chord section). In other words, by completing this portion of the worksheet 100, the user can identify the $1^{st}$ (or root) note, the $3^{rd}$ note, and the $5^{th}$ note for the C major chord. To do so, the user fills in the first (or left-most) of the three fillable fields 185 of the major notes section 155 with the "C" note of the (now-filled) root note fillable field 150 of the "C" chord section 145. In accordance with aspects of the disclosure, the first of the three fillable fields 185 of the major notes section 155 corresponds to the $1^{st}$ (or root) note, the second fillable field 185 corresponds to the $3^{rd}$ note, and the third fillable field 185 corresponds to the $5^{th}$ note. Thus, in such a manner, the user identifies the $1^{st}$ of the C chord as a "C" note.

As shown in FIG. 9, the user fills in the second (or middle) of the three fillable fields 185 of the major notes section 155 with a note that is one half step down from the root note of the immediately preceding chord section (i.e., immediately adjacent in the counter-clockwise direction). That is, the user fills in the second (or middle) fillable field 185 with an "E", which is one half step down from the root note "F" of the immediately preceding chord section. In such a manner, the user identifies the $3^{rd}$ of the C chord as an "E" note.

The user fills in the third (or right-most) of the three fillable fields 185 of the major notes section 155 with a note that is the root note of the immediately following chord section (i.e., immediately adjacent in the clockwise direction). That is, the user fills in the third (or right-most) fillable field 185 with an "G", which is the root note of the immediately following chord section. In such a manner, the user identifies the $5^{th}$ of the C chord as a "G" note.

Thus, by completing this portion of the worksheet 100, the user can identify the $1^{st}$ (or root) note, the $3^{rd}$ note, and the $5^{th}$ note for the C major chord. While described in a particular order, the disclosure contemplates that a user may complete the three fillable fields 185 of the major notes section 155 in any order.

Figure 10:
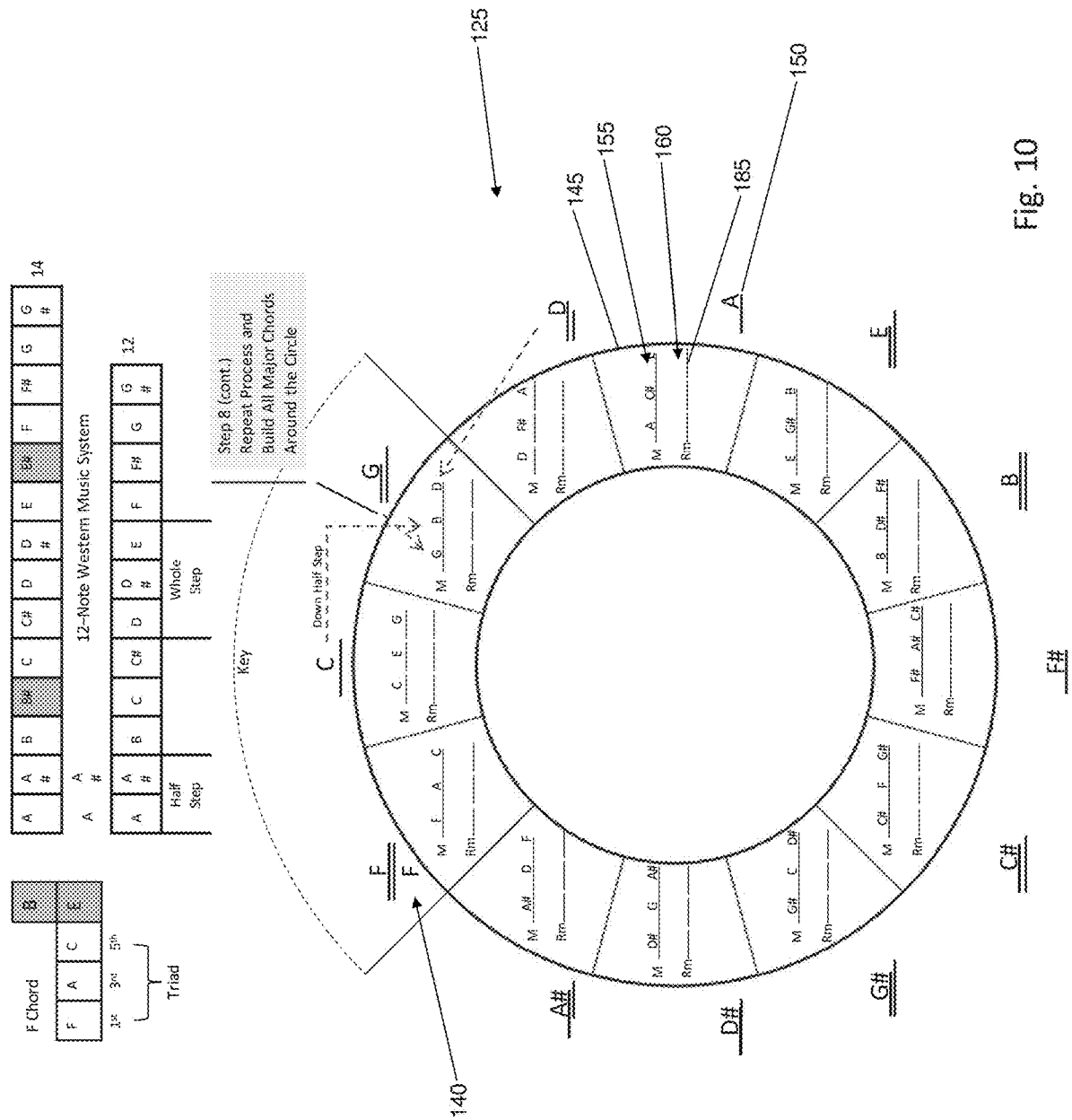

As shown in FIG. 10, the user builds a major chord for the next chord section 145 (that is, the "G" chord section in a similar manner using the same pattern. That is, the user fills in the first (or left-most) of the three fillable fields 185 of the major notes section 155 with the "G" note of the (now-filled) root note fillable field 150 of the "G" chord section 145. The user fills in the second (or middle) of the three fillable fields 185 of the major notes section 155 with a note that is one half step down from the root note of the immediately preceding chord section (i.e., immediately adjacent in the counter-clockwise direction). That is, the user fills in the second (or middle) fillable field 185 with an "B", which is one half step down from the root note "C" of the immediately preceding chord section. In such a manner, the user identifies the $3^{rd}$ of the G chord as a "B" note. The user fills in the third (or right-most) of the three fillable fields 185 of the major notes section 155 with a note that is the root note of the immediately following chord section (i.e., immediately adjacent in the clockwise direction). That is, the user fills in the third (or right-most) fillable field 185 with a "D", which is the root note of the immediately following chord section. In such a manner, the user identifies the 5$^{th}$ of the G chord as a "D" note.

As shown in FIG. 10, the user can fill in the remaining major notes sections 155 for each of the chord sections 145 in the above-described manner using the above-described pattern. Thus, in accordance with aspects of the disclosure, by completing this portion of the worksheet 100, the user can identify the 1$^{st}$ (or root) note, the 3$^{rd}$ note, and the 5$^{th}$ note for each of the twelve major chords.

Figure 11:
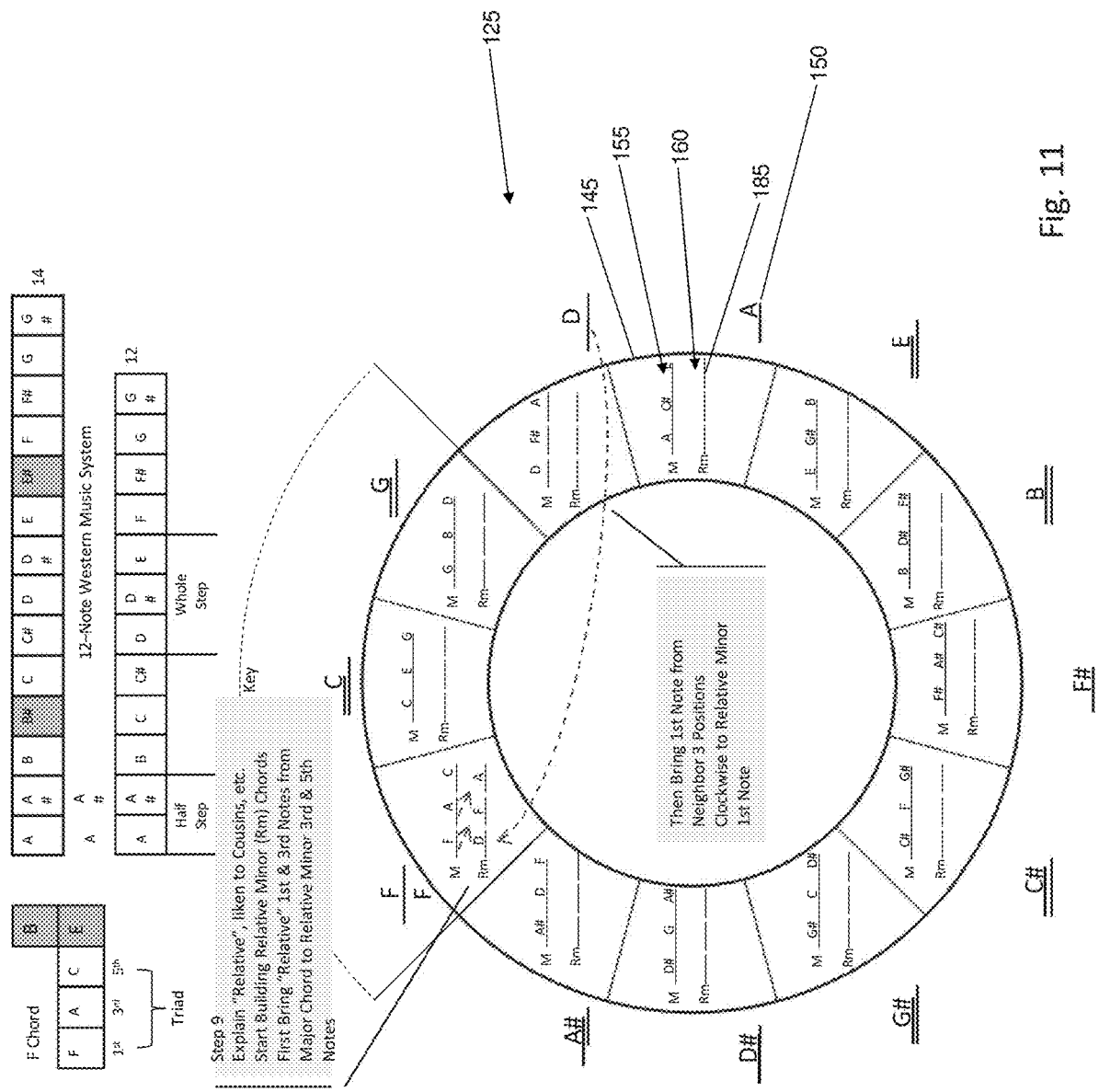

As shown in FIG. 11, the user builds the relative minor chord for the "F" chord section 145 in accordance with aspects of the disclosure. By completing this portion of the worksheet 100, the user can identify the 1$^{st}$ (or root) note, the 3$^{rd}$ note, and the 5$^{th}$ note for the relative minor chord of the F major chord. To do so, as shown in FIG. 11, the user fills in the second (or middle) fillable field 185 of the relative minor notes section 160 with the note from the first (or left-most) fillable field 185 of the major notes section 155. That is, the user fills in the second (or middle) fillable field 185 with an "F" from the first (or left-most) fillable field 185 of the major notes section 155. In such a manner, the user identifies the 3$^{rd}$ of the relative minor chord to the F chord as an "F" note.

Similarly, the user fills in the third (or right-most) fillable field 185 of the relative minor notes section 160 with the note from the second (or middle) fillable field 185 of the major notes section 155, as shown in FIG. 11. That is, the user fills in the third (or right-most) fillable field 185 with an "A" from the second (or middle) fillable field 185 of the major notes section 155 of the chord section 145. In such a manner, the user identifies the 5$^{th}$ of the relative minor chord to the F chord as an "A" note.

The user fills in the first (or left-most) fillable fields 185 of the relative minor notes section 160 with the root note from the chord section 145 three positions clockwise from the chord section being filled in. Thus, as shown in FIG. 11, the user fills in the first (or left-most) fillable fields 185 of the relative minor notes section 160 with a "D", which is the root note from the chord section 145 three positions clockwise from the "F" chord section being filled in. In such a manner, the user identifies the 1$^{st}$ of the relative minor chord to the F chord as a "D" note.

Thus, by implementing these aspects of the disclosure, a user can build and derive the relative minor chord (and the notes thereof) corresponding a particular major chord. For example, the user can determine that an F major chord comprising the notes "F", "A" and "C" has a relative minor chord of D minor, which comprises the notes of "D", "F", and "A". In accordance with aspects of the disclosure, by completing this portion of the worksheet 100, a user can develop a better understanding of major chords and their respective relative minor chords and how they relate to each other.

Figure 12:
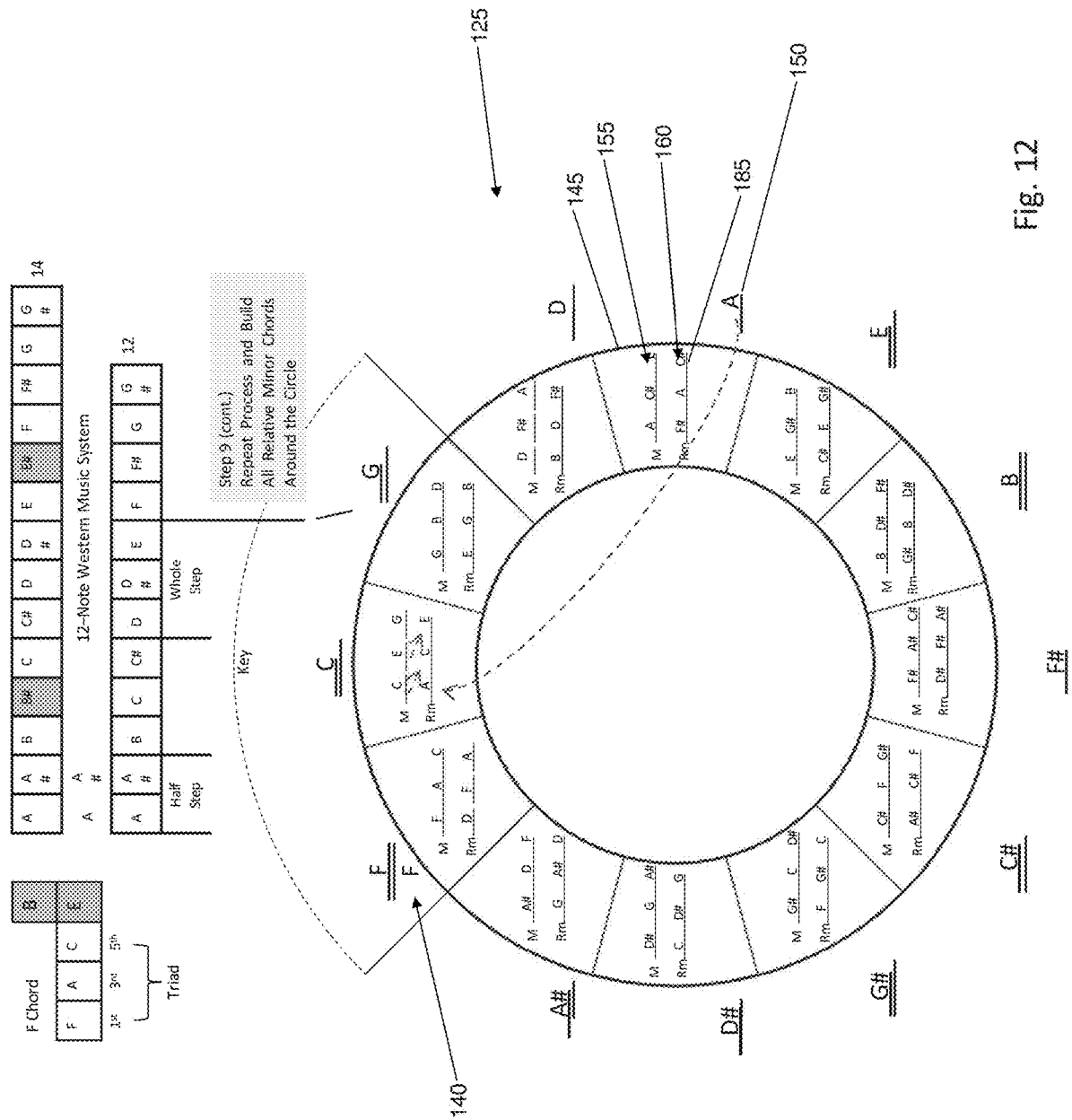

As shown in FIG. 12, the user builds a relative minor chord for the next chord section 145 (that is, the "C" chord section) in a similar manner using the same pattern. Thus, the user fills in the second (or middle) fillable field 185 of the relative minor notes section 160 with the note from the first (or left-most) fillable field 185 of the major notes section 155. That is, the user fills in the second (or middle) fillable field 185 with a "C" from the first (or left-most) fillable field 185 of the major notes section 155. In such a manner, the user identifies the 3$^{rd}$ of the relative minor chord to the C major chord as a "C" note.

Similarly, the user fills in the third (or right-most) fillable field 185 of the relative minor notes section 160 with the note from the second (or middle) fillable field 185 of the major notes section 155, as shown in FIG. 12. That is, the user fills in the third (or right-most) fillable field 185 with an "E" from the second (or middle) fillable field 185 of the major notes section 155. In such a manner, the user identifies the 5$^{th}$ of the relative minor chord to the C major chord as an "E" note. The user fills in the first (or left-most) fillable field 185 of the relative minor notes section 160 with the root note from the chord section 145 three positions clockwise from the chord section being filled in. Thus, as shown in FIG. 12, the user fills in the first (or left-most) fillable fields 185 of the relative minor notes section 160 with an "A", which is the root note from the chord section 145 three positions clockwise from the "C" chord section being filled in. In such a manner, the user identifies the 1$^{st}$ of the relative minor chord to the C major chord as an "A" note.

Thus, the user can determine that a C major chord has a relative minor chord of A minor, As explained above, by implementing these aspects of the disclosure, a user can build and derive the relative minor chords (and the notes thereof) corresponding a particular major chord.

As shown in FIG. 12, the user can fill in the remaining relative minor notes sections 160 for each of the chord sections 145 in the above-described manner using the above-described pattern. As explained above, by completing this portion of the worksheet 100, the user can identify the 1$^{st}$ (or root) note, the 3$^{rd}$ note, and the 5$^{th}$ note for each of the twelve relative minor chords, and a user can develop a better understanding of major chords and their respective relative minor chords and how they relate to each other.

Figure 13:
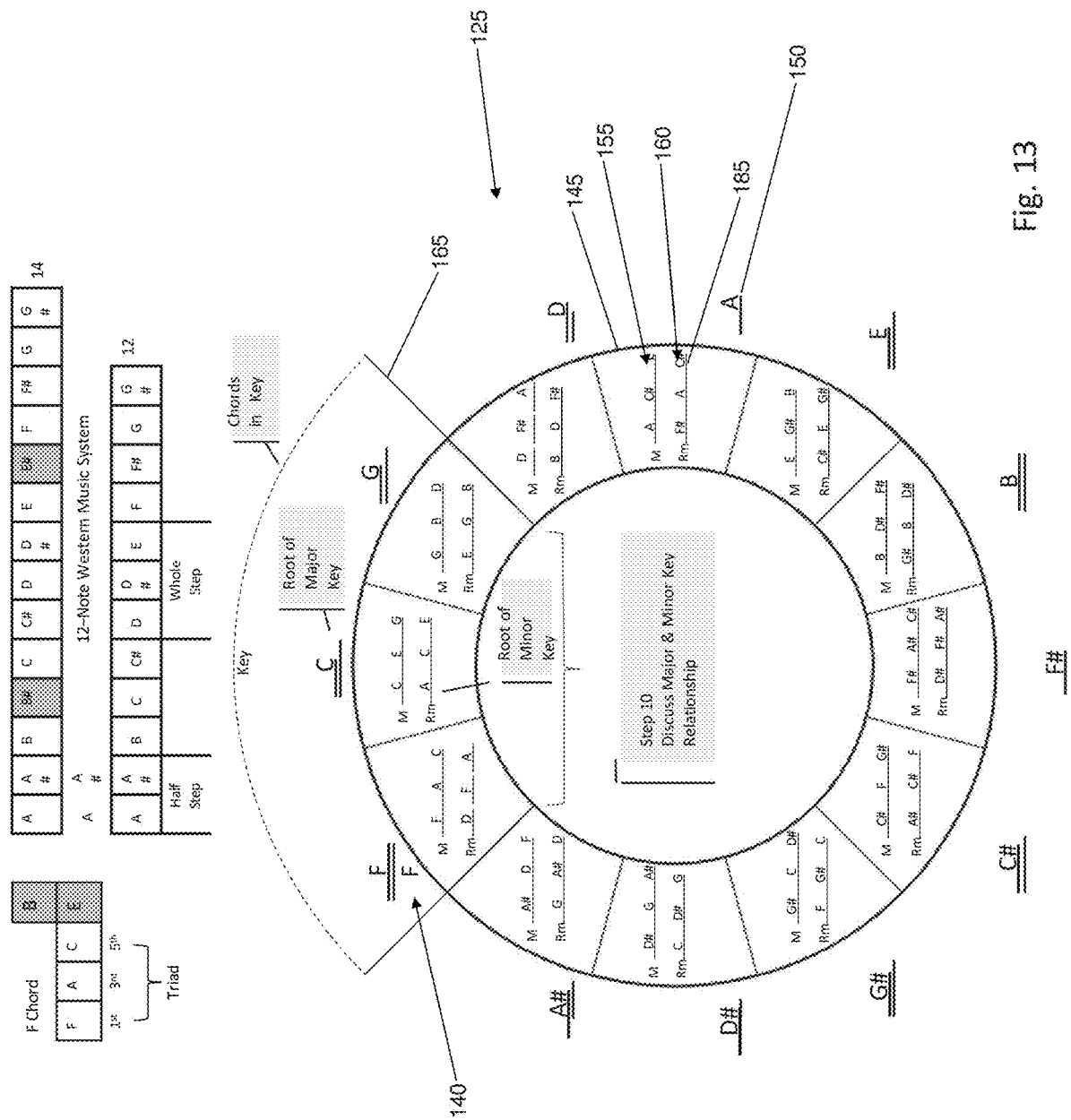

As shown in FIG. 13, the circle of fifths chart 125 also includes a chords-in-key identifier 165. In accordance with aspects of the disclosure, the chords-in-key identifier 165 provides a visual indication (or identification) of three adjacent chord sections 145 as forming a group of chords in a particular key. As shown in FIG. 13, the chords-in-key identifier 165 encompasses three adjacent chord sections 145 (e.g., "F" chord section, "C" chord section, and "G" chord section), which are chords in the key of C major and are also chords in the key of Am (i.e., the relative minor of C major). As shown in FIG. 13, the center chord section 145 within the chords-in-key identifier 165 identifies the root of the major key of this grouping of chords as a "C" note and the root of the relative minor key as an "A" note.

Thus, by utilizing the chords-in-key identifier 165 of the worksheet 100, the user can identify chords for a particular major key (and for its relative minor key) for each of the twelve keys, and a user can develop an even deeper understanding of chords in particular major and minor keys and how they relate to each other.

Figure 14:
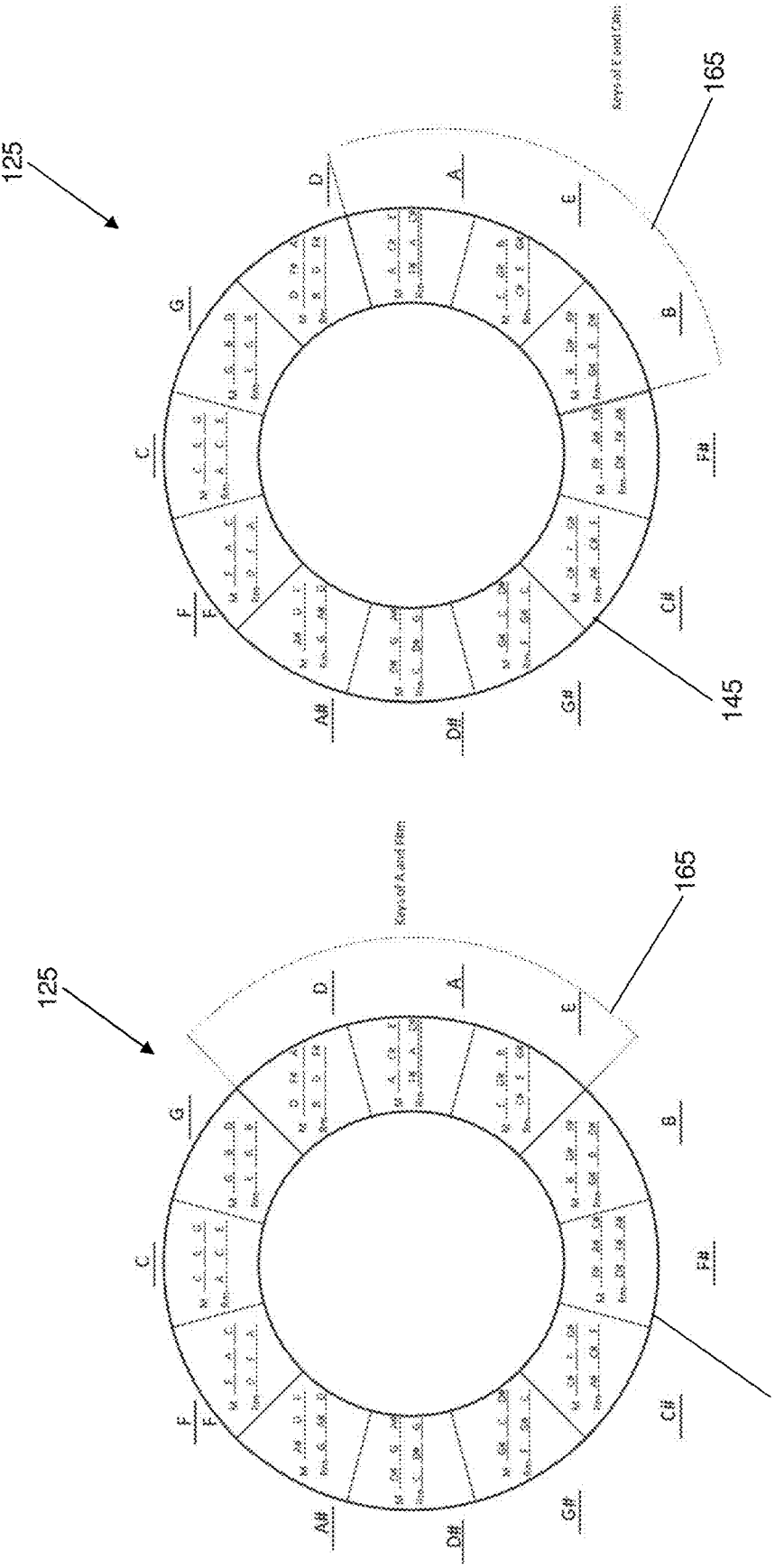
FIGS. 14A and 14B each show exemplary views of filled in (or completed) worksheets depicting additional examples of key identification in accordance with aspects of the disclosure.

FIGS. 14A and 14B each show exemplary views of filled out (or completed) worksheets 100 depicting additional examples of key identification using a chords-in-key identifier in accordance with aspects of the disclosure. As shown in FIG. 14A, the chords-in-key identifier 165 encompasses three adjacent chord sections 145 (e.g., "D" chord section, "A" chord section, and "E" chord section), which are chords in the key of A major and are also chords in the key of F # m (i.e., the relative minor of A major). As shown in FIG. 14A, the center chord section 145 within the chords-in-key identifier 165 in this position identifies the root of the major key of this grouping of chords as an "A" note and the root of the relative minor key as an "F #" note.

Additionally, as shown in FIG. 14B, the chords-in-key identifier 165 encompasses three different adjacent chord sections 145 (e.g., "A" chord section, "E" chord section, and "B" chord section), which are chords in the key of E major and are also chords in the key of C # m (i.e., the relative minor of E major). As shown in FIG. 14B, the center chord section 145 within the chords-in-key identifier 165 in this position identifies the root of the major key of this grouping of chords as an "E" note and the root of the relative minor key as an "C #" note.

Thus, by utilizing the chords-in-key identifier 165 of the worksheet 100, which in embodiments may be movable around the circle of fifths section 125 and/or overlaid, the user can easily identify chords for a particular major key and for its relative minor key for each of the twelve keys, and a user can develop an even deeper understanding of chords in particular major or minor keys and how they relate to each other.

Figure 15:
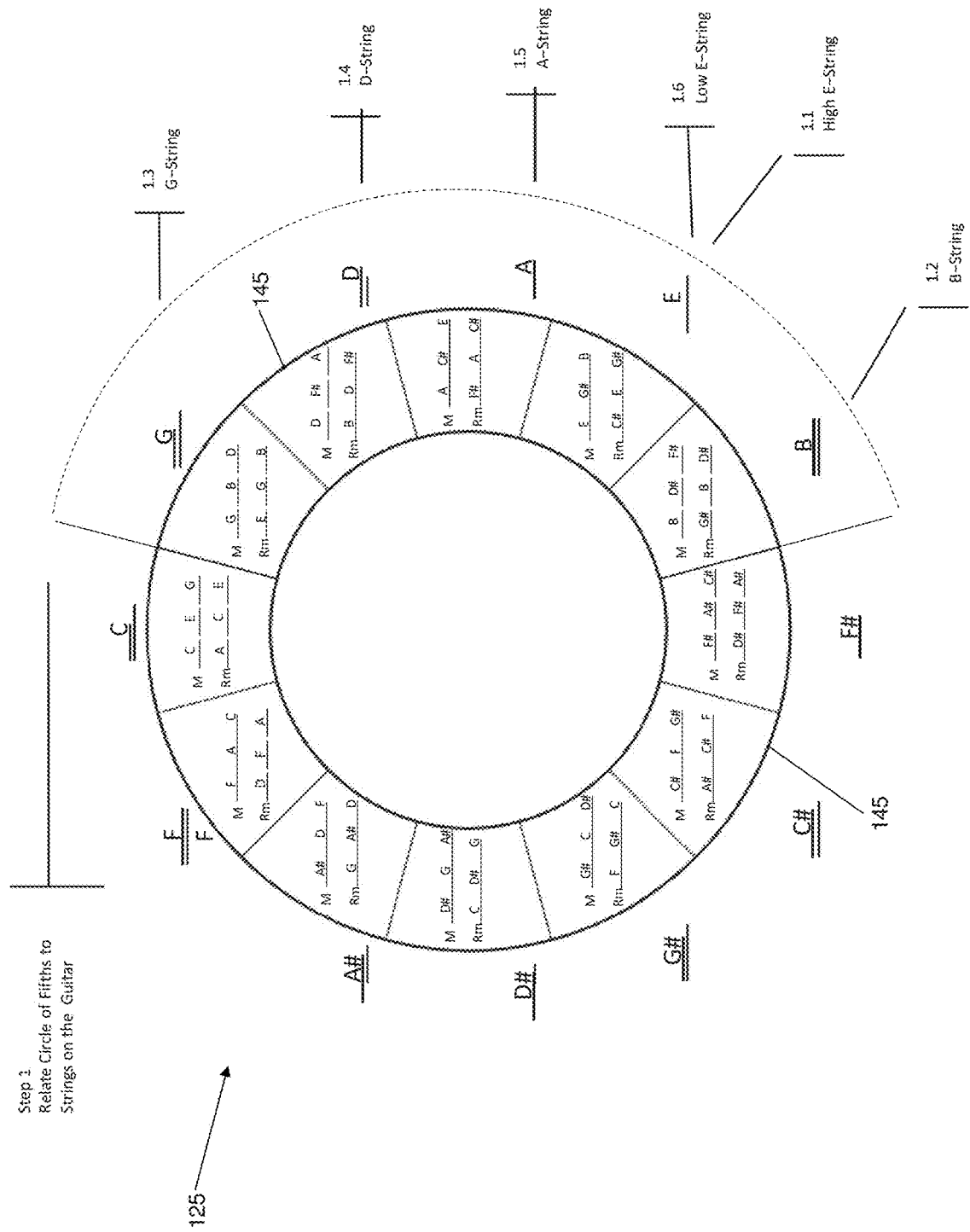
FIG. 15 shows an exemplary depiction of a completed music theory beginner teaching methodology worksheet applied to learning guitar in accordance with additional aspects of the disclosure.

FIG. 15 shows an exemplary depiction of a completed music theory beginner teaching methodology worksheet applied to learning guitar in accordance with additional aspects of the disclosure. More specifically, FIG. 15 pictorially illustrates how the circle of fifths chart 125 relates to the strings on a guitar (in standard tuning). Thus, as shown in FIG. 15, the high E-string and the low E-string of the guitar correspond with the E chord section 145 of the circle of fifths chart 125. The B-string of the guitar corresponds with the B chord section 145 of the circle of fifths chart 125. The G-string of the guitar corresponds with the G chord section 145 of the circle of fifths chart 125. The D-string of the guitar corresponds with the D chord section 145 of the circle of fifths chart 125. Lastly, as shown in FIG. 15. the A-string of the guitar corresponds with the A chord section 145 of the circle of fifths chart 125. The pictorial connections between the circle of fifths chart 125 and the strings on a guitar enables a user to more completely understand how the circle of fifths relates to the strings of the guitar in accordance with aspects of the disclosure.

Figure 16:
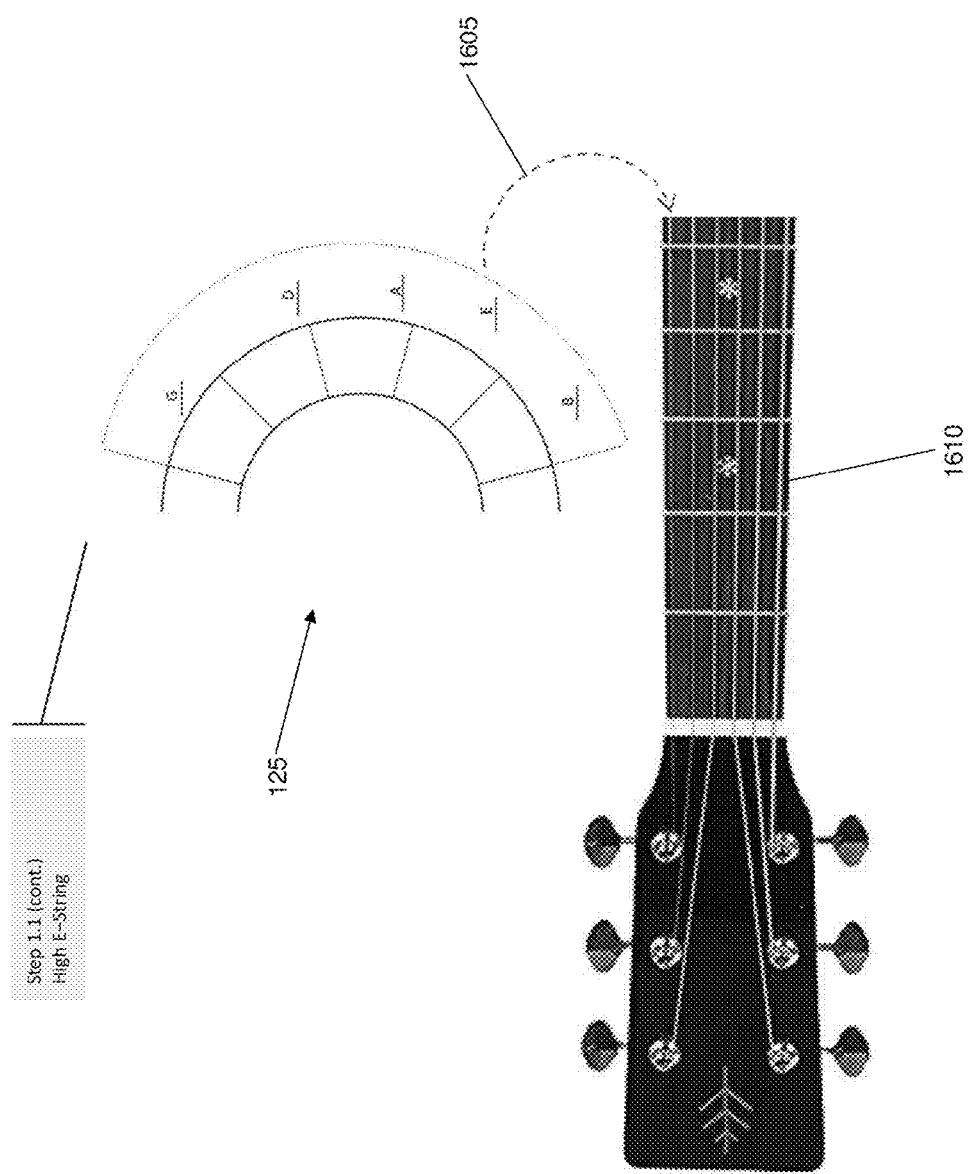
FIGS. 16-21 show exemplary depictions of the music theory beginner teaching methodology worksheet coordination with the strings of a guitar in standard tuning in accordance with aspects of the disclosure.

FIGS. 16-21 show exemplary depictions of the music theory beginner teaching methodology worksheet coordination with the strings of a guitar 1610 in accordance with aspects of the disclosure. As shown in FIG. 16 (via connecting line 1605), the high E-string of the guitar 1610 corresponds with the E chord section 145 of the circle of fifths chart 125. The pictorial connection between the circle of fifths chart 125 and the high E-string on a guitar 1610 enables a user to more completely understand how the E chord section 145 of the circle of fifths relates to the high E-string of the guitar 1610 in accordance with aspects of the disclosure.

Figure 17:
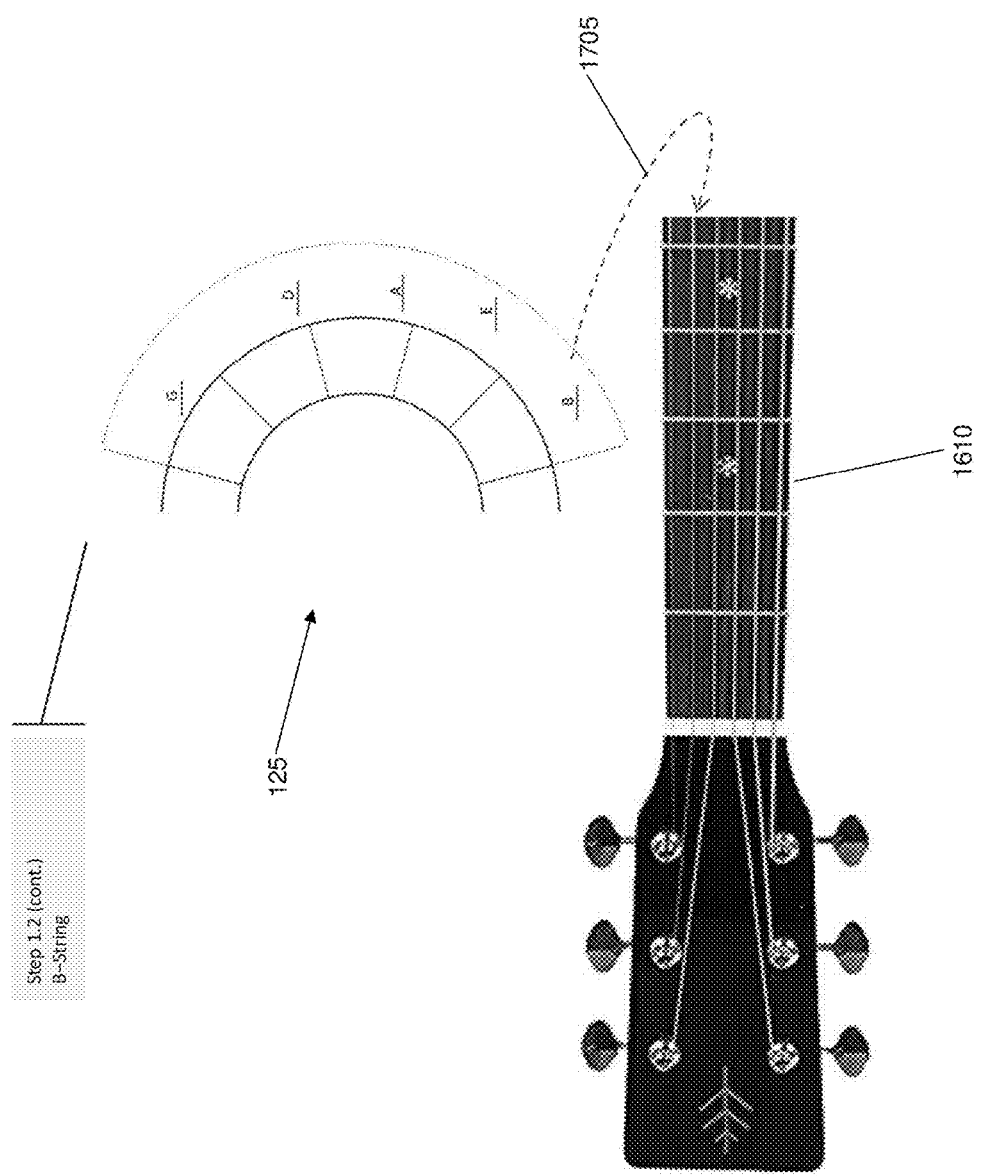

As shown in FIG. 17, the B-string of the guitar 1610 corresponds with the B chord section 145 of the circle of fifths chart 125 (via connecting line 1705). The pictorial connection between the circle of fifths chart 125 and the B-string on a guitar 1610 enables a user to more completely understand how the B chord section 145 of the circle of fifths relates to the B-string on the guitar 1610 in accordance with aspects of the disclosure.

Figure 18:
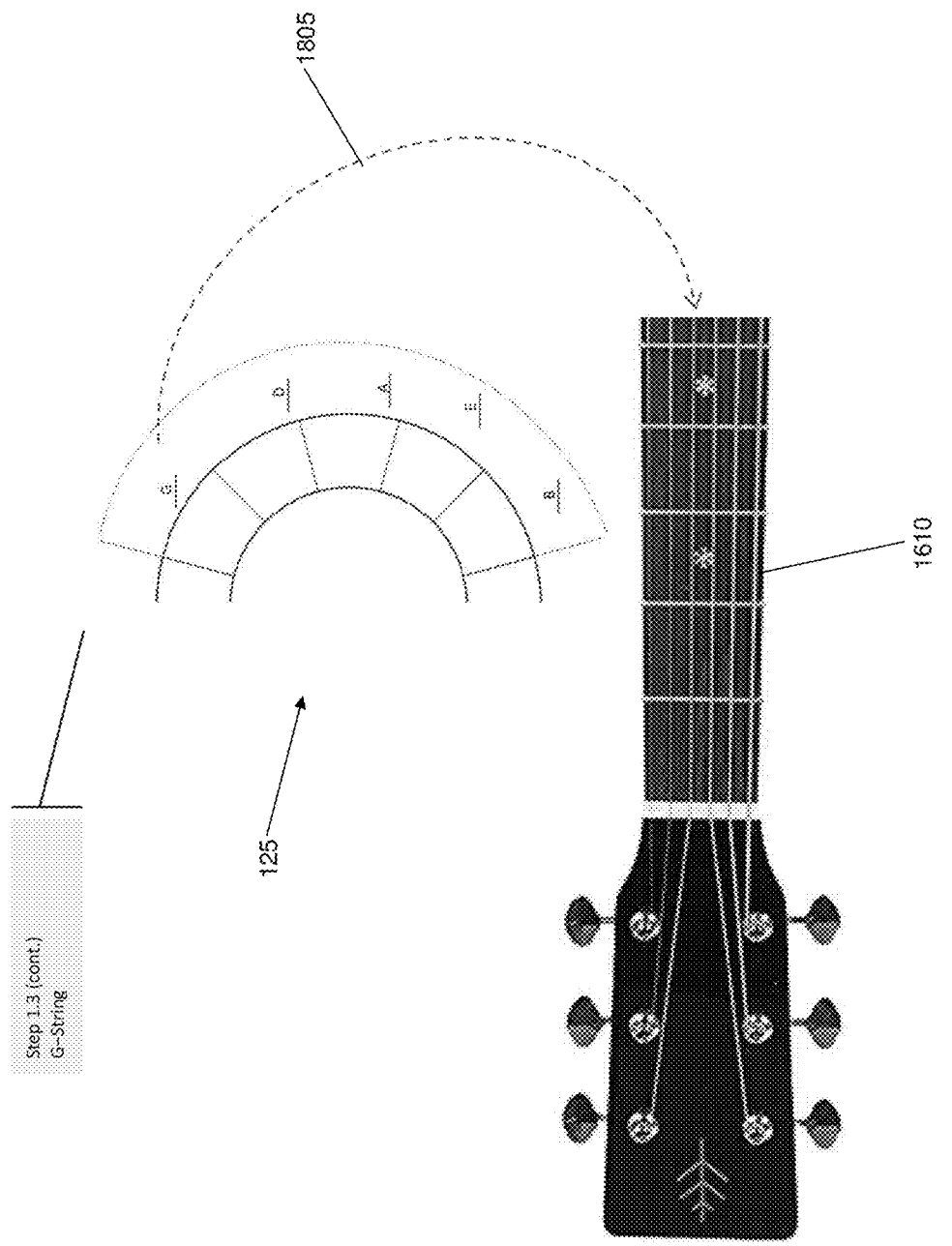

As shown in FIG. 18, the G-string of the guitar 1610 corresponds with the G chord section 145 of the circle of fifths chart 125 (via connecting line 1805). The pictorial connection between the circle of fifths chart 125 and the G-string on a guitar 1610 enables a user to more completely understand how the G chord section 145 of the circle of fifths relates to the G-string on the guitar 1610 in accordance with aspects of the disclosure.

Figure 19:
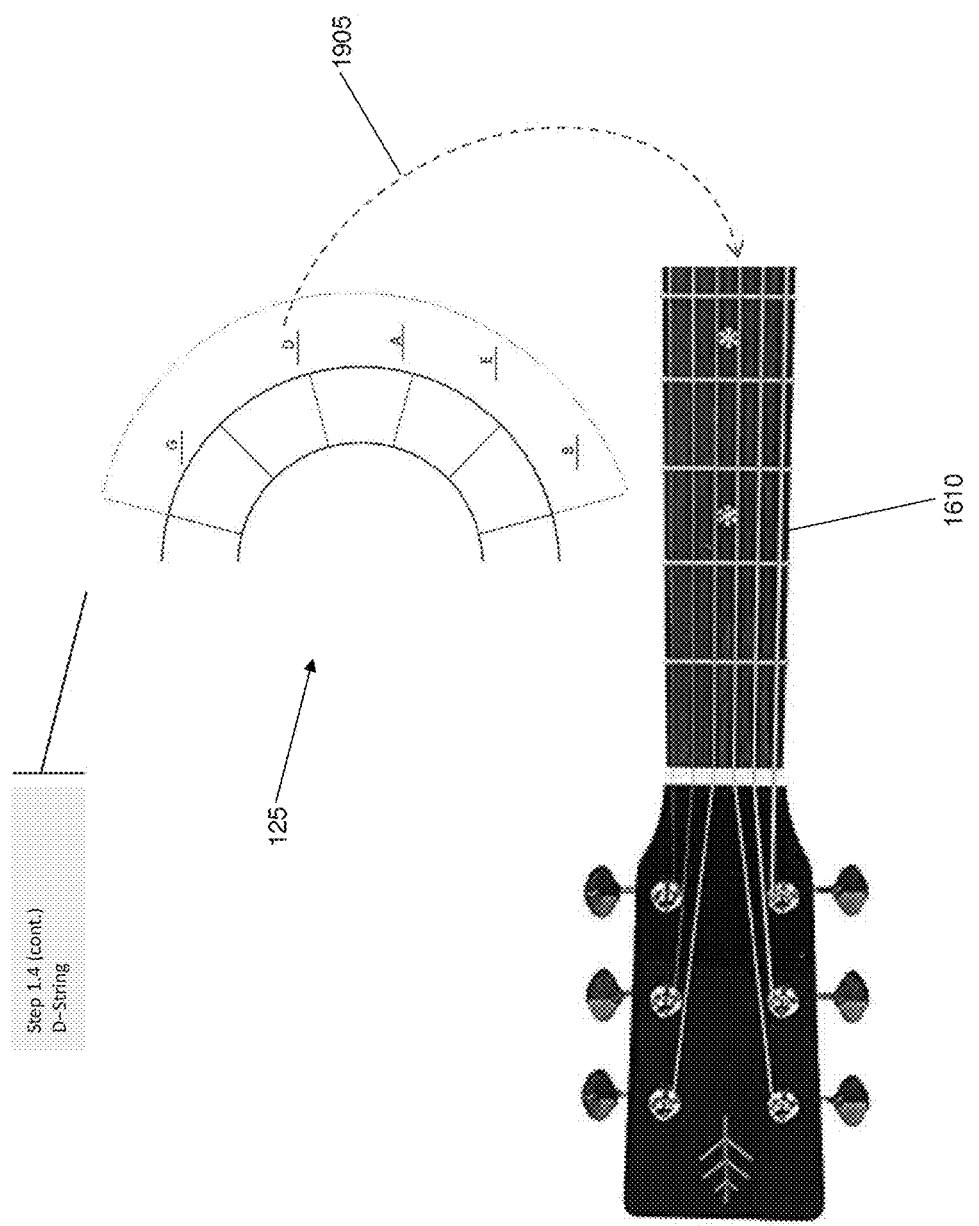

As shown in FIG. 19, the D-string of the guitar 1610 corresponds with the D chord section 145 of the circle of fifths chart 125 (via connecting line 1905). The pictorial connection between the circle of fifths chart 125 and the D-string on a guitar 1610 enables a user to more completely understand how the D chord section 145 of the circle of fifths relates to the D-string on the guitar 1610 in accordance with aspects of the disclosure.

Figure 20:
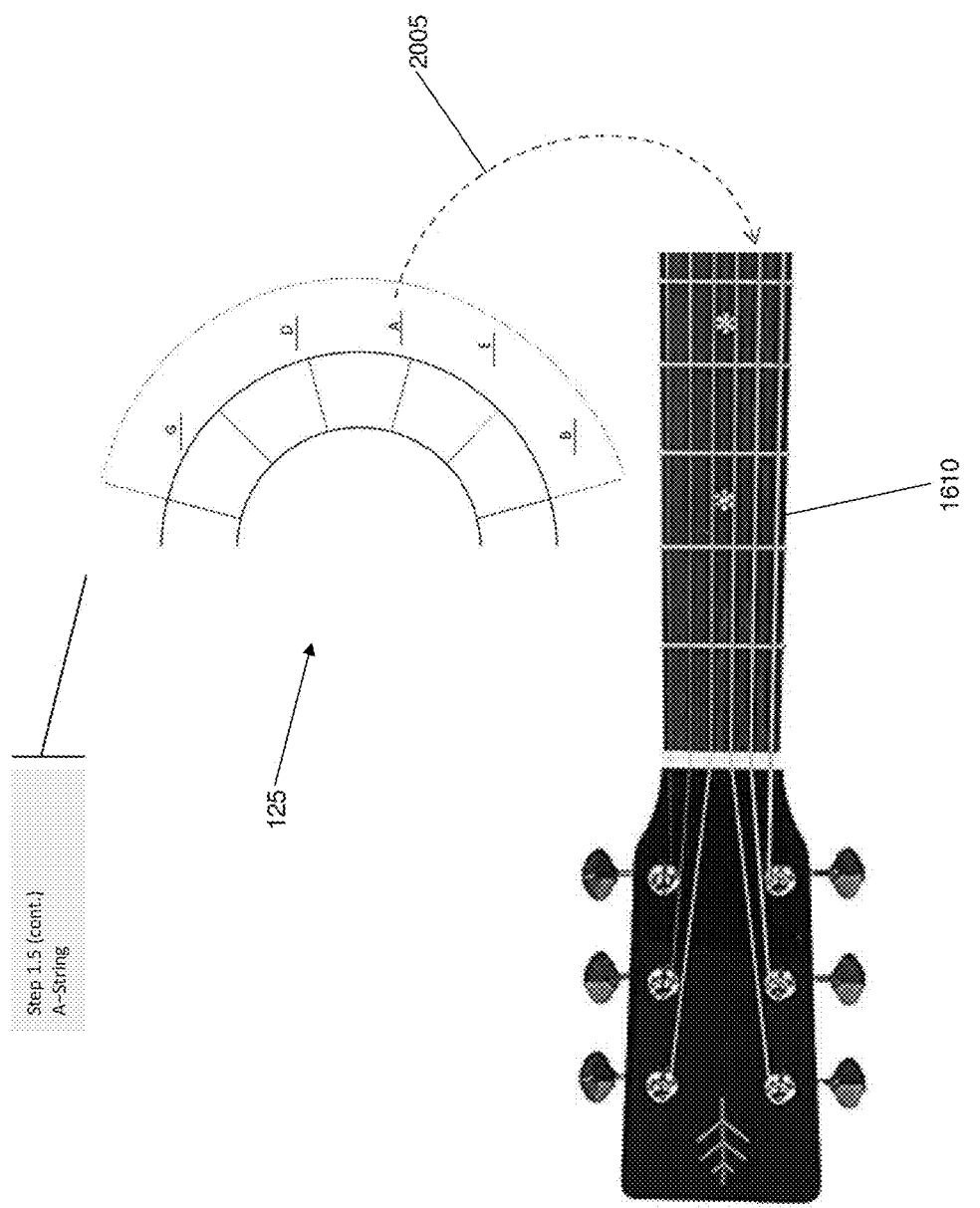

As shown in FIG. 20, the A-string of the guitar 1610 corresponds with the A chord section 145 of the circle of fifths chart 125 (via connecting line 2005). The pictorial connection between the circle of fifths chart 125 and the A-string on a guitar 1610 enables a user to more completely understand how the A chord section 145 of the circle of fifths relates to the A-string on the guitar 1610 in accordance with aspects of the disclosure.

Figure 21:
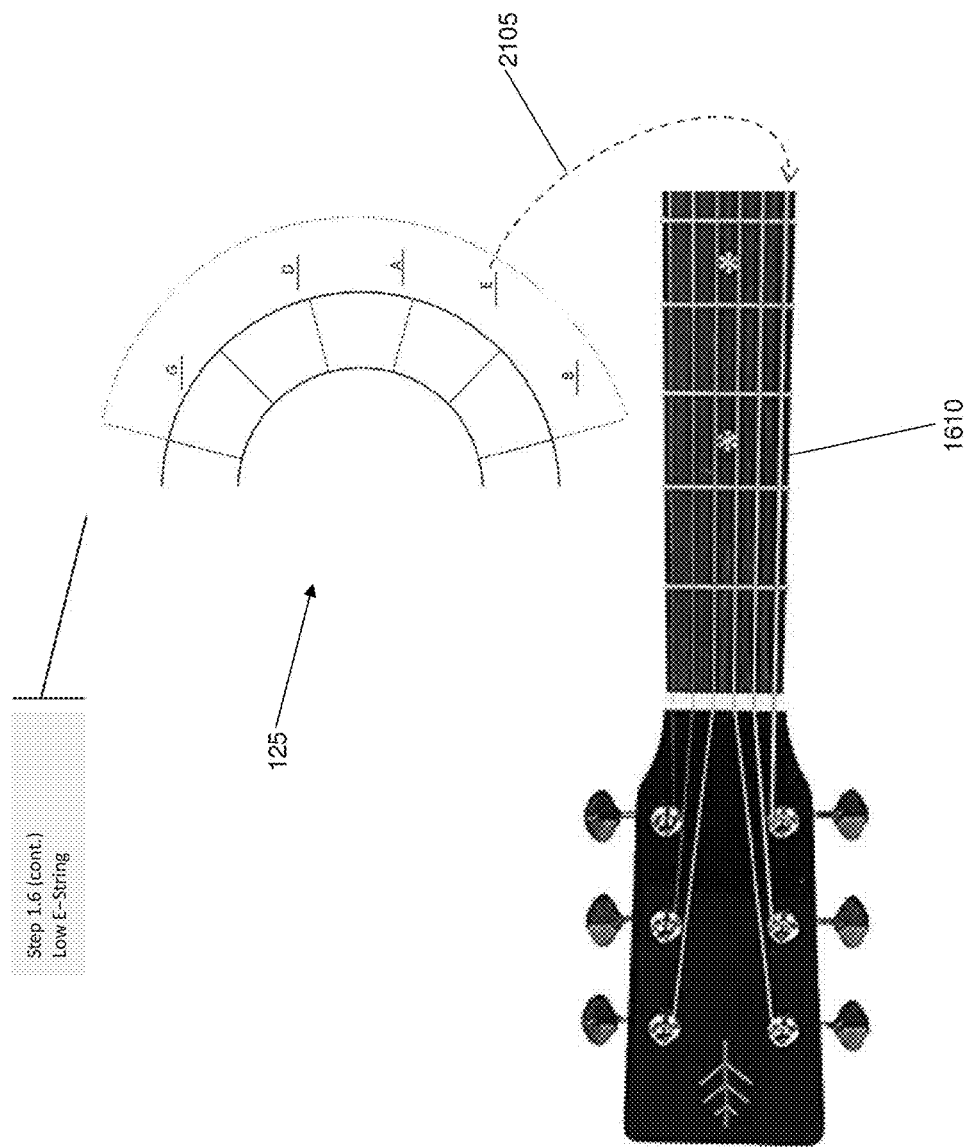

As shown in FIG. 21, the low E-string of the guitar 1610 also corresponds with the E chord section 145 of the circle of fifths chart 125 (via connecting line 2105). The pictorial connection between the circle of fifths chart 125 and the low E-string on a guitar 1610 enables a user to more completely understand how the E chord section 145 of the circle of fifths relates to the low E-string on the guitar 1610 in accordance with aspects of the disclosure.

Figure 22:
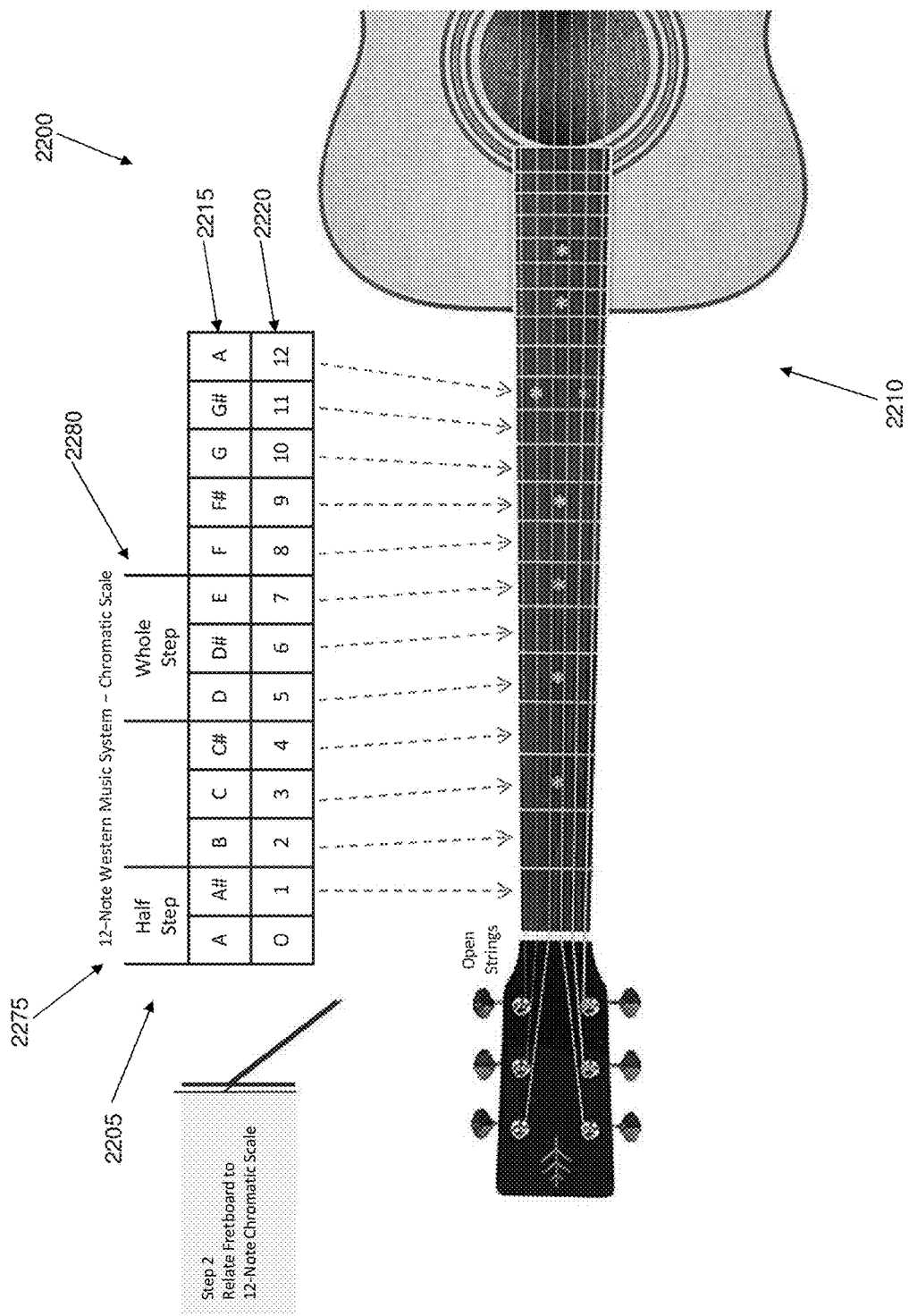
FIG. 22 shows an exemplary fretboard/scale visual aid showing relations between a fretboard for an exemplary string of a guitar (e.g., an A-string) in standard tuning to the 12-note chromatic scale in accordance with aspects of the disclosure.

FIG. 22 shows an exemplary fretboard/scale visual aid 2200 showing relations between a fretboard for an exemplary string of a guitar (e.g., an A-string) in standard tuning to the 12-note chromatic scale in accordance with aspects of the disclosure. In embodiments, the fretboard/scale visual aid 2200 (or portions thereof) may be completed by a user as a musical education aid. In some embodiments, the fretboard/scale visual aid 2200 may be implemented as a user aid that is completed (or filled in) automatically as a musical education aid.

As shown in FIG. 22, the exemplary fretboard/scale visual aid 2200 may include a fret/note correlation chart 2205 and guitar fretboard display 2210. The fret/note correlation chart 2205 includes a note row 2215, which includes all of the notes of the 12-note chromatic scale (and then repeats the first note) for a particular string. Thus, as shown in FIG. 22, the note row 2215 includes:

A-A #-B-C-C #-D-D #-E-F-F #-G-G #-A

The fret/note correlation chart 2205 also includes a fret row 2220, which includes a numerical indicator of the fret of the guitar for the open string (or "O" fret) and the first 12 frets of the guitar. Thus, as shown in FIG. 22, the fret row 2220 includes:

O-1-2-3-4-5-6-7-8-9-10-11-12

Additionally, as shown in FIG. 22, the fret/note correlation chart 2205 includes an exemplary half-step marker 2275 and an exemplary whole step marker 2280. As shown in FIG. 22, the half-step marker 2275 visually depicts a half-step interval from a first note (or fret) to the immediately adjacent note (or fret) in either direction. In contrast, the whole-step marker 2280 visually depicts a whole-step interval from a first note (or fret) to a second note (or fret) two away from the first note (or fret) in either direction. In accordance with aspects of the disclosure, the exemplary fretboard/scale visual aid 2200 relates the chromatic scale to the guitar frets independent of any particular string (with this exemplary embodiment, it happens to relate to the A-string).

Figure 23:
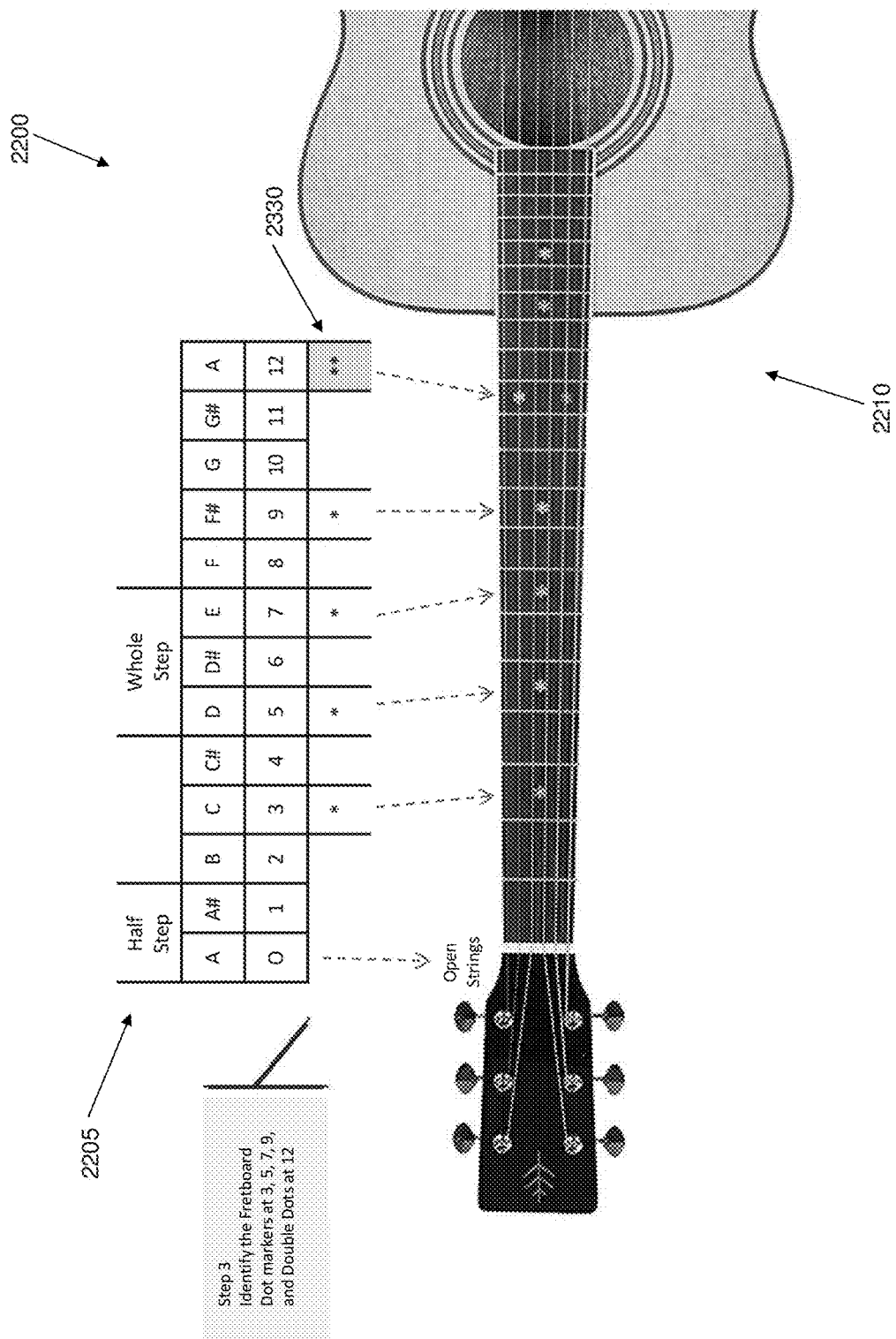
FIG. 23 shows an exemplary depiction of relating the fretboard dot markers of the guitar to the 12-note chromatic scale in a guitar theory mapping in accordance with aspects of the disclosure.

FIG. 23 shows an exemplary depiction of relating the fretboard dot markers of the guitar to the 12-note chromatic scale in a guitar theory mapping in accordance with aspects of the disclosure. As shown in FIG. 23, the fret/note correlation chart 2205 of the fretboard/scale visual aid 2200 is expanded to further include a fretboard dot row 2330, which includes the fretboard dots arranged at the appropriate frets, in accordance with the arrangement on the guitar fretboard display 2210. Thus, as shown in FIG. 23, the fretboard dot row 2330 includes a single dot marker at the 3$^{rd}$, 5$^{th}$, 7$^{th}$, and 9$^{th}$ frets and a double dot marker at the 12$^{th}$ fret in accordance with the arrangement on the guitar fretboard display 2210.

Figure 24:
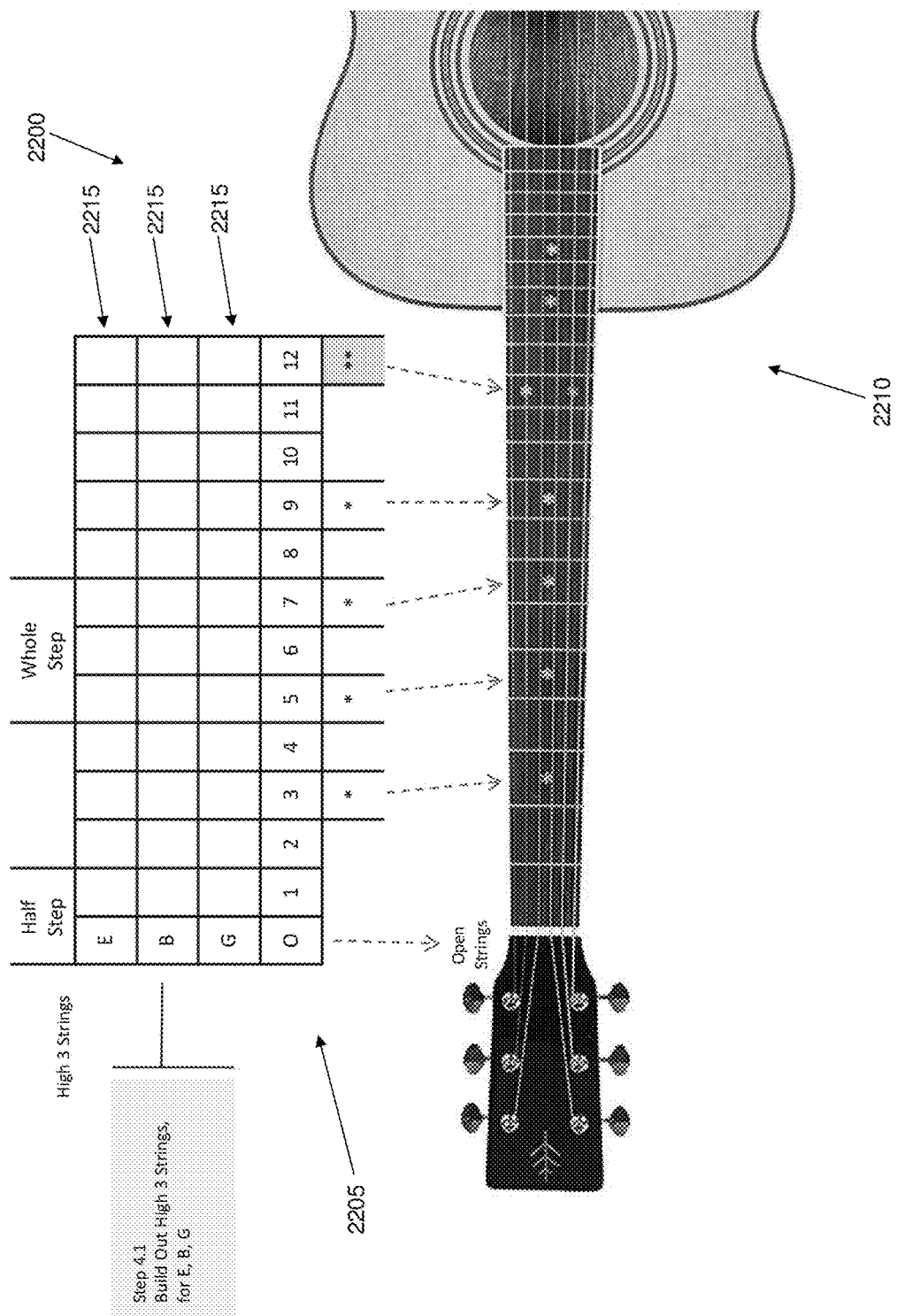
FIG. 24 shows an exemplary depiction of relating the fretboard of a guitar in standard tuning to the 12-note chromatic scale in accordance with aspects of the disclosure.

FIG. 24 shows an exemplary depiction of relating the fretboard of a guitar in standard tuning to the 12-note chromatic scale in accordance with aspects of the disclosure. As shown in FIG. 24, the fret/note correlation chart 2205 of the fretboard/scale visual aid 2200 is modified to include note rows 2215 for the three high strings of the guitar, i.e. the high E-string, the B-string, and the G-string (in lieu of the notes of the A-string). As noted above, in embodiments, the fretboard/scale visual aid 2200 (or portions thereof) may be completed by a user as a musical education aid. Thus, each of the entry fields of the fret/note correlation chart 2205 may be user fillable fields. In such a manner, in accordance with aspects of the disclosure, the exemplary fretboard/scale visual aid 2200 educates a user on the relationship of the chromatic scale to the guitar frets independent of any particular string.

Figure 25:
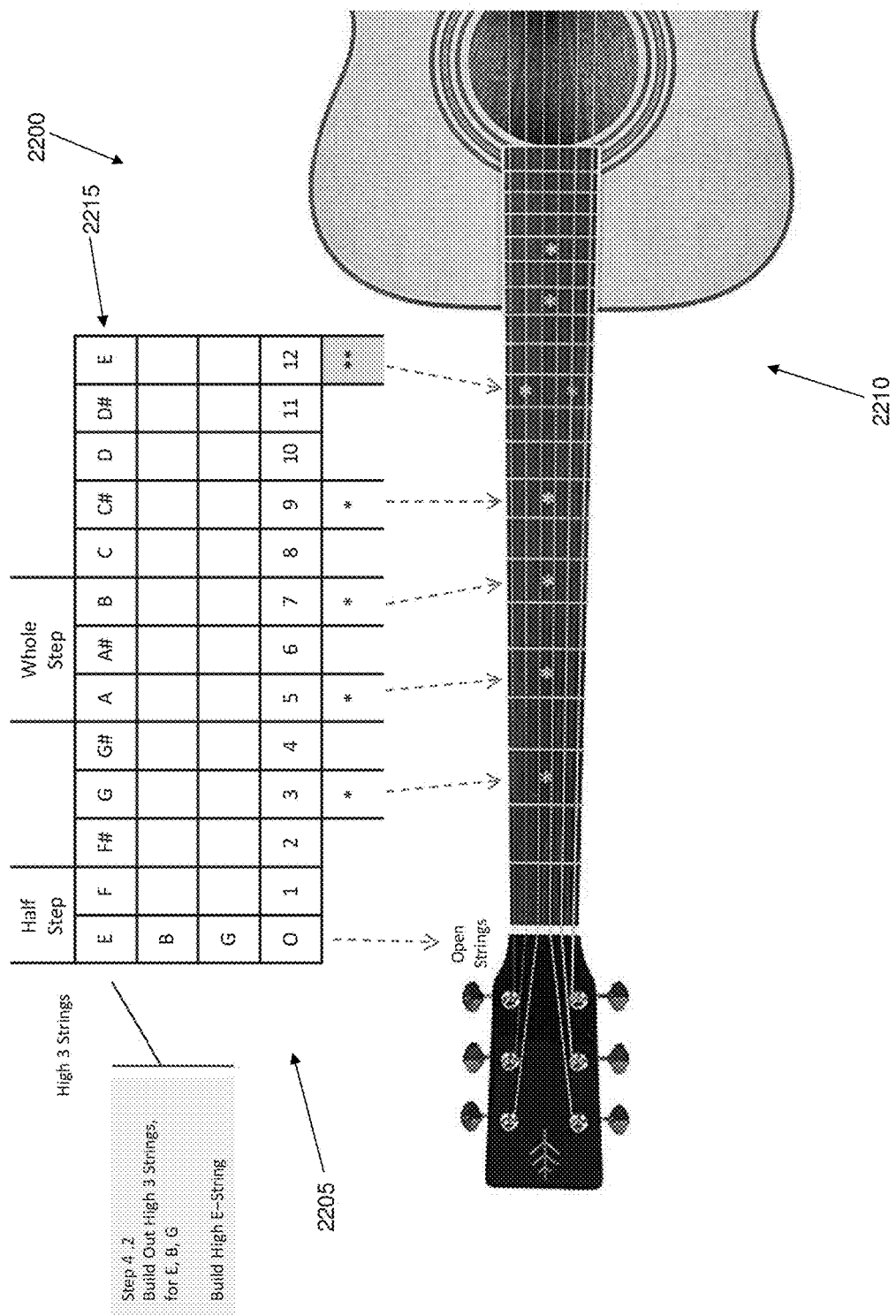
FIGS. 25-27 show exemplary depictions of the fret/note correlation chart of the fretboard/scale visual aid being completed (or filled in) for the three high strings of a guitar in standard tuning to the 12-note chromatic scale in accordance with aspects of the disclosure.
Figure 26:
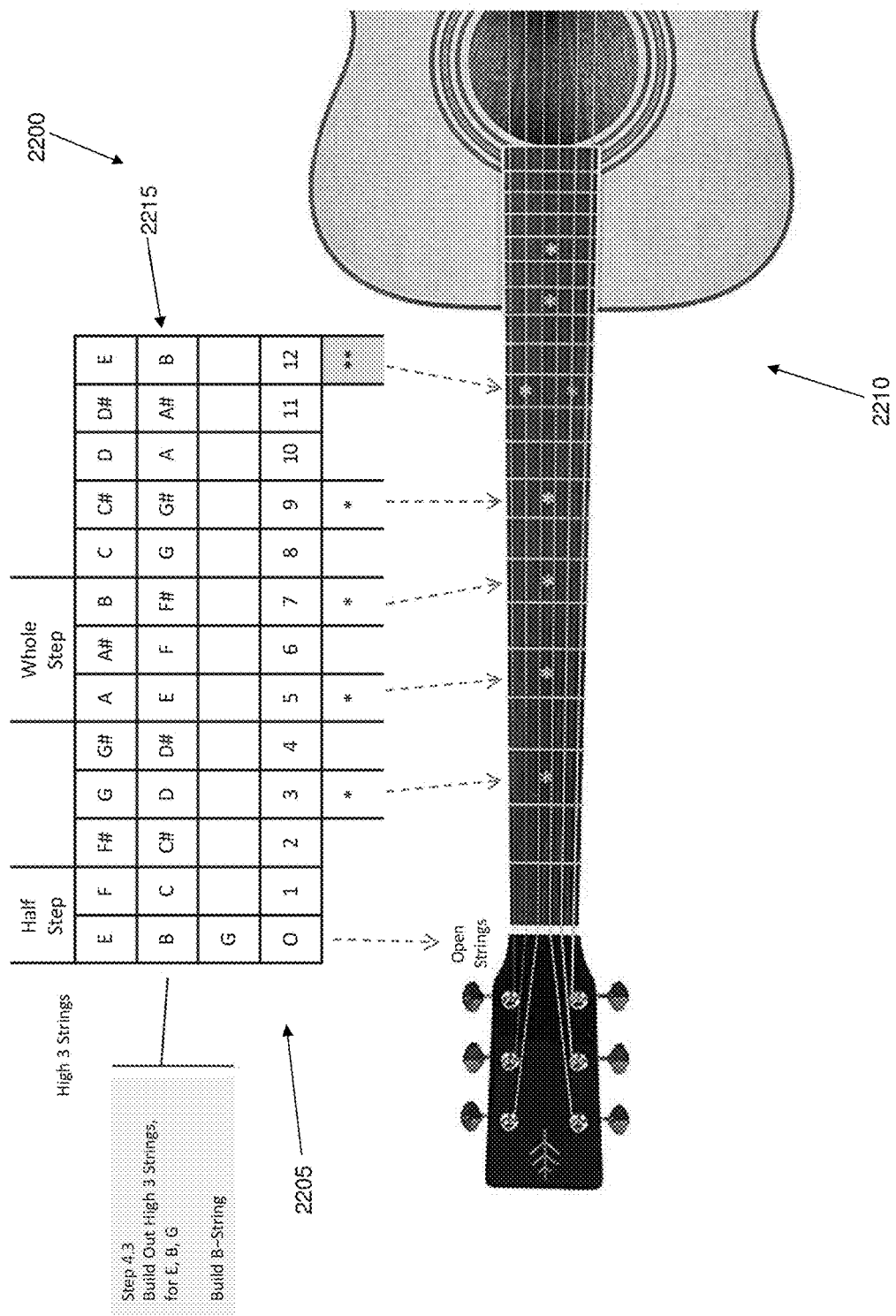
Figure 27:
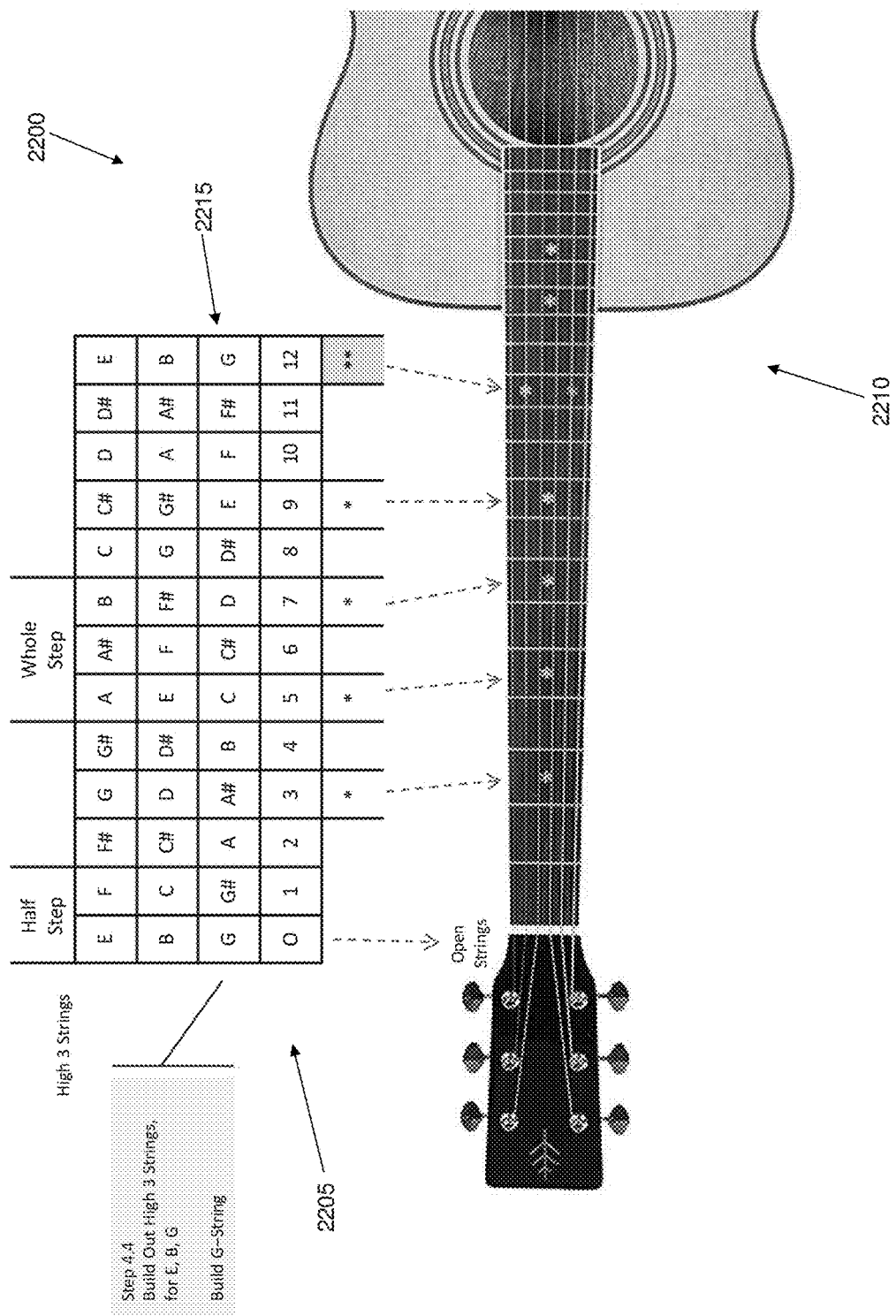

FIGS. 25-27 show exemplary depictions of the fret/note correlation chart 2205 of the fretboard/scale visual aid 2200 being completed (or filled in) for the three high strings of a guitar in standard tuning to the 12-note chromatic scale in accordance with aspects of the disclosure. As shown in FIG. 25, the note row 2215 for the high E-string of the guitar is completed (or filled in). Thus, as shown in FIG. 25, the note row 2215 for the high E-string includes:

E-F-F #-G-G #-A-A #-B-C-C #-D-D #-E

As shown in FIG. 26, the note row 2215 for the B-string of the guitar is completed (or filled in). As noted above, in embodiments, the note row 2215 (or portions thereof) may be completed by a user as a musical education aid. Thus, as shown in FIG. 26, the note row 2215 for the B string includes:

B-C-C #-D-D #-E-F-F #-G-G #-A-A #-B

As shown in FIG. 27, the note row 2215 for the G-string of the guitar is completed (or filled in). As noted above, in embodiments, the note row 2215 (or portions thereof) may be completed by a user as a musical education aid. Thus, as shown in FIG. 27, the note row 2215 for the G string includes:

G-G #-A-A #-B-C-C #-D-D #-E-F-F #-G In such a manner, in accordance with aspects of the disclosure, the exemplary fretboard/scale visual aid 2200 educates a user on the relationship of the chromatic scale to the guitar frets for the three high strings of a guitar in standard tuning. As discussed below, using these three high strings (e.g., only these three high strings) a player can easily create and play major chords and minor chords.

Figure 28:
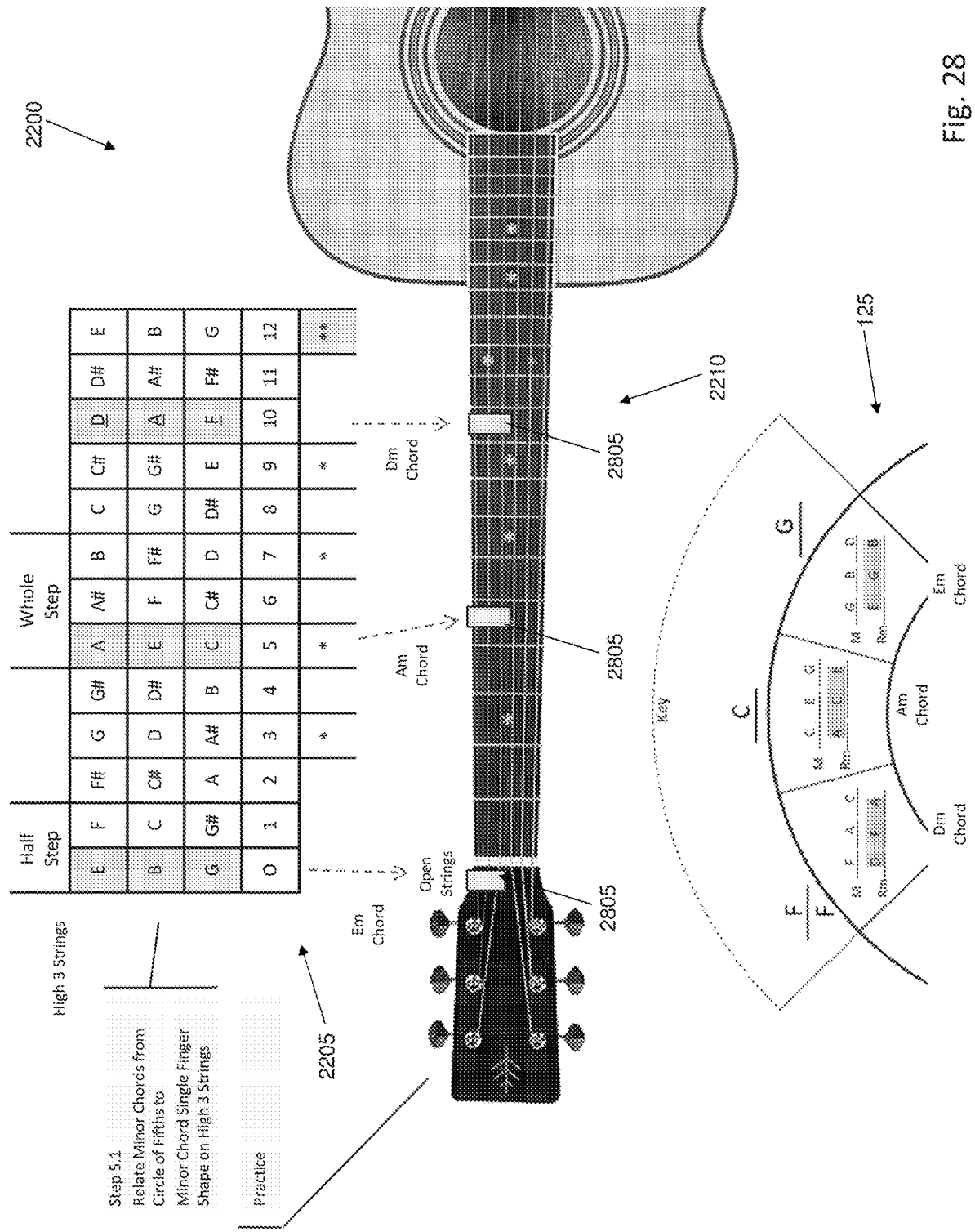
FIG. 28 shows an exemplary depiction of relating minor chords from the circle of fifths to a minor chord shape on the three high strings of a guitar playable with a single finger in accordance with aspects of the disclosure.

FIG. 28 shows an exemplary depiction of relating minor chords from the circle of fifths to a minor chord shape on the three high strings of a guitar in accordance with aspects of the disclosure. As shown in FIG. 28, the fretboard/scale visual aid 2200 is expanded to further include a portion of the circle of fifths chart 125. As shown in FIG. 28, the minor chord shape 2805 is a linear shape across the three high strings at a same fret. As the chord shape 2805 is a linear shape, a user can form this chord shape with a single finger.

Thus, with the minor chord shape 2805 at the zero fret, as shown in the fret/note correlation chart 2205, the actuated notes are E, B, and G. As can be observed in FIG. 28, these notes (E, B, and G) are the relative minor notes identified in the G chord section 145 of the circle of fifths chart 125 and form the E minor chord. Thus, the fretboard/scale visual aid 2200 of FIG. 28 is operable to relate minor chords from the circle of fifths to a minor chord shape on the three high strings of a guitar in accordance with aspects of the disclosure.

As also shown in FIG. 28, with the minor chord shape 2805 at the fifth fret, as shown in the fret/note correlation chart 2205, the actuated notes are A, E, and C. As can be observed in FIG. 28, these notes (A, E, and C) are the relative minor notes identified in the C chord section 145 of the circle of fifths chart 125, and form the A minor chord. Furthermore, as shown in FIG. 28, with the minor chord shape 2805 at the tenth fret, as shown in the fret/note correlation chart 2205, the actuated notes are D, A, and F. As can be observed in FIG. 28, these notes (D, A, and F) are the relative minor notes identified in the F chord section 145 of the circle of fifths chart 125, and form the D minor chord. Thus, in accordance with aspects of the disclosure the fretboard/scale visual aid 2200 of the present disclosure teaches the relations of minor chords from the circle of fifths to a minor chord shape on the three high strings of a guitar. Additionally, in accordance with one of the main features of the present teaching methodology, this chord can be played with one finger.

Figure 29A:
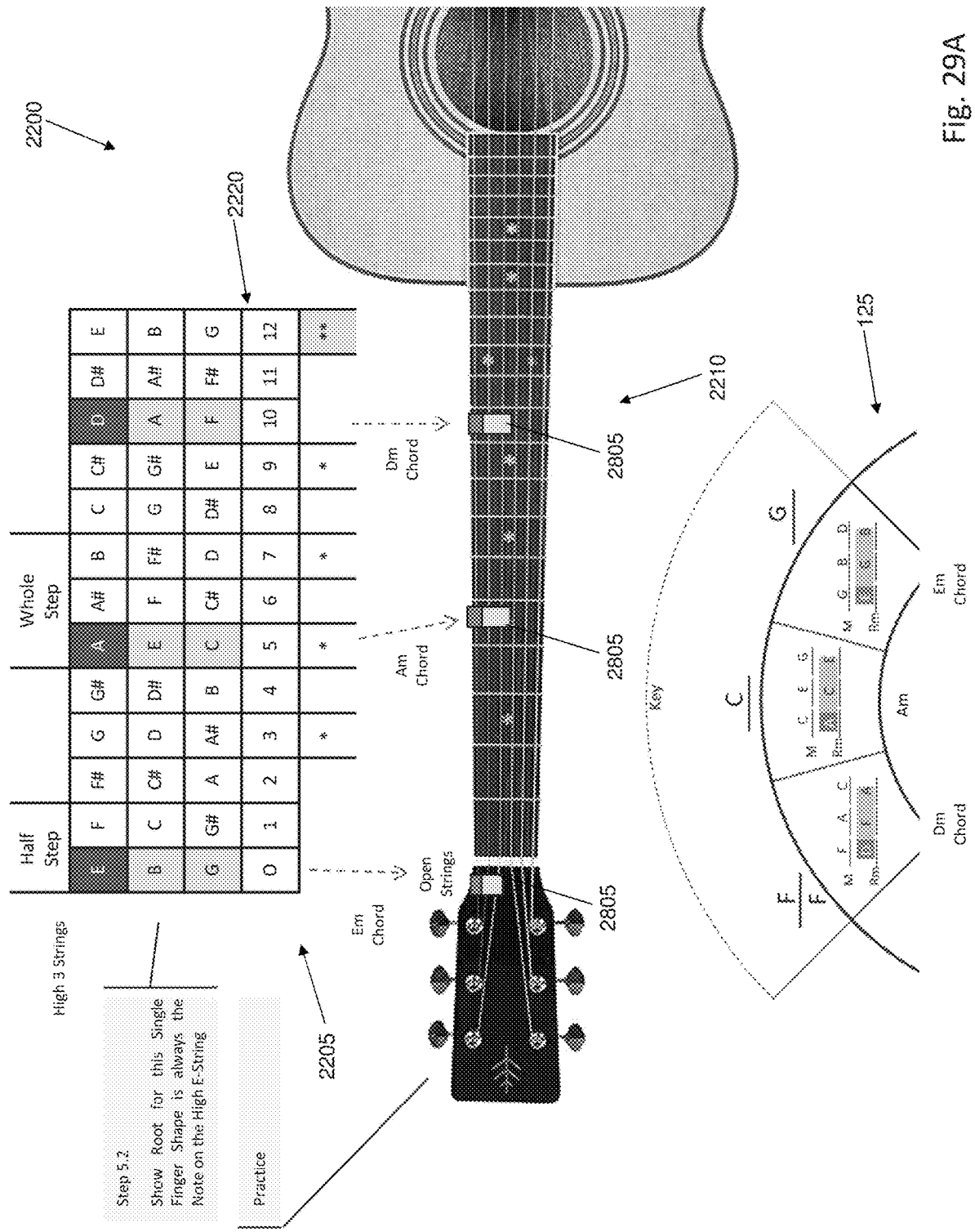
FIG. 29A shows an exemplary depiction of the relation between the root of the minor chord shape and the high E-string of the guitar in accordance with aspects of the disclosure.

FIG. 29A shows an exemplary depiction of the relation between the root of the minor chord shape and the high E-string of the guitar in accordance with aspects of the disclosure. As shown in FIG. 29A, the root note for this minor chord shape 2805 is always on the high E-string. For example, as shown in the fret/note correlation chart 2205, with the minor chord shape 2805 at the zero fret (thus actuating an E minor chord), the actuated note on the high E-string is an E, which is the root of the E minor chord (as indicated in the G chord section 145 of the circle of fifths chart 125).

Likewise, with the minor chord shape 2805 at the fifth fret (thus actuating an A minor chord), as shown in the fret/note correlation chart 2205, the actuated notes on the high E-string is an A, which is the root of the A minor chord (as indicated in C chord section 145 of the circle of fifths chart 125). Furthermore, with the minor chord shape 2805 at the tenth fret (thus actuating a D minor chord), as shown in the fret/note correlation chart 2205, the actuated note on the high E-string is a D, which is the root of the D minor chord (as indicated in the F chord section 145 of the circle of fifths chart 125).

Figure 29B:
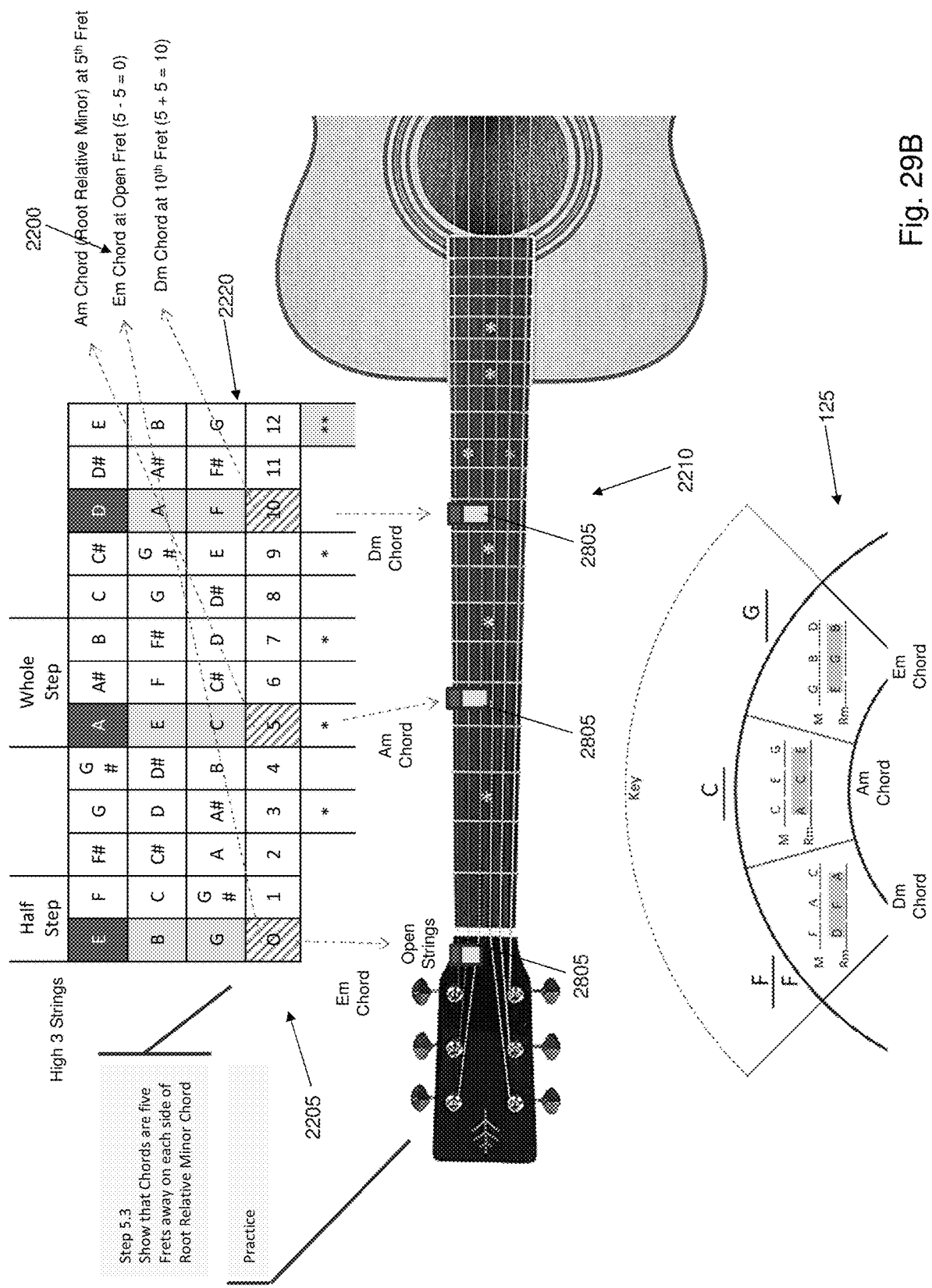
FIG. 29B shows an exemplary depiction of relations between a root chord (e.g., Am chord) position using the minor chord shape and positions of other chords in key using the minor chord shape in accordance with aspects of the disclosure.

FIG. 29B shows an exemplary depiction of relations between a root chord (e.g., Am chord) position using the minor chord shape and positions of other chords in key using the minor chord shape in accordance with aspects of the disclosure. As shown in FIG. 29B, the other chords in key are each five frets away on each side of a root chord. That is, with the Am chord as the root chord, the other chords in key (i.e., the Dm chord and the Gm chord) are each five frets away on each side of a root chord.

Figure 30A:
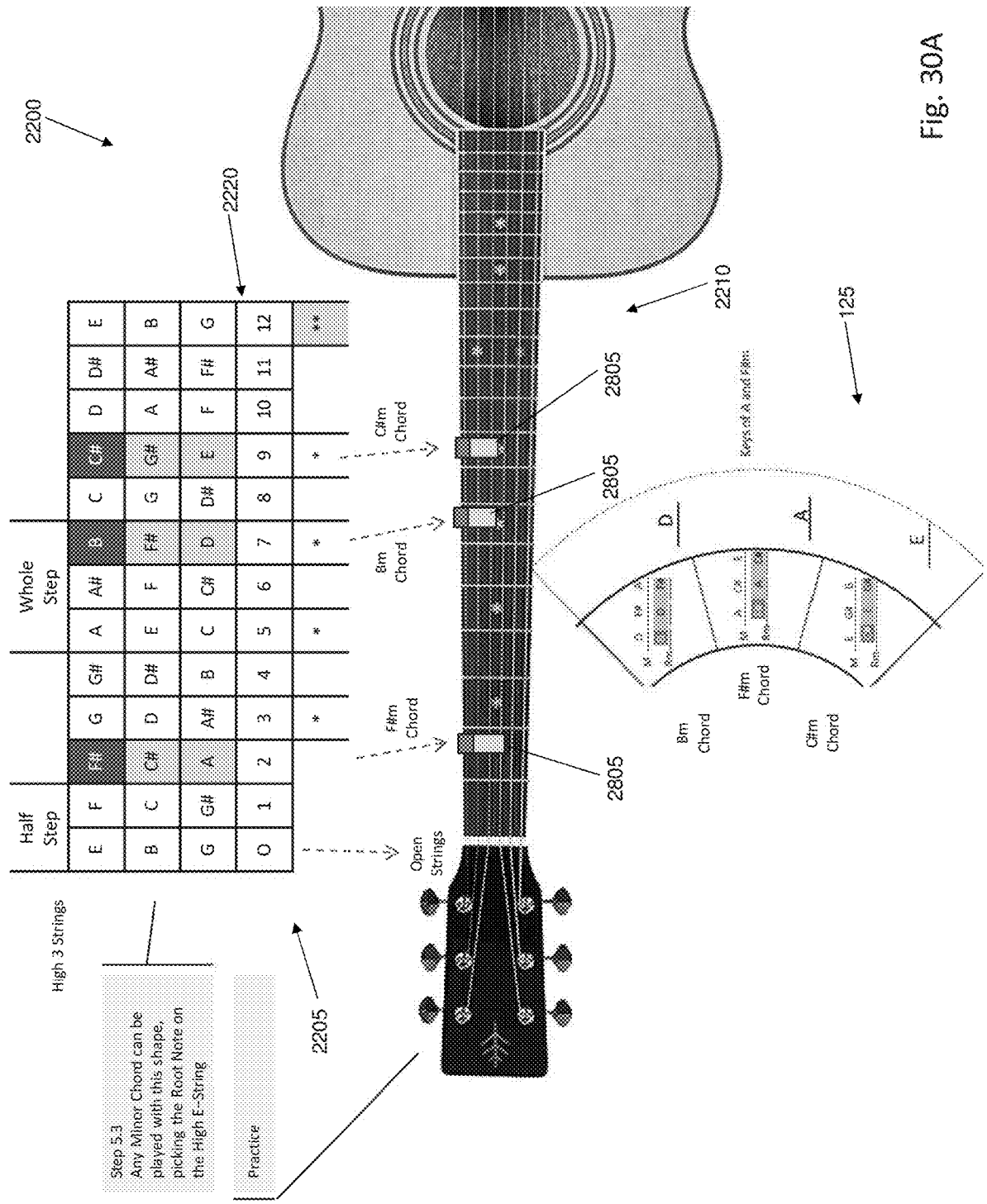
FIG. 30A shows an exemplary depiction of how the minor chord shape (with its root note on the high E-string) may be used to play any minor chord in accordance with aspects of the disclosure.

FIG. 30A shows an exemplary depiction of how the minor chord shape (with its root note on the high E-string) may be used to play any minor chord in accordance with aspects of the disclosure. That is, the fretboard/scale visual aid 2200 is operable to relate minor chords from the circle of fifths to a minor chord shape on the three high strings of a guitar so as to play any minor chord in accordance with aspects of the disclosure. Thus, with the minor chord shape 2805 at the second fret, as shown in the fret/note correlation chart 2205, the actuated notes are F #, C #, and A. As can be observed in FIG. 30, these notes (F #, C #, and A) are the relative minor notes identified in the A chord section 145 of the circle of fifths chart 125, and form the F # minor chord. Additionally, as shown in the fret/note correlation chart 2205, the actuated note on the high E-string is an F #, which is the root of the F # minor chord (as indicated in the A chord section 145 of the circle of fifths chart 125).

As a further example, with the minor chord shape 2805 at the seventh fret, as shown in the fret/note correlation chart 2205, the actuated notes are B, F #, and D. As can be observed in FIG. 30, these notes (B, F #, and D) are the relative minor notes identified in the D chord section 145 of the circle of fifths chart 125, and form the B minor chord. Additionally, as shown in the fret/note correlation chart 2205, the actuated note on the high E-string is a B, which is the root of the B minor chord (as indicated in the D chord section 145 of the circle of fifths chart 125).

As yet a further example, with the minor chord shape 2805 at the ninth fret, as shown in the fret/note correlation chart 2205, the actuated notes are C #, G #, and E. As can be observed in FIG. 30, these notes (C #, G #, and E) are the relative minor notes identified in the E chord section 145 of the circle of fifths chart 125, and form the C # minor chord. Additionally, as shown in the fret/note correlation chart 2205, the actuated note on the high E-string is a C #, which is the root of the C # minor chord (as indicated in the E chord section 145 of the circle of fifths chart 125). Thus, in accordance with aspects of the disclosure, the fretboard/scale visual aid 2200 is operable to relate minor chords from the circle of fifths to a minor chord shape on the three high strings of a guitar so as to educate a guitar player to play any minor chord in accordance with aspects of the disclosure.

Figure 30B:
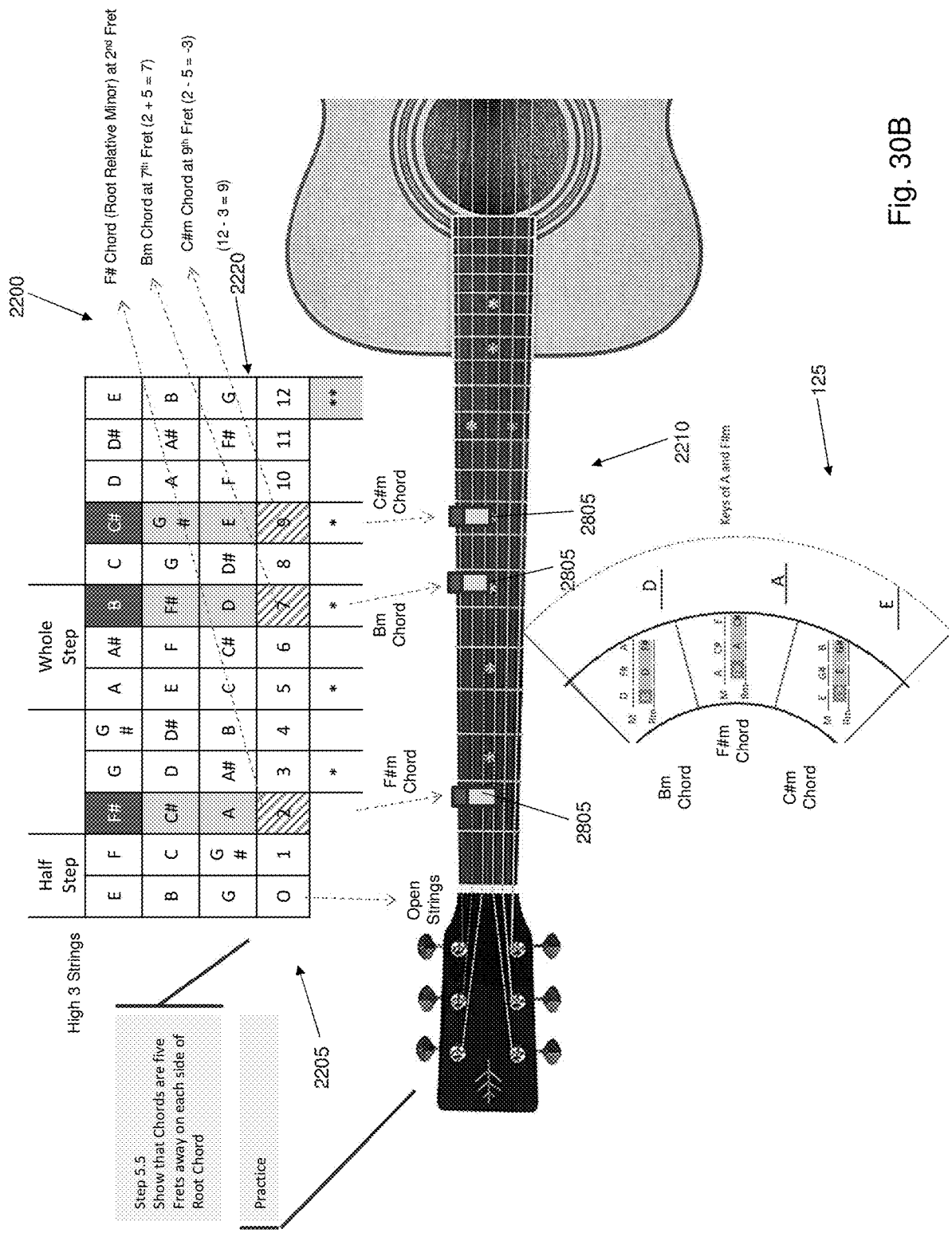
FIG. 30B shows an exemplary depiction of relations between a root chord (e.g., Fm chord) position using the minor chord shape and positions of other chords in key using the minor chord shape in accordance with aspects of the disclosure.

FIG. 30B shows an exemplary depiction of relations between a root chord (e.g., Fm chord) position using the minor chord shape and positions of other chords in key using the minor chord shape in accordance with aspects of the disclosure. As shown in FIG. 30B, the other chords in key are each five frets away on each side of a root chord. That is, with the Fm chord as the root chord, the other chords in key (i.e., the Bm chord and the C # m chord) are each five frets away on each side of a root chord.

Figure 30C:
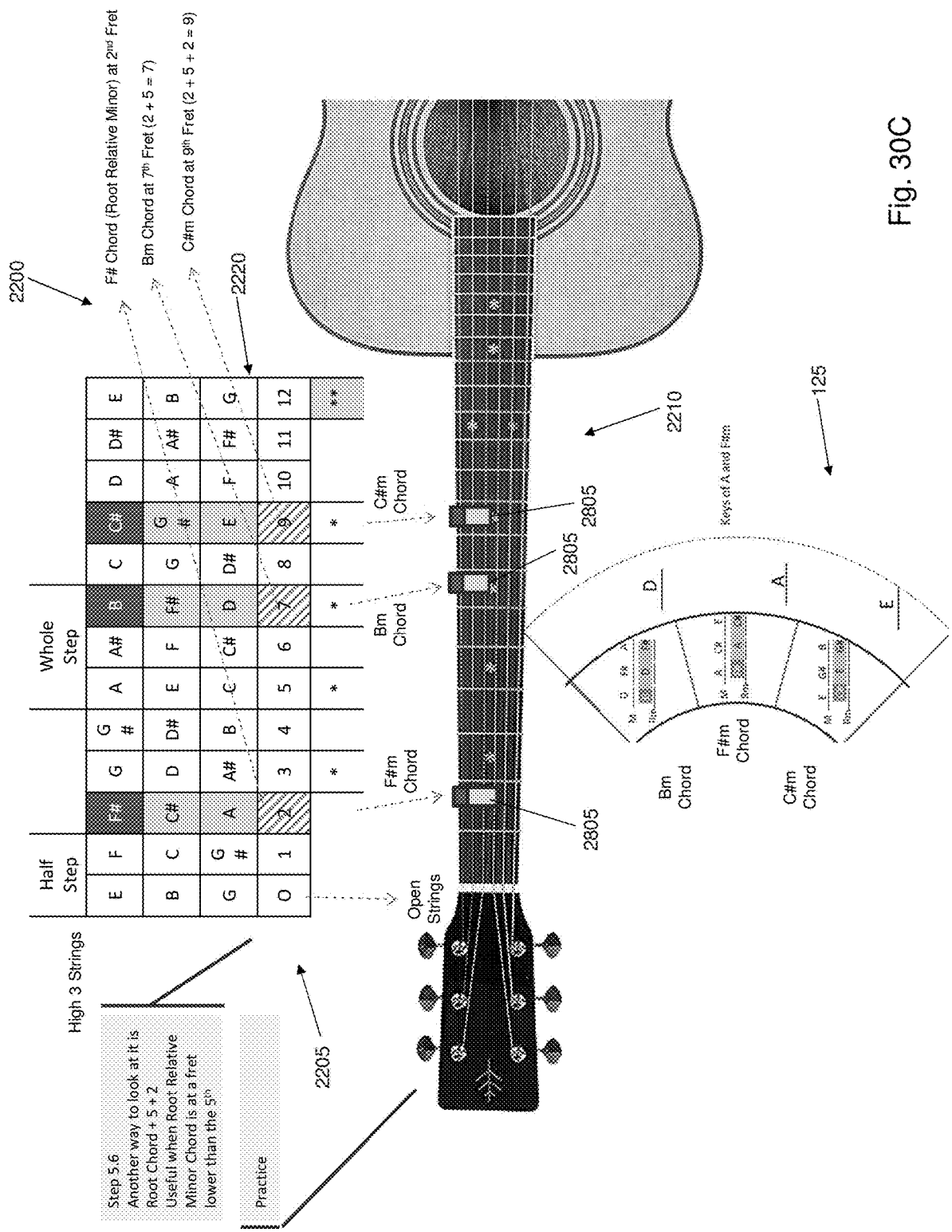
FIG. 30C shows an exemplary depiction of additional relations between a root chord (e.g., Fm chord) position using the minor chord shape and positions of other chords in key using the minor chord shape in accordance with aspects of the disclosure.

FIG. 30C shows an exemplary depiction of additional relations between a root chord (e.g., Fm chord) position using the minor chord shape and positions of other chords in key using the minor chord shape in accordance with aspects of the disclosure. As shown in FIG. 30C, another way to look at it is Root Chord+5+2. That is, the one chords in key is five frets away on an upper side of a root chord, and the other chord in key is two frets further away on the upper side of the root chord. For example, with the Fm chord as the root chord, the Bm chord is five frets away on the upper side of a root chord, and the C #m chord is two frets further away on the upper side of the root chord. This may be useful when a root relative minor chord is at a fret lower than the 5th fret.

Figure 31:
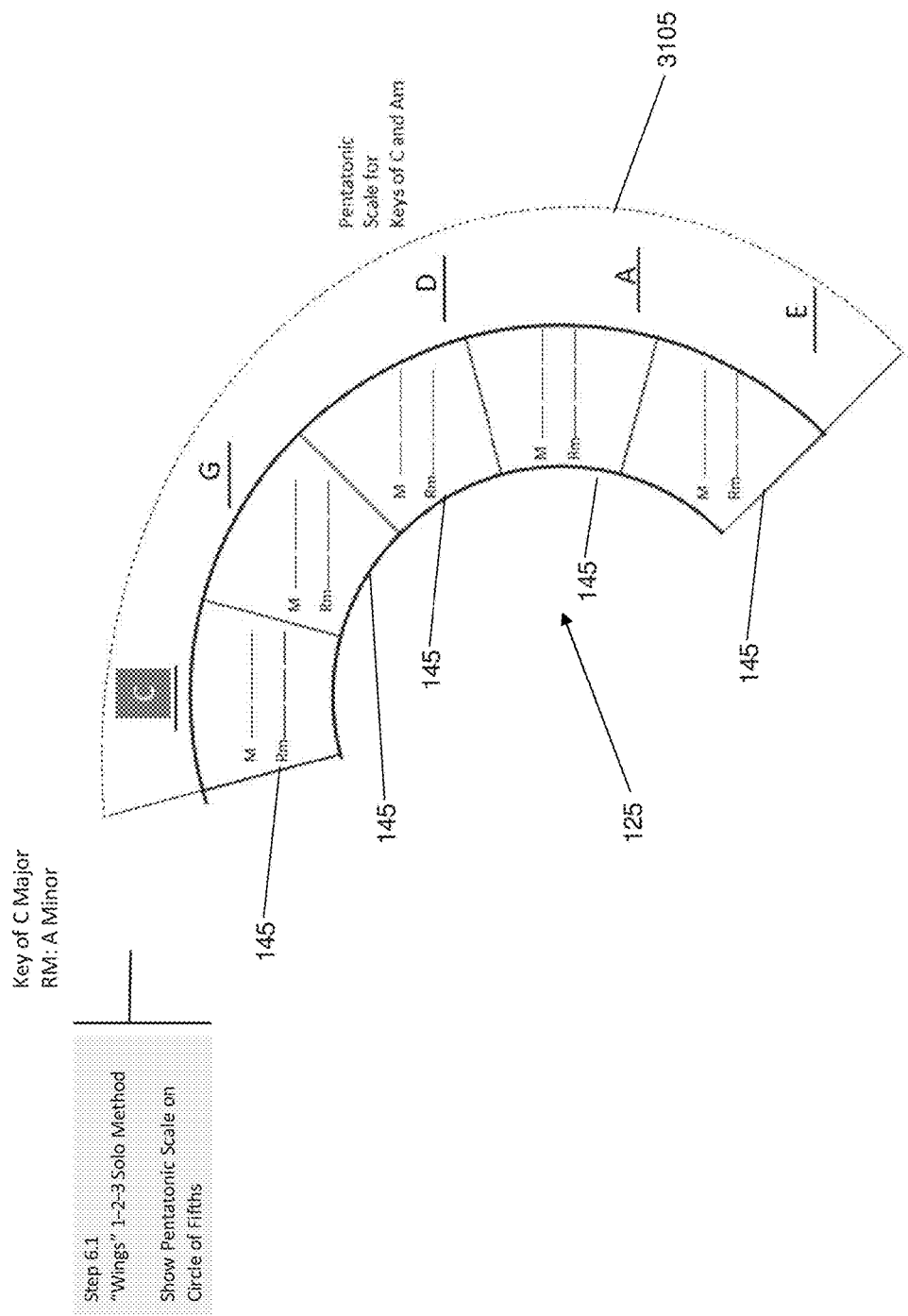
FIG. 31 shows an exemplary depiction of a pentatonic scale on a circle of fifths in the key of C major (having a relative minor of A minor), for example, as part of a "wings" 1-2-3 solo teaching method in accordance with aspects of the disclosure.

FIG. 31 shows an exemplary depiction of a pentatonic scale on a circle of fifths in the key of C major (having a relative minor of A minor), for example, as part of a "wings" 1-2-3 solo teaching method in accordance with additional aspects of the disclosure. As shown in FIG. 31, the "wings" 1-2-3 solo teaching method includes depicting a pentatonic scale on the circle of fifths chart 125. A pentatonic scale is a musical scale with five notes per octave (in contrast to heptatonic scales such as the major scale and minor scale, which have seven notes per octave). The major pentatonic scale may be thought of as a gapped or incomplete major scale, using scale tones 1, 2, 3, 5, and 6 of the major scale.

As shown in FIG. 31, the pentatonic scale is depicted on the circle of fifths chart 125 as any five adjacent chord sections 145. Thus, with the exemplary embodiment of FIG. 31, the pentatonic scale for C major (and its relative minor-A minor) is depicted with a bracket 2105 encompassing these particular five adjacent chord sections 145. As shown in FIG. 31, the notes of these five adjacent chord sections 145 are C, G, D, A, and E, which can be reordered as C, D, E, G, A or scale tones 1, 2, 3, 5, and 6 of the C major scale (and its relative minor—the A minor scale).

Figure 32:
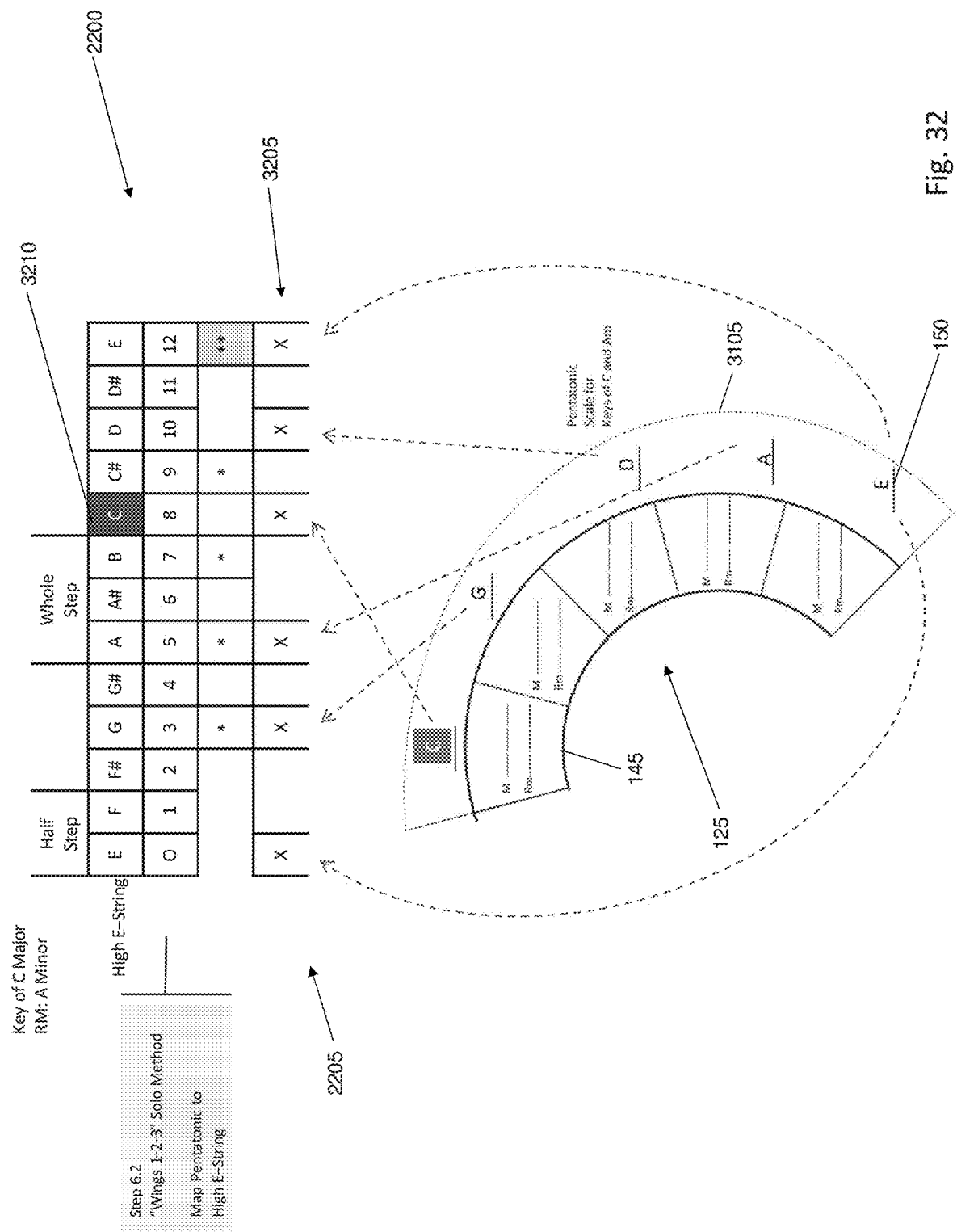
FIGS. 32-35 depict aspects of the "wings" 1-2-3 solo teaching method for the high E-string in accordance with aspects of the disclosure.

FIGS. 32-35 depict aspects of the "wings" 1-2-3 solo teaching method for the high E-string in accordance with additional aspects of the disclosure. As shown in FIG. 32, the pentatonic scale is mapped to the fret/note correlation chart 2205 having a high E-string note row 2215 and modified to further include a pentatonic scale member row 3205. As shown in FIG. 32, for this exemplary embodiment, the C note is indicated as the root note (e.g., using the highlighting 3210 on the high E-string row) indicating the C major scale (and its relative minor—the A minor scale). In accordance with aspects of the disclosure, the pentatonic scale indicated with the bracket 2105 on the circle of fifths chart 125 is mapped to the fret/note correlation chart 2205. Thus, the notes of the five adjacent chord sections 145 indicated with the bracket 2105 (e.g., C, G, D, A, and E) are mapped to the fret/note correlation chart 2205 (e.g., see dashed connecting lines).

In embodiments, a user may fill in user-fillable fields of the fret/note correlation chart 2205 to mark the five notes of the pentatonic scale. In other embodiments, a teaching system may mark the five notes of the pentatonic scale and show a connecting line between the circle of fifths chart 125 and the fret/note correlation chart 2205. In such a manner, in accordance with aspects of the disclosure, the exemplary fretboard/scale visual aid 2200 educates a user on the relationship of the pentatonic scale to the circle of fifths.

Figure 33:
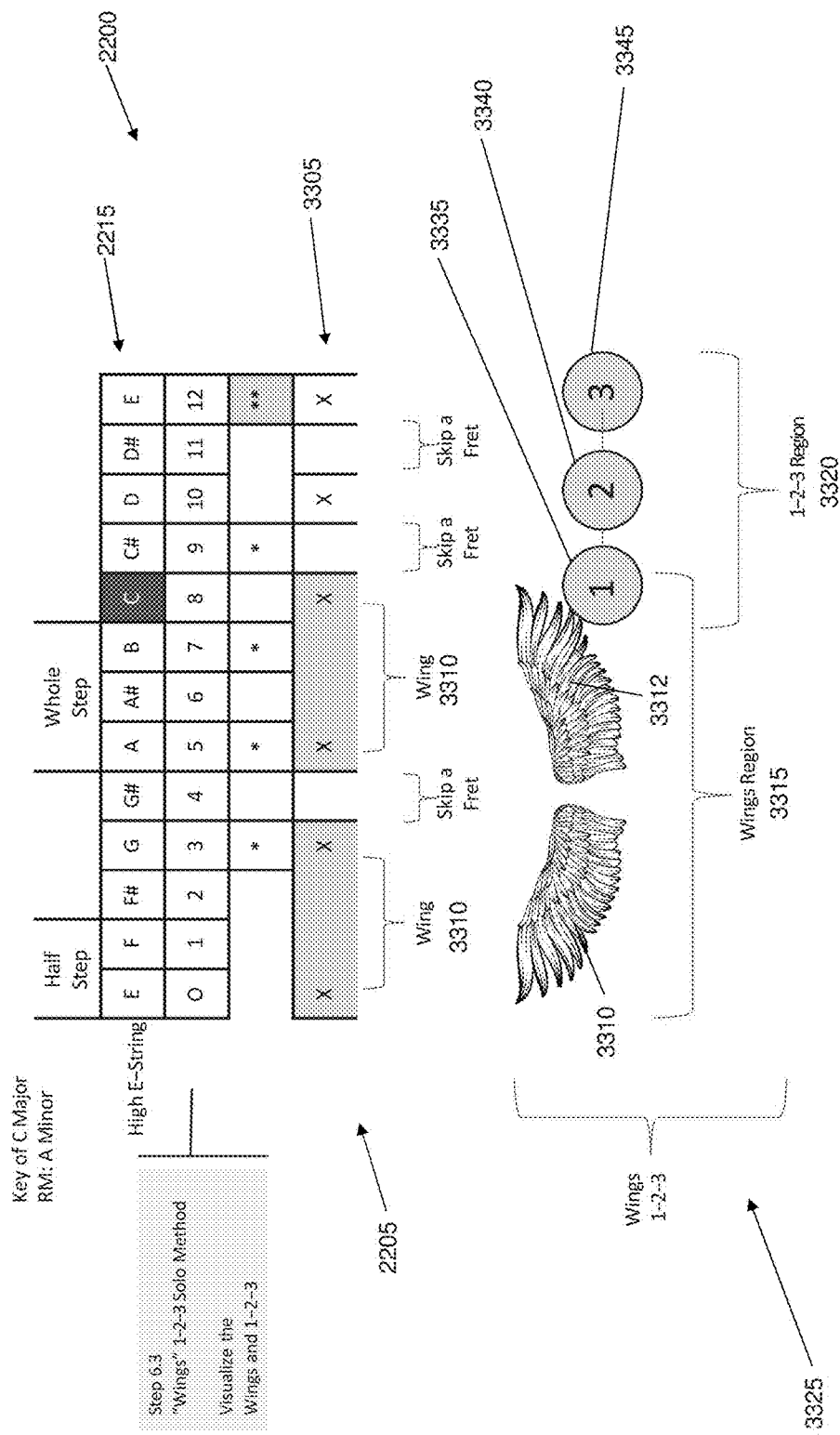

As shown in FIG. 33, in the fret/note correlation chart 2205, includes a "wing" and "1-2-3" region row 3305 (based on the pentatonic scale member row 3205), which identifies the "wings" 3310 and the notes thereof and identifies the notes of the "1-2-3" region (from amongst the notes of the chromatic scale). In accordance with further aspects of the disclosure, FIG. 33 also shows a wings/1-2-3 range visualization 3325, which depicts the "wings" region 3315 (that encompasses the wings 3310) and the "1-2-3" region 3320 and how they relate to each other.

As shown in FIG. 33, the wings region 3315 includes two wings 3310 and 3312. The ends of each wing are three frets apart from each other. Additionally, as shown in FIG. 33, the wings 3310 and 3312 are spaced apart from each other by one fret. The first end of the first wing 3310 is on the zero-fret position (which corresponds to the E note), and the second end of the second wing 3312 is on the eighth fret (which corresponds to the C note, which is the root note).

Additionally, as shown in FIG. 33, the 1-2-3 region 3320 has three notes, e.g., a first note (or "1") 3335, a second note (or "2") 3340, and a third note (or "3") 3345. A single fret is skipped between the first note 3335 and the second note 3340, and a single fret is skipped between the second note 3340 and third note 3345. Also, as shown in FIG. 33, the first note 3335 of the 1-2-3 region 3320, which is on the eighth fret, is the same note as the second end of the second wing 3312, and corresponds to the root note of the C major scale (and its relative minor—the A minor scale).

Figure 34:
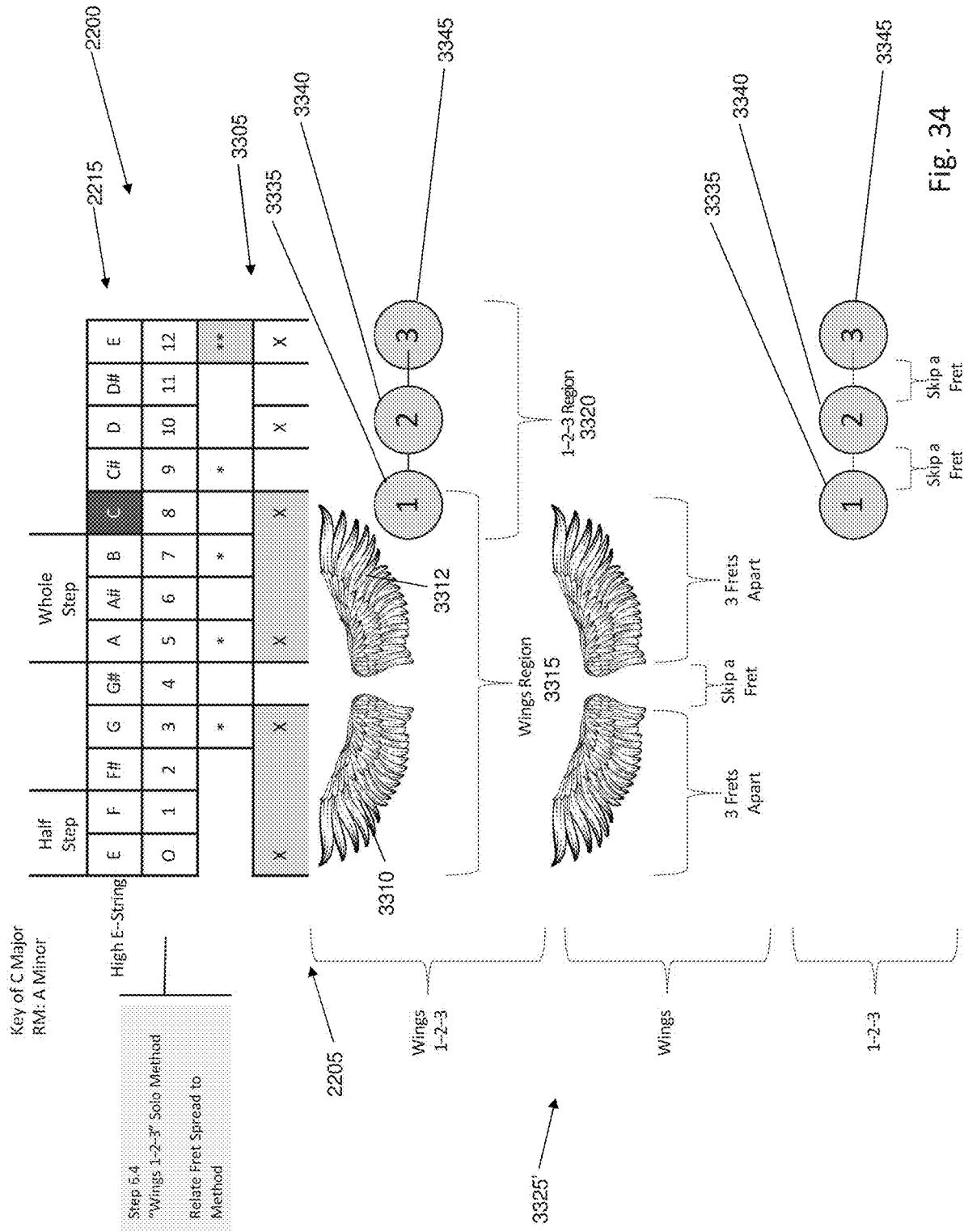

FIG. 34 shows the fret/note correlation chart 2205 as modified to add the "wing" and "1-2-3" region row 3305. In accordance with further aspects of the disclosure, FIG. 34 also shows an expanded wings/1-2-3 range visualization 3325', which depicts the "wings" region 3315 and the "1-2-3" region 3320, the wings 3310 of the "wings" region 3315 and the "1", the "2", and the "3" of the "1-2-3" region 3320, and how they relate to each other. As shown in the expanded wings/1-2-3 range visualization 3325 of FIG. 34, the ends of each wing are three frets apart from each other and the wings 3310 and 3312 are spaced apart from each other by one fret. The first end of the first wing 3310 is on the zero-fret position (which corresponds to the E note), and the second end of the second wing 3312 is on the eighth fret (which corresponds to the root note). Additionally, as shown in FIG. 34, a single fret is skipped between the first note 3335 and the second note 3340, and a single fret is skipped between the second note 3340 and third note 3345 of the "1-2-3" region 3320, and the first note 3335 of the 1-2-3 region 3320 is the same note as the second end of the second wing 3312, and corresponds to the root note of the C major scale (and its relative minor—the A minor scale).

Figure 35:
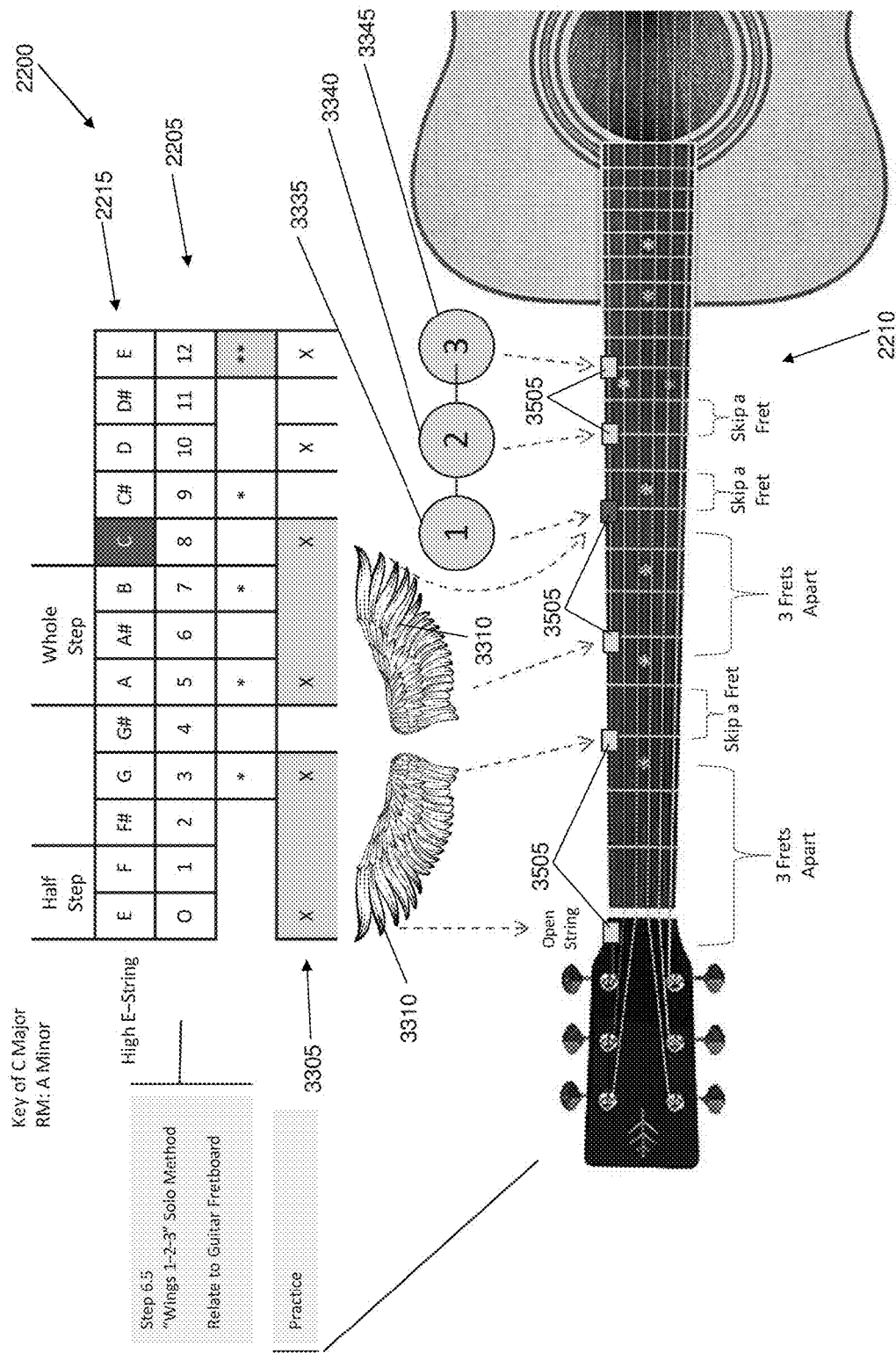

FIG. 35 shows how the wings 3310 and 3312 and the "1-2-3" region 3320 relate to the guitar fretboard in accordance with aspects of the disclosure. As shown in FIG. 35, the guitar fretboard display 2210 includes indicators 3505 on the high-E string for the notes of the wings 3310 and 3312. Thus, as shown in FIG. 35, the first end of the first wing 3310 is on the zero-fret position (which corresponds to the E note) and the second end of the first wing 3310 is three frets apart from the first end (which corresponds to the G note). Additionally, as shown in FIG. 35, the first end of the second wing 3312 (which corresponds to the A note) is spaced apart by one fret from second end of the first wing 3310 and the second end of the second wing 3312 is three frets apart from the first end of the second wing 3312 to be on the eighth fret (which corresponds to the root note—in this example, a C note).

Additionally, as shown in FIG. 35, the guitar fretboard display 2210 also includes indicators 3505 on the high-E string for the notes of the 1-2-3 region. As shown in FIG. 35, the first note 3335 of the 1-2-3 region 3320 is the same note as the second end of the second wing 3312, and corresponds to the root note of the C major scale (and its relative minor—the A minor scale). As is also shown in FIG. 35, a single fret is skipped between the first note 3335 and the second note 3340 of the "1-2-3" region 3320, and a single fret is skipped between the second note 3340 and third note 3345 of the "1-2-3" region 3320. Thus, in accordance with aspects of the disclosure, the indicators 3505 on the guitar fretboard display 2210 of the present disclosure teaches the relative positions of the wings and the 1-2-3 region (and the notes thereof) on the high E-string of a guitar.

Figure 36:
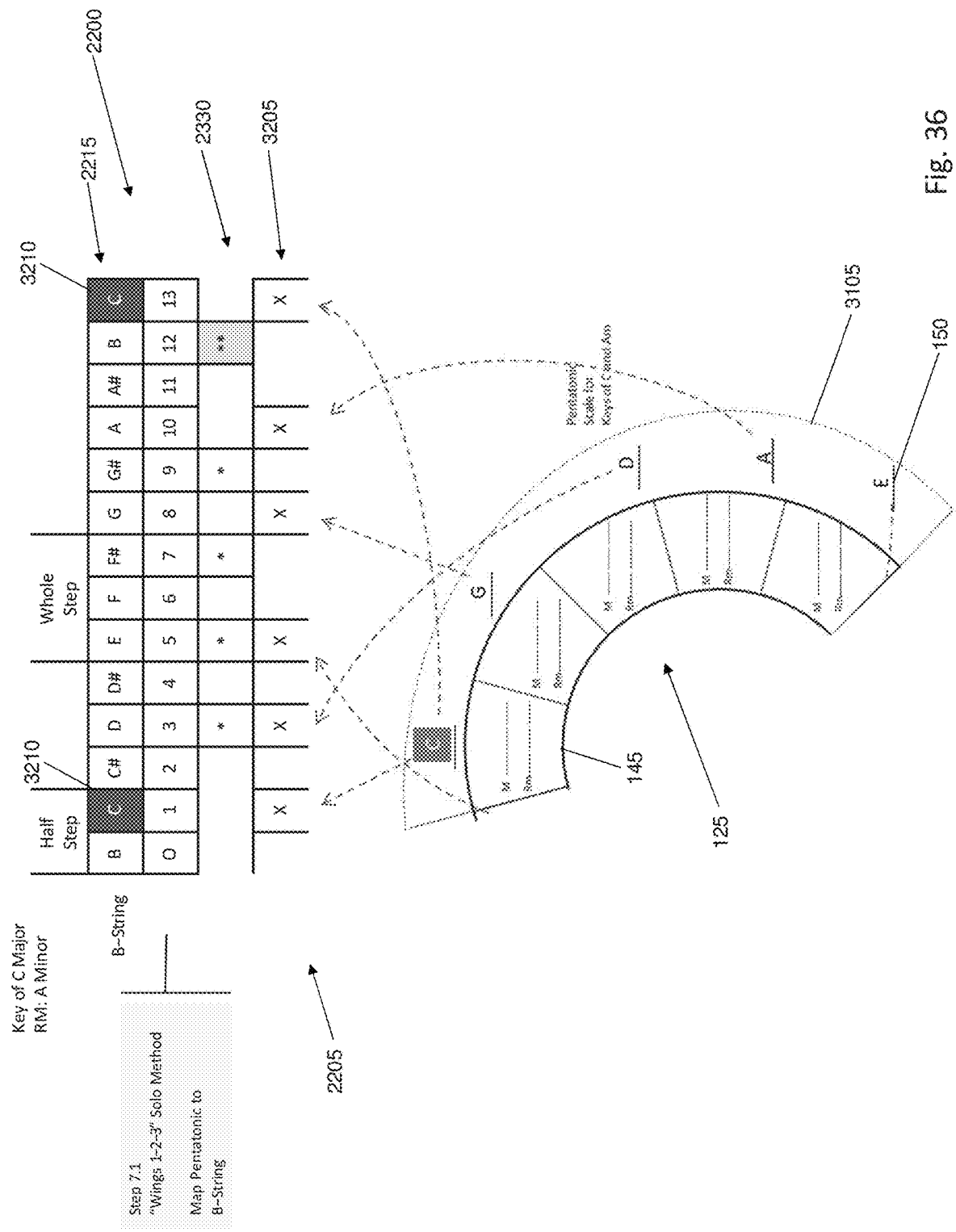
FIGS. 36-38 depict aspects of the "wings" 1-2-3 solo teaching method for the B-string in accordance with aspects of the disclosure.
Figure 37:
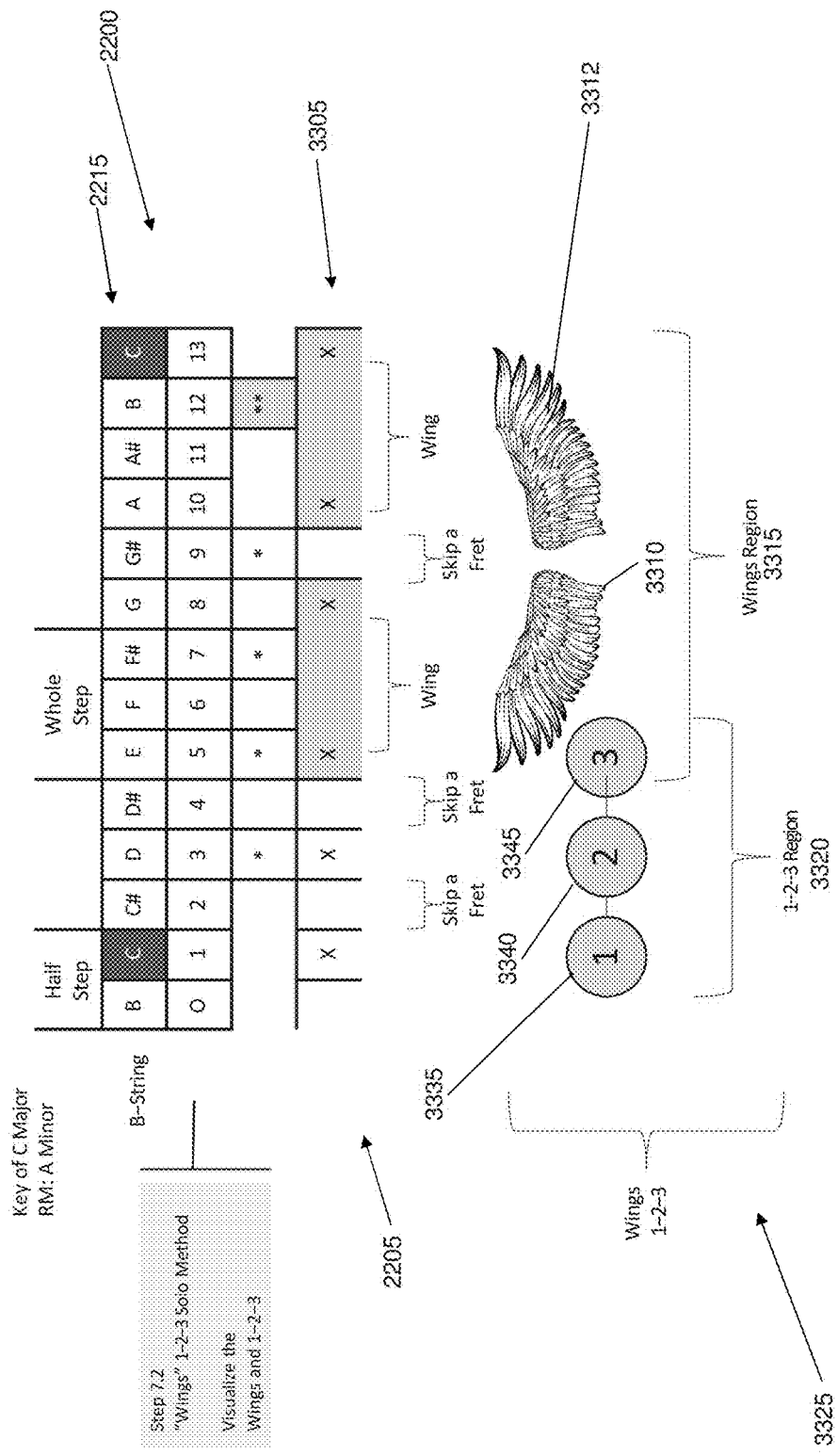
Figure 38:
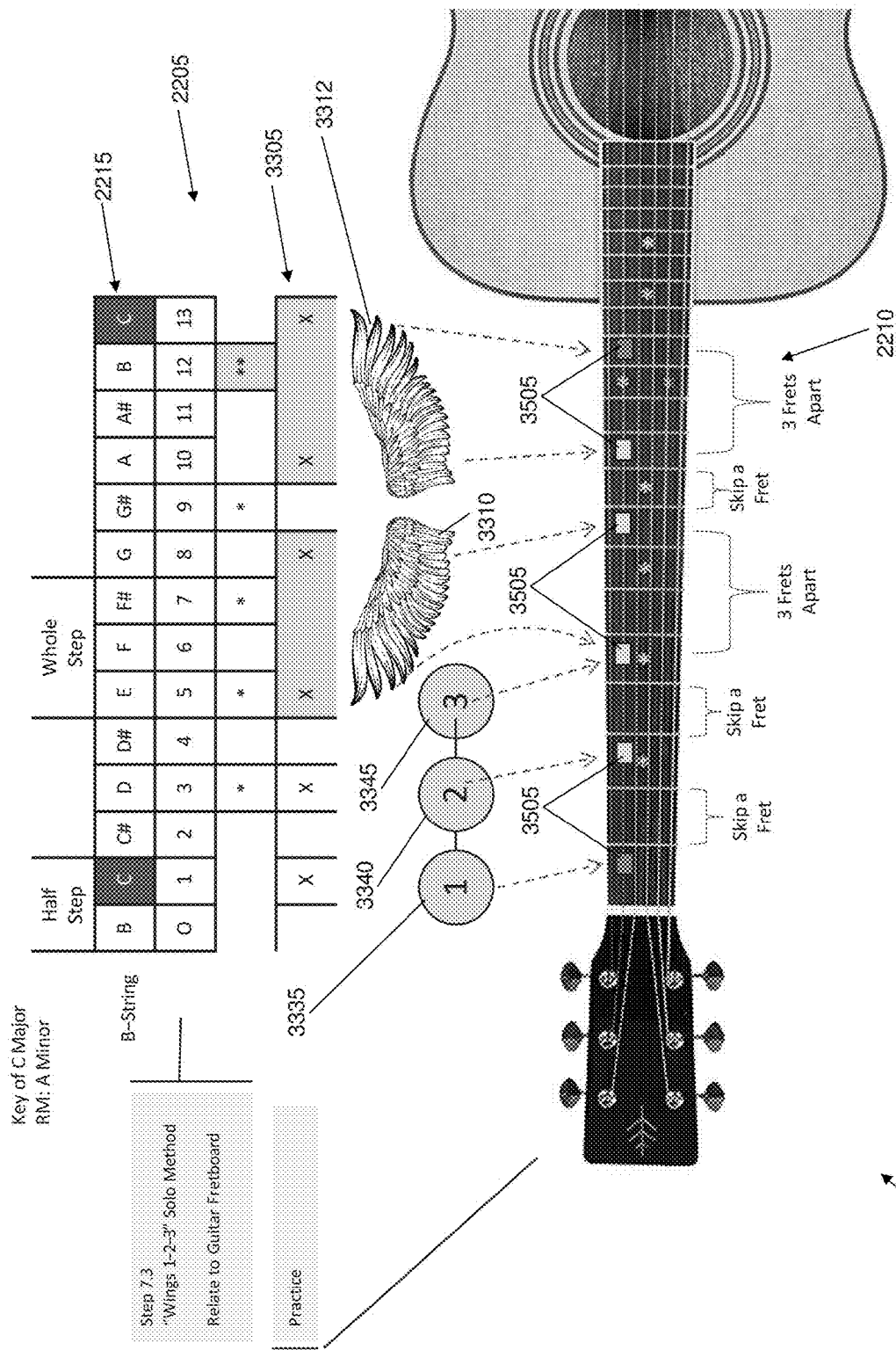

FIGS. 36-38 depict aspects of the "wings" 1-2-3 solo teaching method for the B-string in accordance with aspects of the disclosure. As shown in FIG. 36, the pentatonic scale is mapped to the fret/note correlation chart 2205 having a B-string note row 2215 and modified to further include the pentatonic scale member row 3205. As shown in FIG. 36, for this exemplary embodiment, the C note is again indicated as the root note (e.g., using the highlighting on the B-string row) indicating the C major scale (and its relative minor—the A minor scale). In accordance with aspects of the disclosure, the pentatonic scale indicated with the bracket 3105 on the circle of fifths chart 125 is mapped to the fret/note correlation chart 2205. Thus, the notes of the five adjacent chord sections 145 indicated with the bracket 2105 (e.g., C, G, D, A, and E) are mapped to the fret/note correlation chart 2205.

In embodiments, a user may fill in a user-fillable field of the fret/note correlation chart 2205 to mark the five notes of the pentatonic scale. In other embodiments, a teaching system may mark the five notes of the pentatonic scale and show a connecting line between the circle of fifths chart 125 and the fret/note correlation chart 2205. In such a manner, in accordance with aspects of the disclosure, the exemplary fretboard/scale visual aid 2200 educates a user on the relationship of the pentatonic scale to the circle of fifths.

As shown in FIG. 37, the fret/note correlation chart 2205 is modified to add a "wing" and "1-2-3" region row 3305, which identifies the positions of the "wings" 3310 and the notes thereof on the B-string and identifies position of the "1-2-3" region and the notes of the "1-2-3" region on the B-string (from amongst the notes of the chromatic scale). In accordance with further aspects of the disclosure, FIG. 37 also shows a wings/1-2-3 range visualization 3325, which depicts the position of the "wings" region 3315 (that encompasses the wings 3310 and 3312) and the position of the "1-2-3" region 3320 and how these positions relate to each other.

As shown in FIG. 37, the wings region 3315 includes two wings 3310 and 3312. The ends of each wing are three frets apart from each other. Additionally, as shown in FIG. 37, the wings 3310 and 3312 are spaced apart from each other by one fret. With the B-string, the first end of the first wing 3310 is on the fifth fret (which corresponds to the E note), and the second end of the first wing 3310 is three frets apart from the first end on the eighth fret (which corresponds to the G note). Additionally, as shown in FIG. 37, the first end of the second wing 3312 (which corresponds to the A note) is spaced apart by one fret from second end of the first wing 3310. The second end of the second wing 3312 is three frets apart from the first end of the second wing 3312 to be on the thirteenth fret (which corresponds to the root note—in this example, a C note).

Additionally, as shown in FIG. 37, the 1-2-3 region 3320 has three notes, e.g., a first note (or "1") 3335, a second note (or "2") 3340, and a third note (or "3") 3345, and a single fret is skipped between the first note 3335 and the second note 3340, and a single fret is skipped between the second note 3340 and third note 3345. Also, as shown in FIG. 37, the first note 3335 of the 1-2-3 region 3320, which is on the first fret, is the same note (although an octave apart) as the second end of the second wing 3312, and corresponds to the root note of the C major scale (and its relative minor—the A minor scale).

FIG. 38 shows how the wings 3310 and 3312 and the "1-2-3" region 3320 relate to the guitar fretboard in accordance with aspects of the disclosure. As shown in FIG. 38, the guitar fretboard display 2210 includes indicators 3505 on the B-string for the notes of the wings 3310 and 3312. Thus, as shown in FIG. 38, the first end of the first wing 3310 is on the fifth fret (which corresponds to the E note) and the second end of the first wing 3310 is three frets apart from the first end (which corresponds to the G note). Additionally, as shown in FIG. 38, the first end of the second wing 3312 (which corresponds to the A note) is spaced apart by one fret from second end of the first wing 3310 and the second end of the second wing 3312 is three frets apart from the first end of the second wing 3312 to be on the thirteenth fret (which corresponds to the root note—in this example, a C note).

Additionally, as shown in FIG. 38, the guitar fretboard display 2210 also includes indicators 3505 on the B string for the notes of the 1-2-3 region. As shown in FIG. 38, the first note 3335 of the 1-2-3 region 3320 is the same note as the second end of the second wing 3312 (although an octave apart), and corresponds to the root note of the C major scale (and its relative minor—the A minor scale). As is also shown in FIG. 38, a single fret is skipped between the first note 3335 and the second note 3340 of the "1-2-3" region 3320, and a single fret is skipped between the second note 3340 and third note 3345 of the "1-2-3" region 3320. Thus, in accordance with aspects of the disclosure, the indicators 3505 on the guitar fretboard display 2210 of the present disclosure teaches the relative locations of the wings of the wing region and the 1-2-3 region (and the notes thereof) on the B-string of a guitar.

Figure 39:
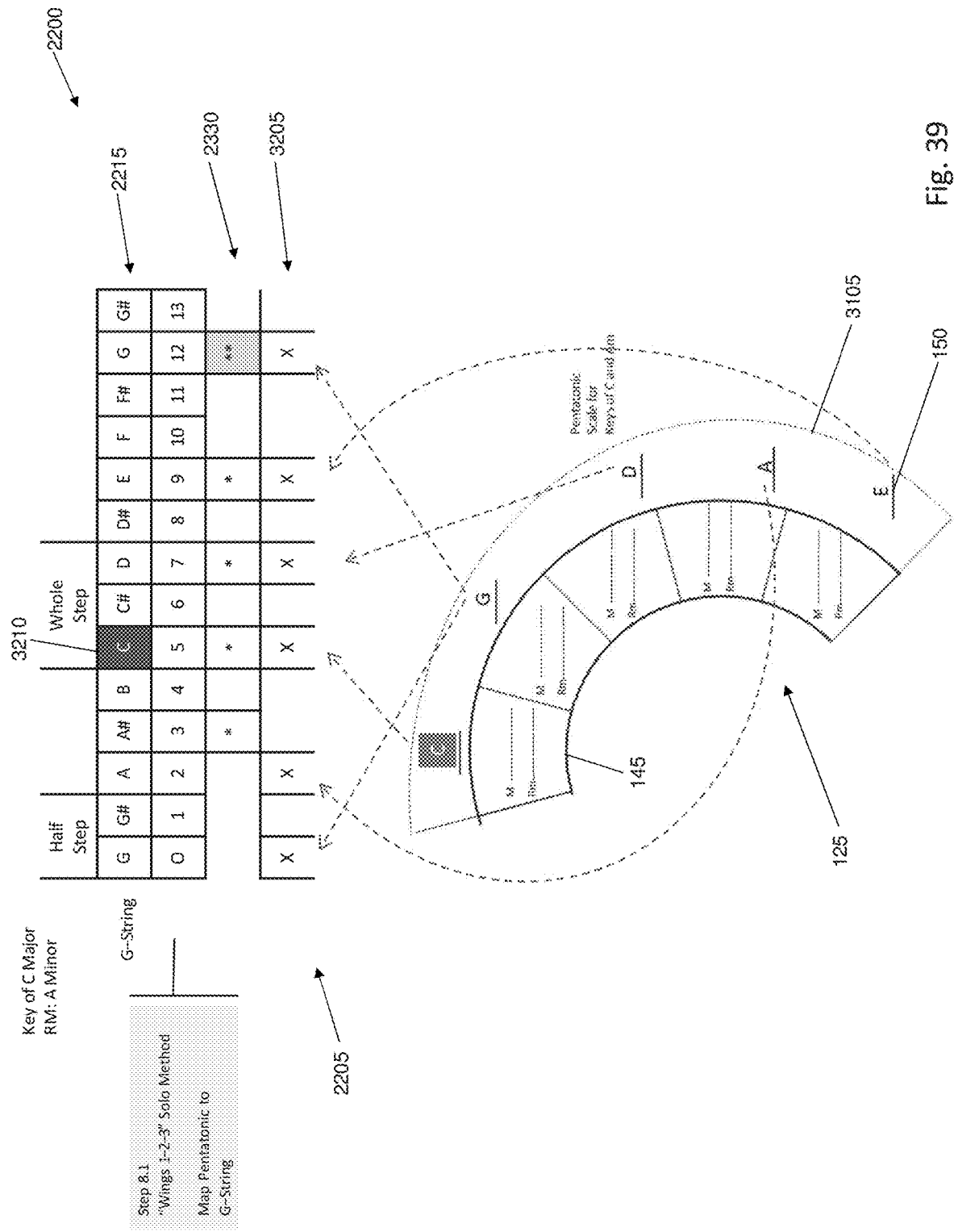
FIGS. 39-42 depict aspects of the "wings" 1-2-3 solo teaching method for the G-string in accordance with aspects of the disclosure.

FIGS. 39-42 depict aspects of the "wings" 1-2-3 solo teaching method for the G-string in accordance with aspects of the disclosure. As shown in FIG. 39, the pentatonic scale is mapped to the fret/note correlation chart 2205 having a G-string note row 2215 and modified to further include the pentatonic scale member row 3205. As shown in FIG. 39, for this exemplary embodiment, the C note is again indicated as the root note (e.g., using the highlighting on the G-string row) indicating the C major scale (and its relative minor— the A minor scale). In accordance with aspects of the disclosure, the pentatonic scale indicated with the bracket 3105 on the circle of fifths chart 125 is mapped to the fret/note correlation chart 2205. Thus, the notes of the five adjacent chord sections 145 indicated with the bracket 3105 (e.g., C, G, D, A, and E) are mapped to the fret/note correlation chart 2205 from the (now-filled) root note fillable field 150.

In embodiments, a user may fill in a user-fillable field of the fret/note correlation chart 2205 to mark the five notes of the pentatonic scale. In other embodiments, a teaching system may mark the five notes of the pentatonic scale and show a connecting line between the circle of fifths chart 125 and the fret/note correlation chart 2205. In such a manner, in accordance with aspects of the disclosure, the exemplary fretboard/scale visual aid 2200 educates a user on the relationship of the pentatonic scale to the circle of fifths.

Figure 40:
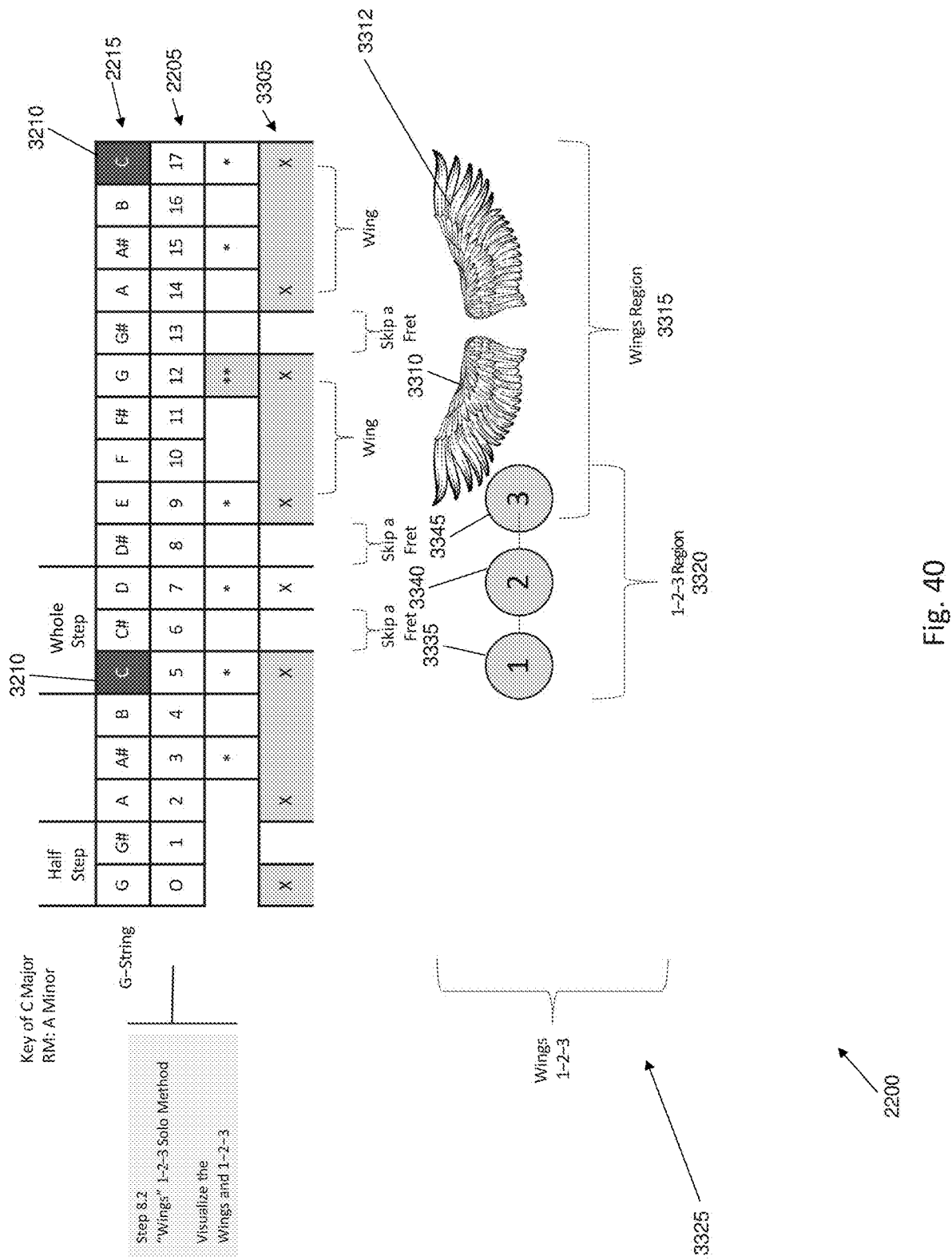

As shown in FIG. 40, the fret/note correlation chart 2205 includes a "wing" and "1-2-3" region row 3305 (based on the pentatonic scale member row 3205), which identifies the positions of the "wings" 3310 and the notes thereof on the G-string and identifies position of the "1-2-3" region and the notes of the "1-2-3" region on the G-string (from amongst the notes of the chromatic scale). Additionally, as shown in FIG. 40, the fret/note correlation chart 2205 is extended to include additional frets, the notes thereof, and dot markers thereof (where applicable). In accordance with further aspects of the disclosure, FIG. 40 also shows a wings/1-2-3 range visualization 3325, which depicts the position of the "wings" region 3315 (that encompasses the wings 3310 and 3312) and the position of the "1-2-3" region 3320 and how these positions relate to each other.

As shown in FIG. 40, the wings region 3315 includes two wings 3310 and 3312. The ends of each wing are three frets apart from each other. Additionally, as shown in FIG. 40, the wings 3310 and 3312 are spaced apart from each other by one fret. With the G-string, the first end of the first wing 3310 is on the ninth fret (which corresponds to the E note), and the second end of the first wing 3310 is three frets apart from the first end on the twelfth fret (which corresponds to the G note). Additionally, as shown in FIG. 40, the first end of the second wing 3312 is on the fourteenth fret (which corresponds to the A note) and is spaced apart by one fret from second end of the first wing 3310. The second end of the second wing 3312 is three frets apart from the first end of the second wing 3312 to be on the seventeenth fret (which corresponds to the root note—in this example, a C note).

Additionally, as shown in FIG. 40, the 1-2-3 region 3320 has three notes, e.g., a first note (or "1") 3335, a second note (or "2") 3340, and a third note (or "3") 3345, and a single fret is skipped between the first note 3335 and the second note 3340, and a single fret is skipped between the second note 3340 and third note 3345. Also, as shown in FIG. 40, the first note 3335 of the 1-2-3 region 3320, which is on the fifth fret, is the same note as the second end of the second wing 3312 (although one octave apart), and corresponds to the root note of the C major scale (and its relative minor— the A minor scale).

Figure 41:
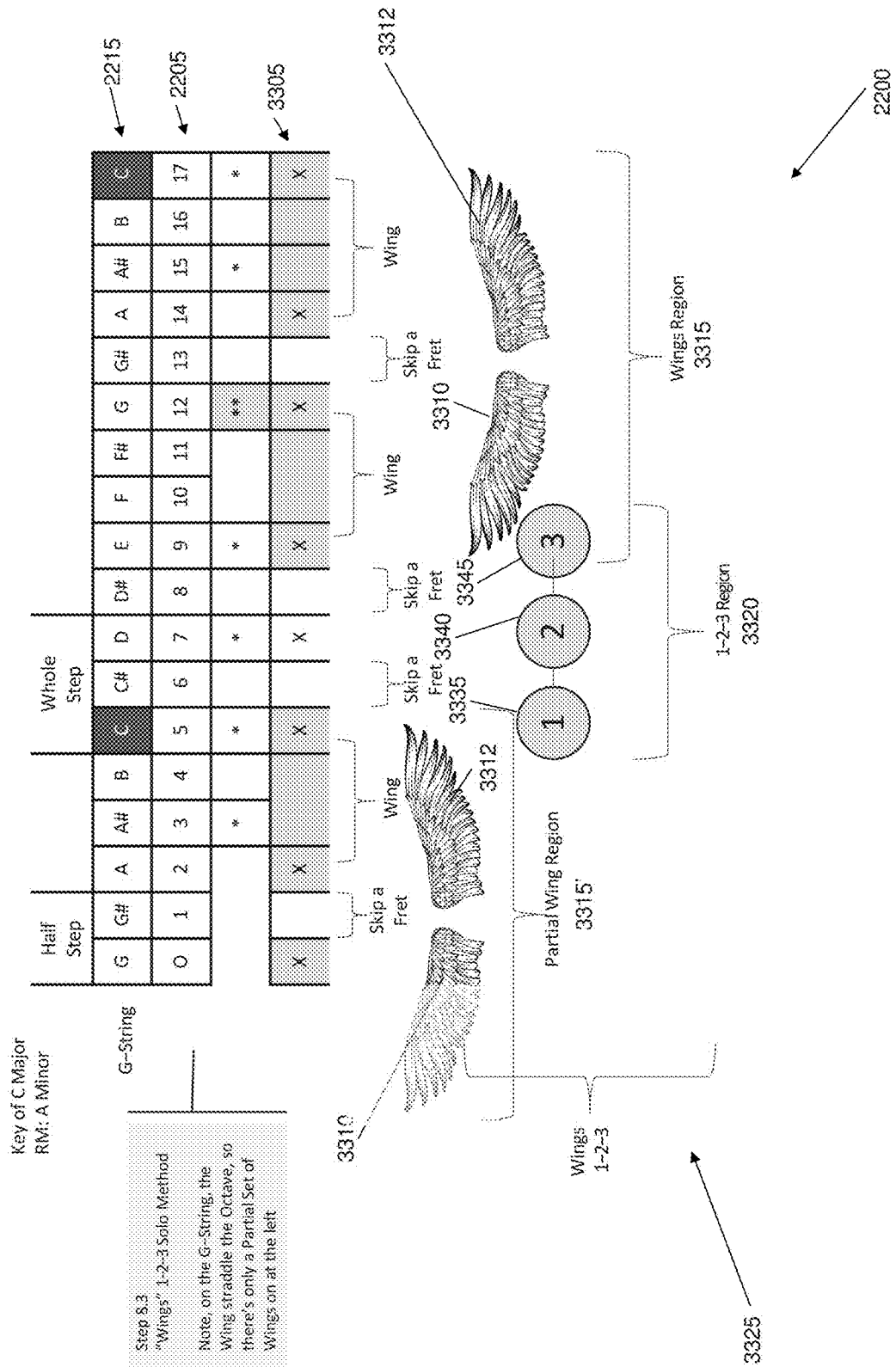

In accordance with aspects of the disclosure, as shown in FIG. 41, the notes identified by the ends of the wings together with the notes identified by the 1-2-3 region are the pentatonic notes the scale. That is, with this example, the notes identified by the ends of the wings are E, G, A, and C and the notes identified by the 1-2-3 region are C, D, and E. Thus, in accordance with aspects of the disclosure, a guitar player can utilize the wings 3310 and 3312 together with the 1-2-3 region 3320 to understand and memorize the note locations for the notes of the pentatonic scale on a particular string.

FIG. 41 shows another wings/1-2-3 range visualization 3325, which depicts the position of the "wings" region 3315 (that encompasses the wings 3310 and 3312) and the position of the "1-2-3" region 3320 and how these positions relate to each other. As shown in FIG. 41, with the G-string, a wing (the first wing 3310) will straddle the octave. As such, as shown in the wings/1-2-3 range visualization 3325, there is a partial wing region 3315' having only a partial set of wings on the left of the root note.

Figure 42:
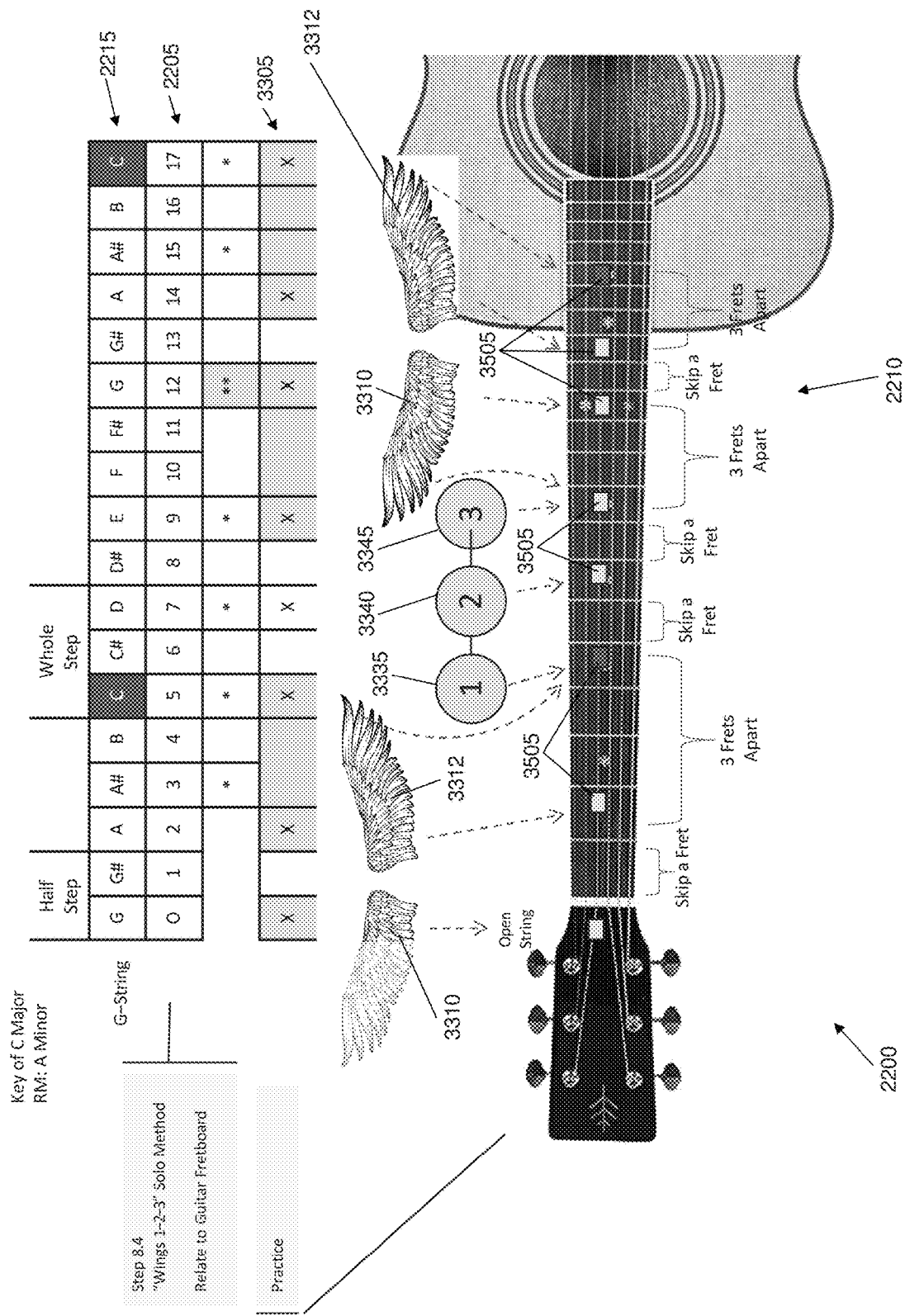

FIG. 42 shows how the wings 3310 and 3312 and the "1-2-3" region 3320 relate to the guitar fretboard in accordance with aspects of the disclosure. As shown in FIG. 42, the guitar fretboard display 2210 includes indicators 3505 on the G-string for the notes of the wings. Thus, as shown in FIG. 42, the first end of the first wing 3310 (rightward of the root note) is on the ninth fret (which corresponds to the E note) and the second end of the first wing 3310 is three frets apart from the first end (which corresponds to the G note). Additionally, as shown in FIG. 42, the first end of the second wing 3312 is on the fourteenth fret (which corresponds to the A note) and is spaced apart by one fret from second end of the first wing 3310. The second end of the second wing 3312 is three frets apart from the first end of the second wing 3312 to be on the seventeenth fret (which corresponds to the root note—in this example, a C note).

Additionally, as shown in FIG. 42, the guitar fretboard display 2210 also includes indicators 3505 on the G-string for the notes of the 1-2-3 region. As shown in FIG. 42, the first note 3335 of the 1-2-3 region 3320 is the same note as the second end of the second wing 3312 (although an octave apart), and corresponds to the root note of the C major scale (and its relative minor—the A minor scale). As is also shown in FIG. 42, a single fret is skipped between the first note 3335 and the second note 3340 of the "1-2-3" region 3320, and a single fret is skipped between the second note 3340 and third note 3345 of the "1-2-3" region 3320. Thus, in accordance with aspects of the disclosure, the indicators 3505 on the guitar fretboard display 2210 of the present disclosure teaches the relative locations of the wings and the 1-2-3 region (and the notes thereof) on the G-string of a guitar.

Figure 43:
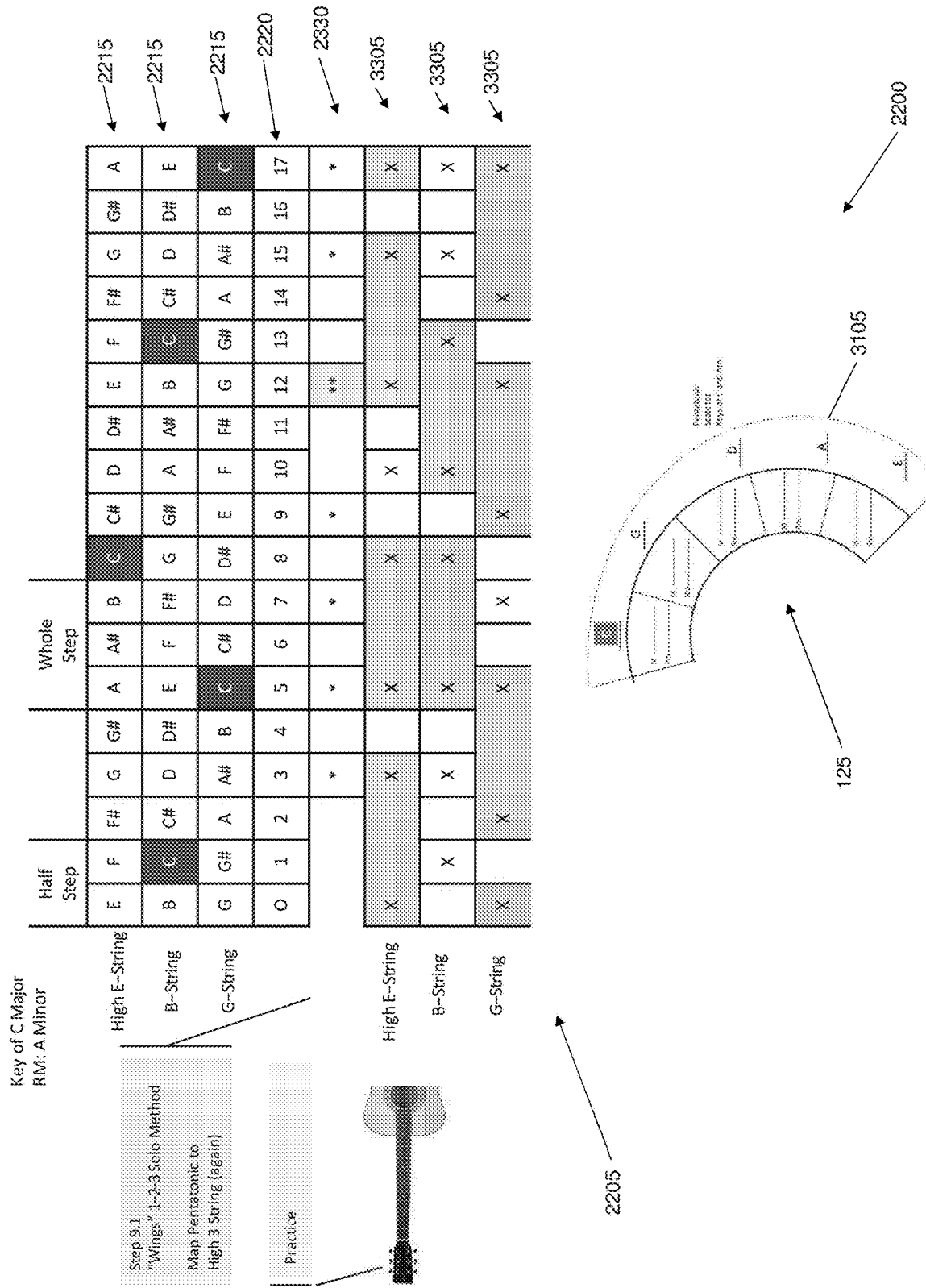
FIGS. 43-53 depict aspects of the "wings" 1-2-3 solo teaching method for the three high strings (the high E-string, the B-string and the G-string) in accordance with aspects of the disclosure.

FIGS. 43-53 depict aspects of the "wings" 1-2-3 solo teaching method for the three high strings (the high E-string, the B-string and the G-string) in accordance with aspects of the disclosure. As shown in FIG. 43, the fret/note correlation chart 2205 is modified to include note rows 2215 for the three high strings of the guitar (i.e., the high E-string, the B-string and the G-string). Additionally, as shown in FIG. 43, the fret/note correlation chart 2205 is expanded to include a "wing" and "1-2-3" region rows 3305 for each of the three high strings of the guitar (i.e., the high E-string, the B-string and the G-string).

In accordance with aspects of the disclosure, as shown in FIG. 43, the notes identified by the ends of the wings together with the notes identified by the 1-2-3 regions on each of the three high strings of the guitar are the pentatonic notes of the scale. That is, with this example, the notes identified by the ends of the wings are E, G, A, and C and the notes identified by the 1-2-3 region are C, D, and E on each of the three high strings of the guitar. Thus, in accordance with aspects of the disclosure, a guitar player can utilize the fret/note correlation chart 2205, and the wings and the 1-2-3 regions on the respective strings thereof, to understand, practice, and/or memorize the note locations for the notes of the pentatonic scale on any of the three high strings of the guitar.

Figure 44:
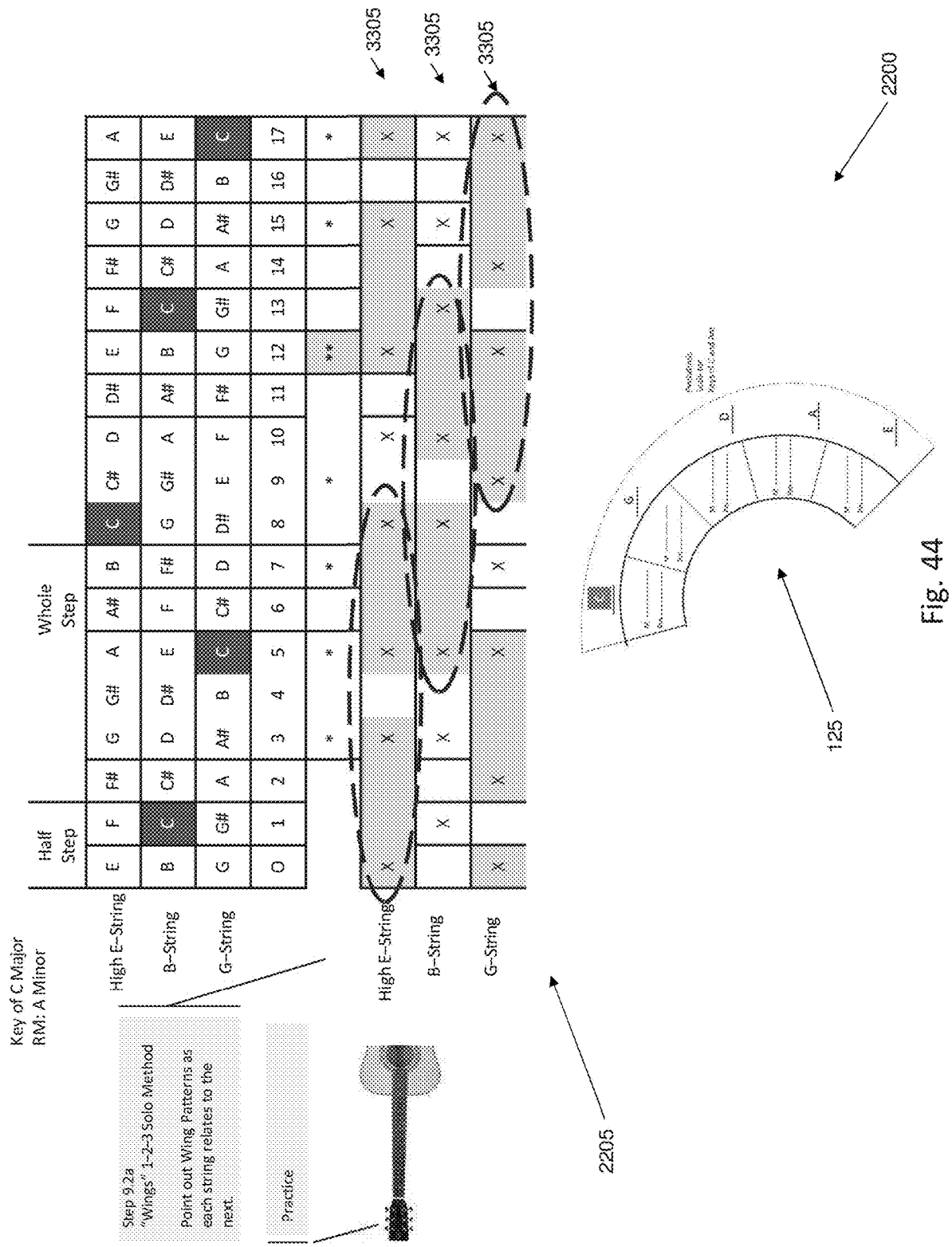

FIG. 44 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 44 depicts wing patterns from each string to the next (or patterns between the wings of adjacent strings).

In accordance with aspects of the disclosure, the dashed ovals in FIG. 44 and the following figures show the different patterns that can be recognized by a student. Different people find different patterns easier to recognize than others. The idea is not necessarily to teach one person every pattern, but rather to have a variety of recognizable patterns to choose from.

Thus, as shown in FIG. 44, the wing region (roughly shown with the respective dashed oval) on the high E-string start from the zero fret. The first wing on the next adjacent string (i.e., the B-string) overlaps with the second wing of the high E-string. More specifically, as shown in FIG. 44, the wing region on the next adjacent string (i.e., the B-string) start at the second wing of the high E-string. In other words, the ends of the second wing on the high E-string are at the same frets as the ends of the first wing on the B-string. Similarly, the wing patterns on the next adjacent string (i.e., the G-string) overlap with the second wing of the B-string. As shown in FIG. 44, however, this overlap is such that the first wing region on the G-string is one fret lower than the second wing of the B-string.

Figure 45:
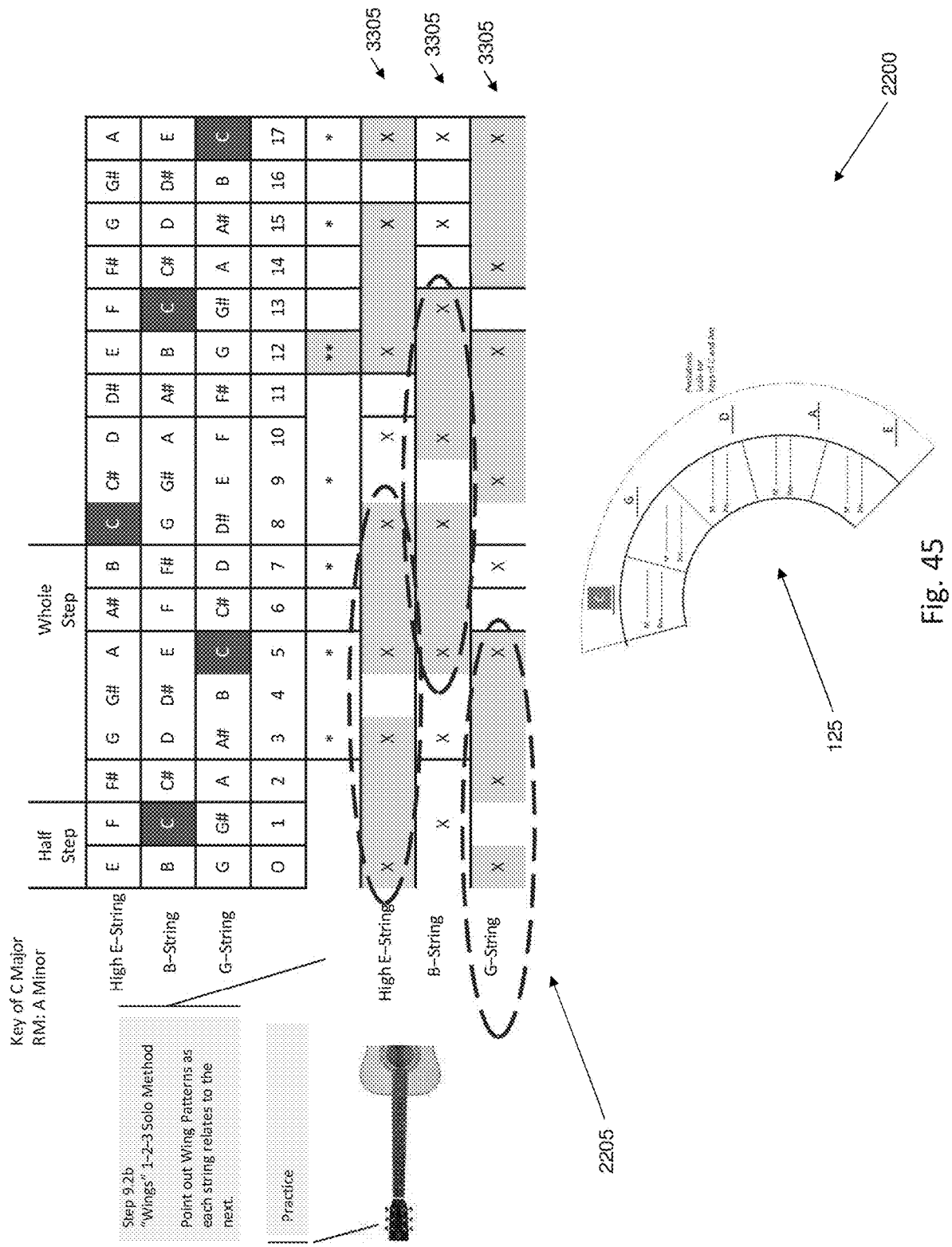

FIG. 45 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 45 depicts wing patterns from each string to the next. As shown in FIG. 45, the first wing on the next adjacent string (i.e., the B-string) overlaps with the second wing of the high E-string. More specifically, as shown in FIG. 45, the wing region on the next adjacent string (i.e., the B-string) starts at the second wing of the high E-string. In other words, the ends of the second wing on the high E-string are at the same frets as the ends of the first wing on the B-string. Additionally, the wing region on the next adjacent string (i.e., the G-string) partially overlaps with the wing region of the B-string and the wing region of the high E-string. More specifically, as shown in FIG. 45, the end of the second wing on the G-string is at the same fret as the first end of the first wing on the B-string and at the same fret as the first end of the second wing on the high E-string.

Figure 46:
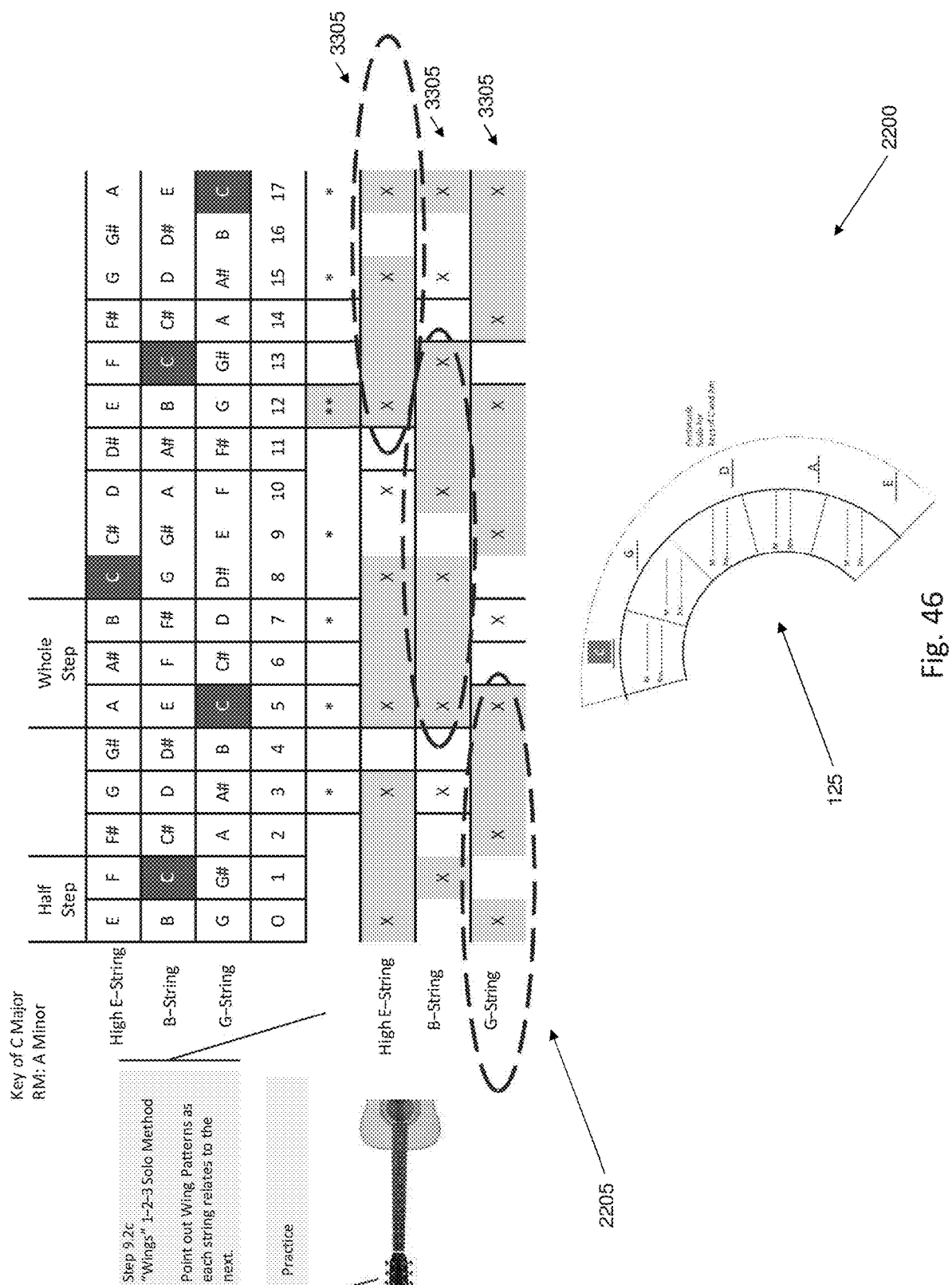

FIG. 46 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 46 depicts wing patterns from each string to the next. As shown in FIG. 46, the first wing on the B-string overlaps with the second wing of the G-string and the second wing on the B-string overlaps with the first wing of the high E-string. More specifically, as shown in FIG. 46, the first end of the first wing on the B-string overlaps with the second end of the second wing of the G-string. Additionally, as shown in FIG. 46, the second end of the second wing on the B-string is one fret higher than the first end of the first wing of the high E-string. In accordance with these aspects of the disclosure, a guitar player can utilize the fret/note correlation chart 2205, and the wing regions on the respective strings thereof, to understand, practice, and/or memorize the note locations for the notes of the pentatonic scale on any of the three high strings of the guitar.

Figure 47:
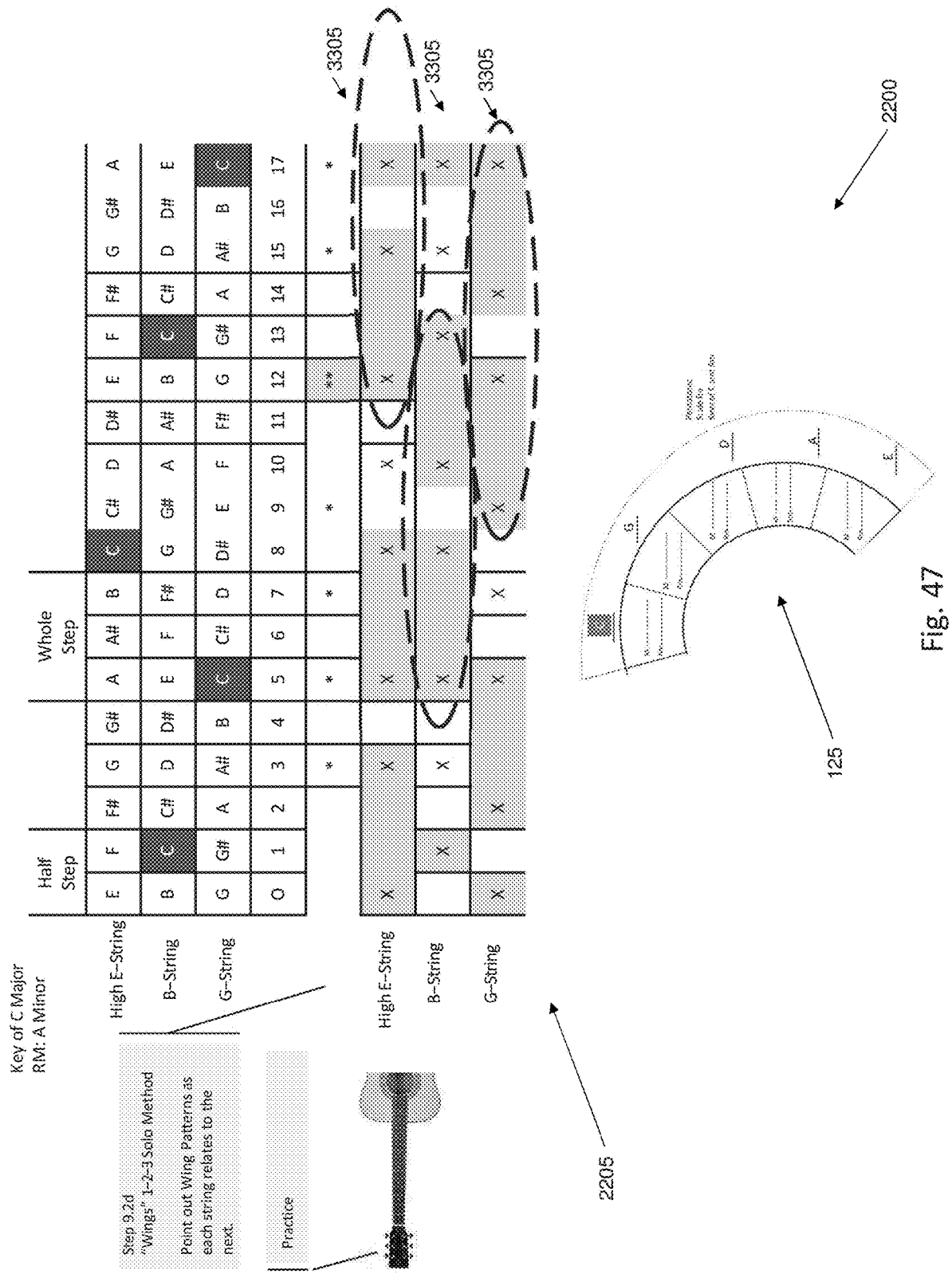

FIG. 47 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 47 depicts wing patterns from each string to the next. As shown in FIG. 47, the second wing on the B-string overlaps with the first wing of the G-string and the first wing of the high E-string. More specifically, as shown in FIG. 47, the second wing on the B-string is a fret higher than the first wing of the G-string. Additionally, as shown in FIG. 47, the second end of the second wing on the B-string is a fret higher than the first end of the first wing of the high E-string. In accordance with these aspects of the disclosure, a guitar player can utilize the fret/note correlation chart 2205, and the wing regions on the respective strings thereof, to understand, practice, and/or memorize the note locations for the notes of the pentatonic scale on any of the three high strings of the guitar.

Figure 48:
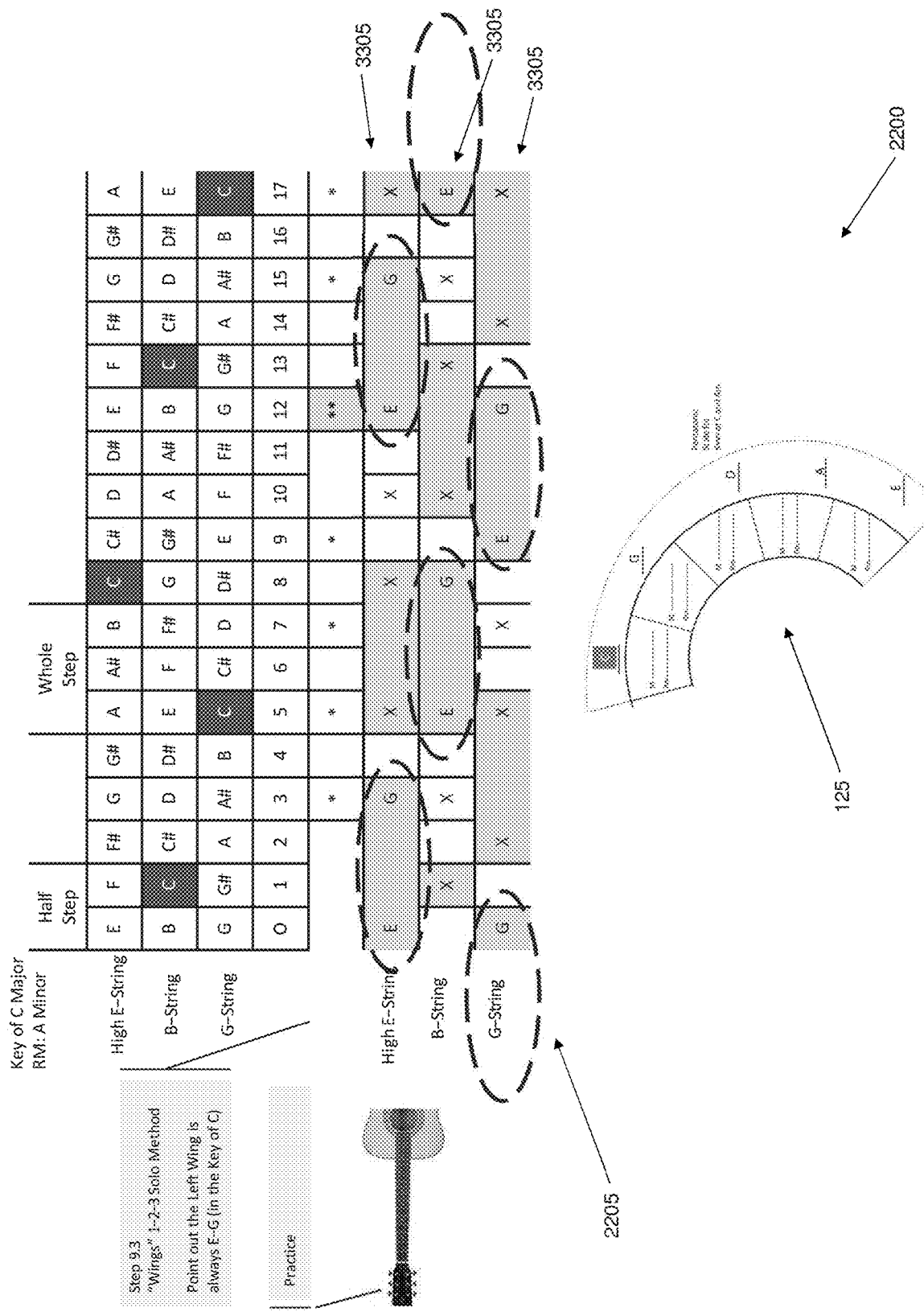

FIG. 48 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). In the exemplary fret/note correlation chart 2205, only the first wing (or left wing) of the wing pair is highlighted (via dashed ovals). As shown in FIG. 48, the first wing (or left wing) always spans the notes E-G (when in the key of C major). In other words, in accordance with aspects of the disclosure, the first note of the first wing is an E and the second note of the first wing is a G.

Figure 49:
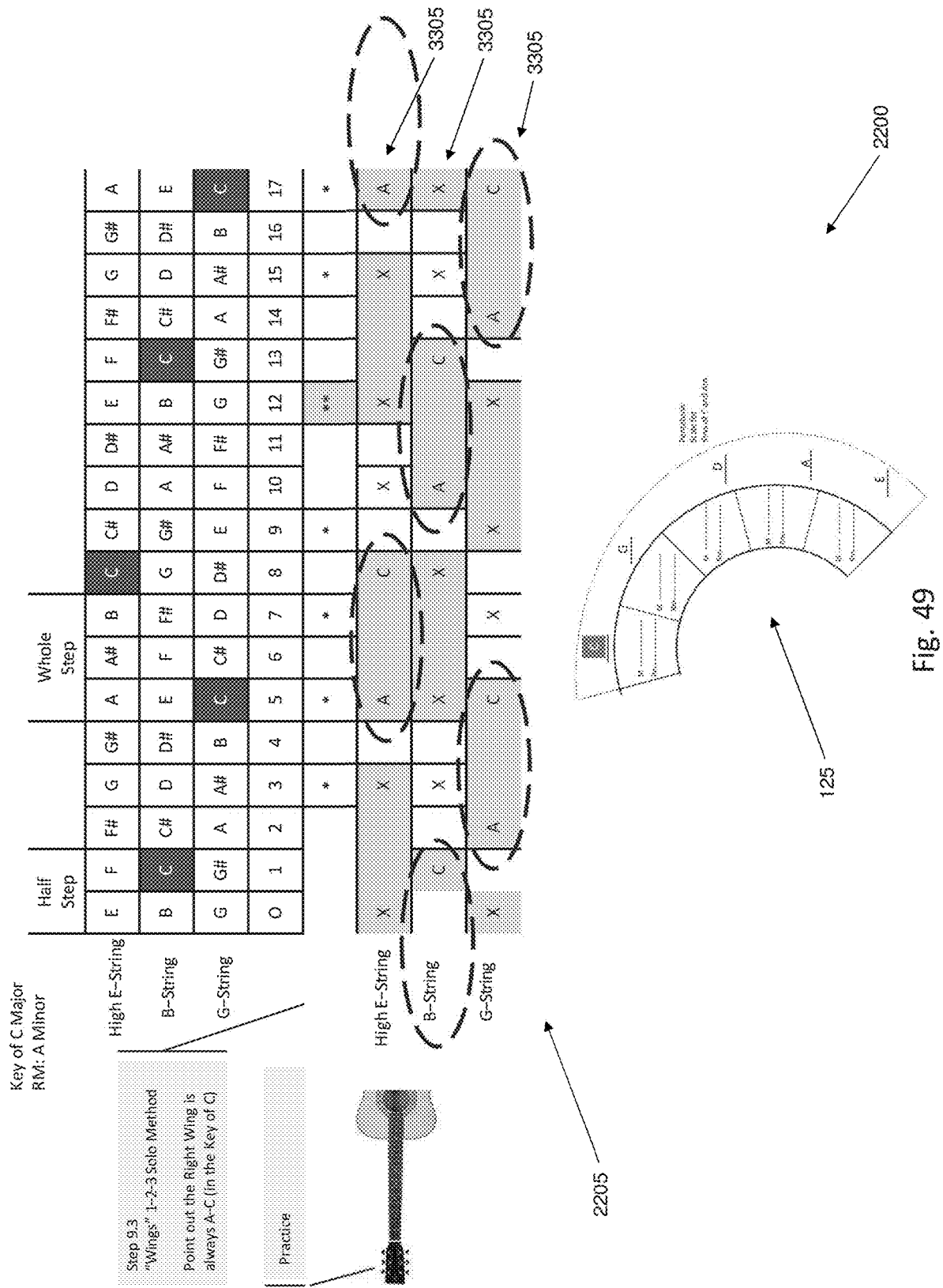

FIG. 49 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). In the exemplary fret/note correlation chart 2205, only the second wing (or right wing) of the wing pair is highlighted (via dashed ovals). As shown in FIG. 49, the second wing (or right wing) always spans the notes A-C (when in the key of C major). In other words, in accordance with aspects of the disclosure, the first note of the second wing is an A and the second note of the second wing is an A.

Figure 50:
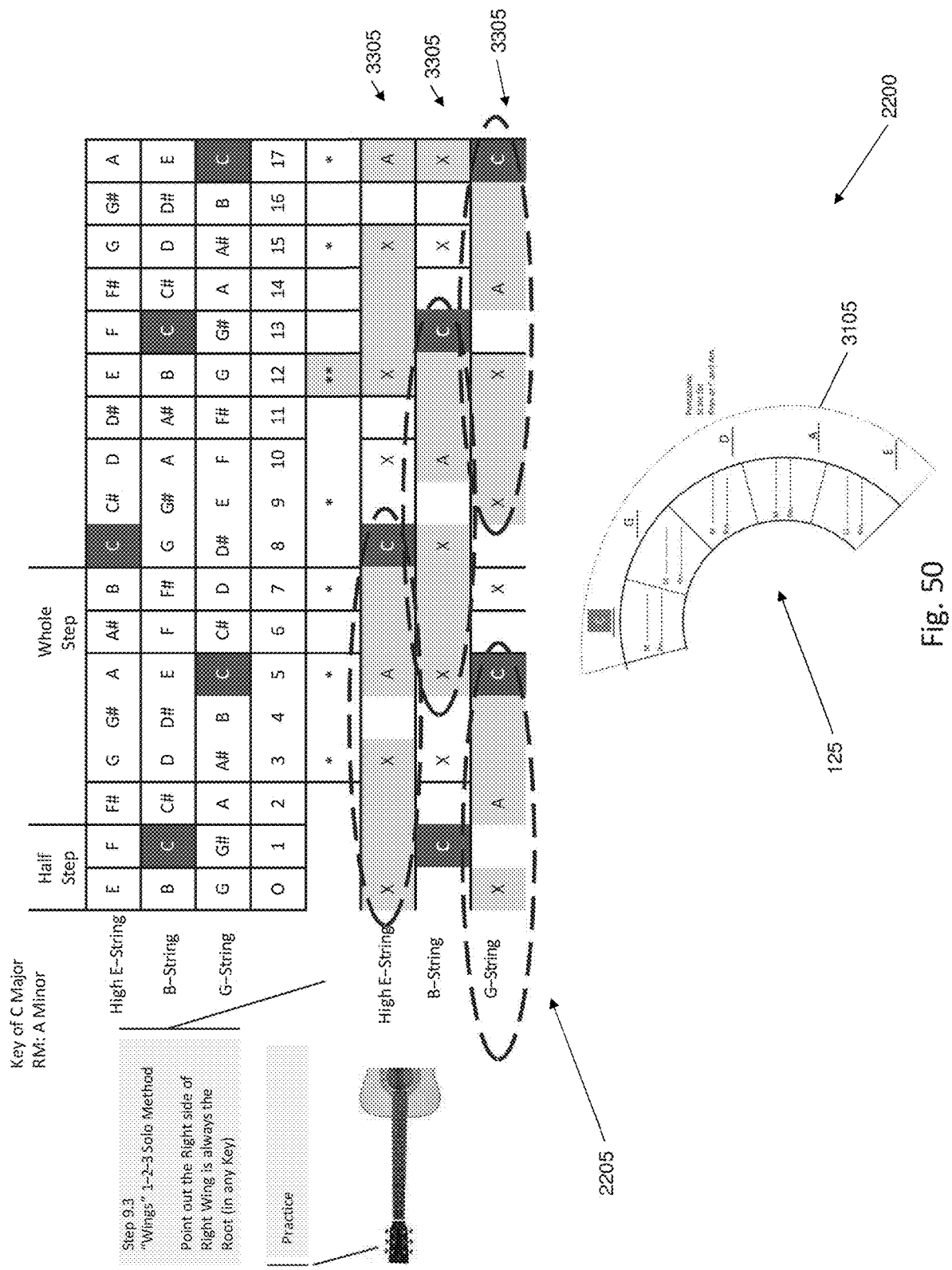

FIG. 50 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). As shown in FIG. 50, each the wing regions is highlighted (via dashed ovals) and the root note is highlighted (via shading). In accordance with aspects of the disclosure, the fret/note correlation chart 2205 of FIG. 50 graphically depicts how the second end of the second wing (or the right-side of the right wing) is always the root note (in any key).

Figure 51:
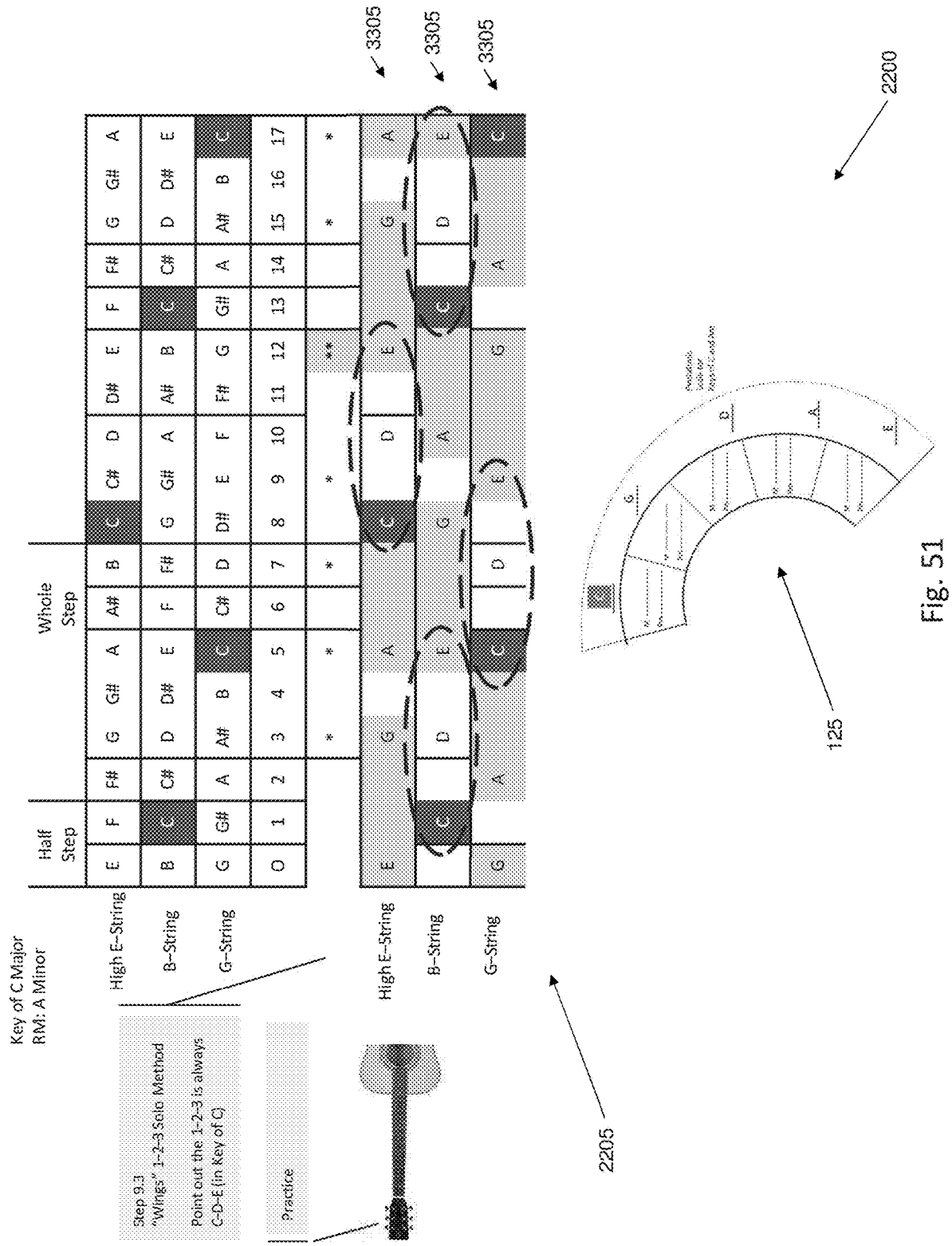

FIG. 51 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 51 depicts "1-2-3" patterns from each string to the next (or patterns between the "1-2-3" regions of adjacent strings). The "1-2-3" pattern on the B-string overlaps with the "1-2-3" pattern of the G-string. More specifically, as shown in FIG. 51, the "3" note of the "1-2-3" pattern on the B-string is at the fifth fret and the "1" note of the "1-2-3" pattern on the G-string is also at the fifth fret. Similarly, the "1-2-3" pattern on the G-string overlaps with the "1-2-3" pattern of the high E-string. More specifically, as shown in FIG. 51, the "3" note of the "1-2-3" pattern on the G-string is at the ninth fret and is one fret higher than the "1" note of the "1-2-3" pattern on the high E-string, which is at the eighth fret. The "1-2-3" pattern on the high E-string extends to but does not overlaps with the next "1-2-3" pattern of the B-string. More specifically, as shown in FIG. 51, the "3" note of the "1-2-3" pattern on the high E-string is at the twelfth fret and the "1" note of the next "1-2-3" pattern on B-string is one fret higher at the thirteenth fret. As shown in FIG. 51, the "1-2-3" pattern always spans the notes C, D, and E (when in the key of C major).

Figure 52:
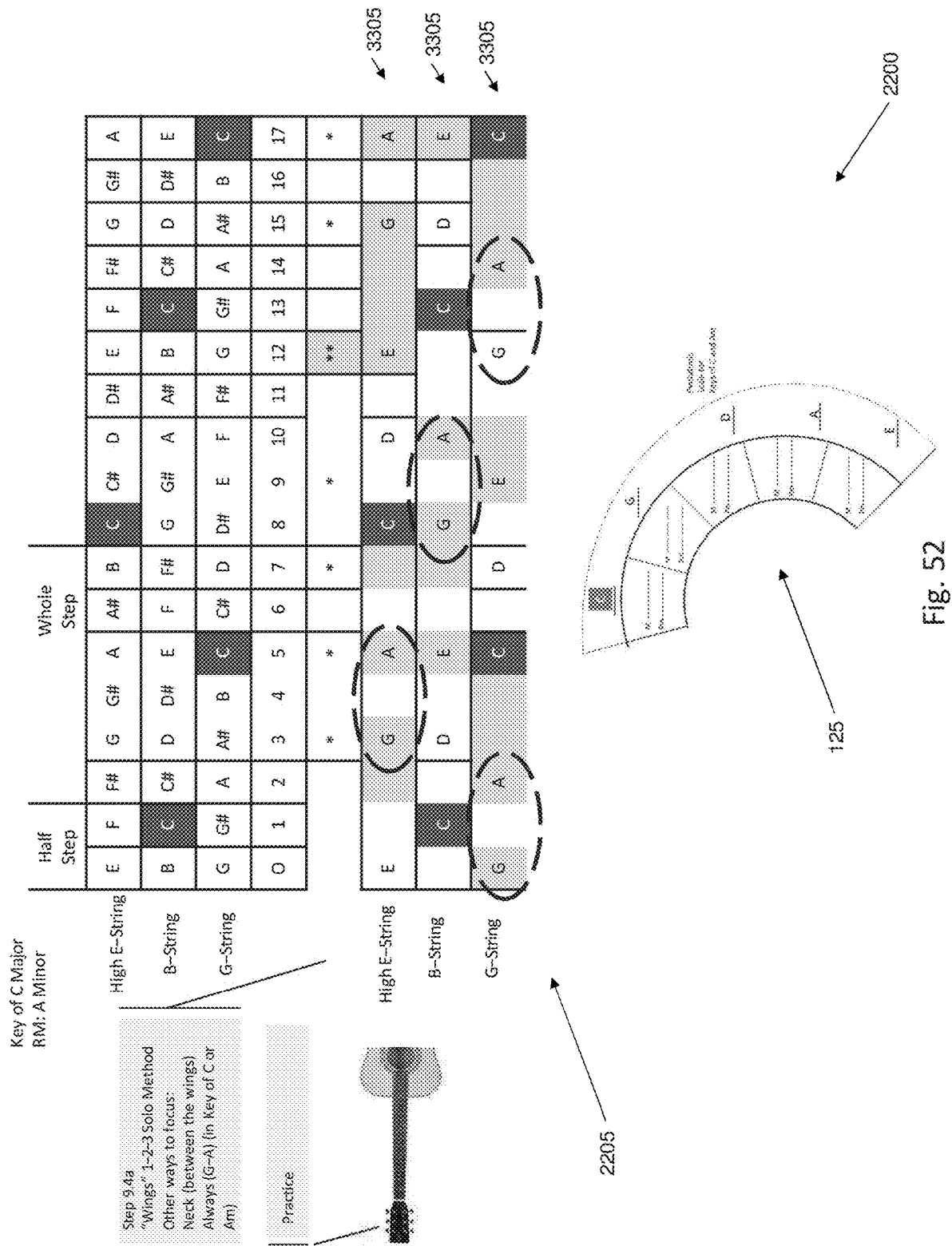

FIG. 52 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 52 depicts a region between the wings (via dashed ovals) in accordance with aspects of the disclosure. As shown in FIG. 52, the region between the wings always spans the notes G-A (when in the key of C major). In accordance with these aspects of the disclosure, a guitar player can utilize the fret/note correlation chart 2205, and the wing regions and the region between the wings on the respective strings thereof, to understand, practice, and/or memorize the note locations for the notes of the pentatonic scale on any of the three high strings of the guitar.

Figure 53:
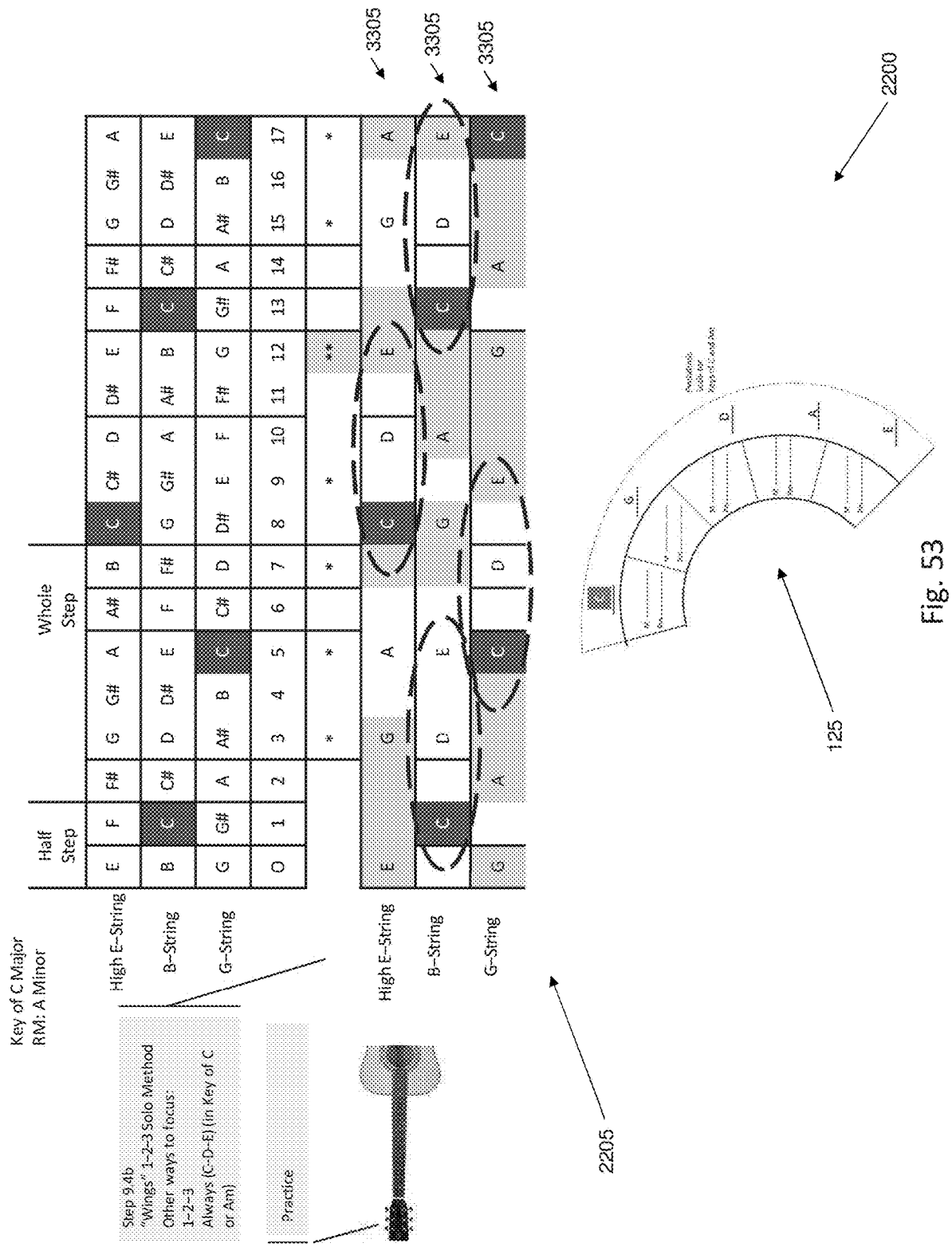

FIG. 53 shows the fret/note correlation chart 2205 for the three high strings of the guitar (i.e., the high E-string, the B-string and the G-string) along with "wing" and "1-2-3" region rows 3305 for each of the three high strings of the guitar (i.e., the high E-string, the B-string and the G-string). Additionally, FIG. 53 depicts "1-2-3" patterns from each string to the next (or patterns between the "1-2-3" regions of adjacent strings). In accordance with aspects of the disclosure, the fret/note correlation chart 2205 of FIG. 53 graphically depicts (e.g., with different shading) how the "1" note of the "1-2-3" pattern is always the root note (in any key).

Figure 54:
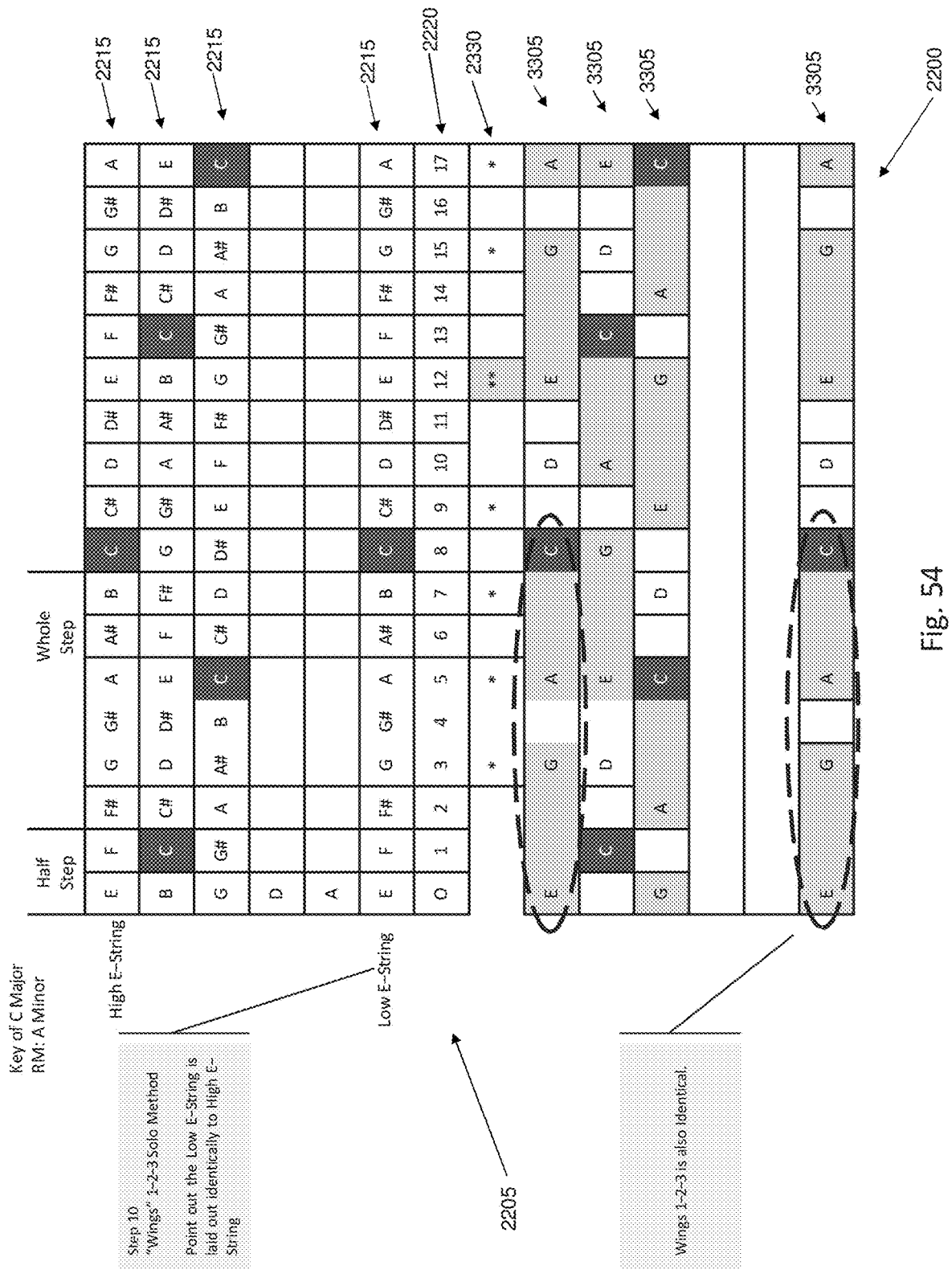
FIG. 54 depicts aspects of the "wings" 1-2-3 solo teaching method for all six guitar strings in accordance with aspects of the disclosure.

FIG. 54 depicts aspects of the "wings" 1-2-3 solo teaching method for the 3 high strings and the low E-string in accordance with aspects of the disclosure. As shown in FIG. 54, the fret/note correlation chart 2205 may be expanded to include these four strings (i.e., the high E-string, the B-string and the G-string, and the low E-string) or all six strings of the guitar (i.e., the high E-string, the B-string and the G-string, the D-string, the A-string, and the low E-string) along with "wing" and "1-2-3" region rows 3305 for each of the six strings of the guitar (i.e., the high E-string, the B-string and the G-string). In this exemplary embodiment of FIG. 54, only the rows of the fret/note correlation chart 2205 for the three high strings and for the low E-string are filled in (whereas the rows for the D-string and the A-string are not filled-in). Likewise, in the "wing" and "1-2-3" region rows 3305, only the row corresponding to the three high strings and the low E-string are filled in (whereas the rows for the D-string and the A-string are not filled-in). As shown in FIG. 54, the low E-string is laid out identically to the high E-string. Thus, the wing region and the "1-2-3" region are identically laid out on both the low E-string and the high E-string, which allows a player to quickly locate the wing region (with the two wings) and the "1-2-3" region on the low E-string.

As also shown in FIG. 54, the "wing" and "1-2-3" region rows 3305 may be depicted with the notes identified by the wings and the and the "1-2-3" region. That is, the "wing" and "1-2-3" region rows 3305 displays the notes at the identifying positions of the wings (i.e., the end points of each of the wings) and the "1-2-3" region. Thus, as shown in FIG. 54, in the "wing" and "1-2-3" region rows 3305, the wings are identified with E and G (for the left wings or first wings) or A and C (for the right wings or second wings). Additionally, as shown in FIG. 54, the positions of the "1-2-3" region are identified by their respective notes in the "wing" and "1-2-3" region rows 3305. Thus, as shown in FIG. 54, the positions of the "1-2-3" region are identified by C, D, and E.

As shown in FIG. 54, the "1" position identifies the same note as the note identified by the second end (or right end) of the second (or right) wing. That is, the "1" position identifies a C note (in the key of C) and the second end (or right end) of the second (or right) wing also identifies a C note (in the key of C). Likewise, the "3" position identifies the same note as the note identified by the first end (or left end) of the first (or left) wing. Thus, as shown in FIG. 54, the "3" position identifies an E note (in the key of C) and the first end (or left end) of the first (or left) wing also identifies an E note (in the key of C). Additionally, the ovals of FIG. 54 reinforce that the low E-string is identical to the high E-string. In such a manner, a guitar player may use the fret/note correlation chart 2205 as a guide for the "wings" and "1-2-3" regions of the three high strings and for the low E-string.

Figure 55:
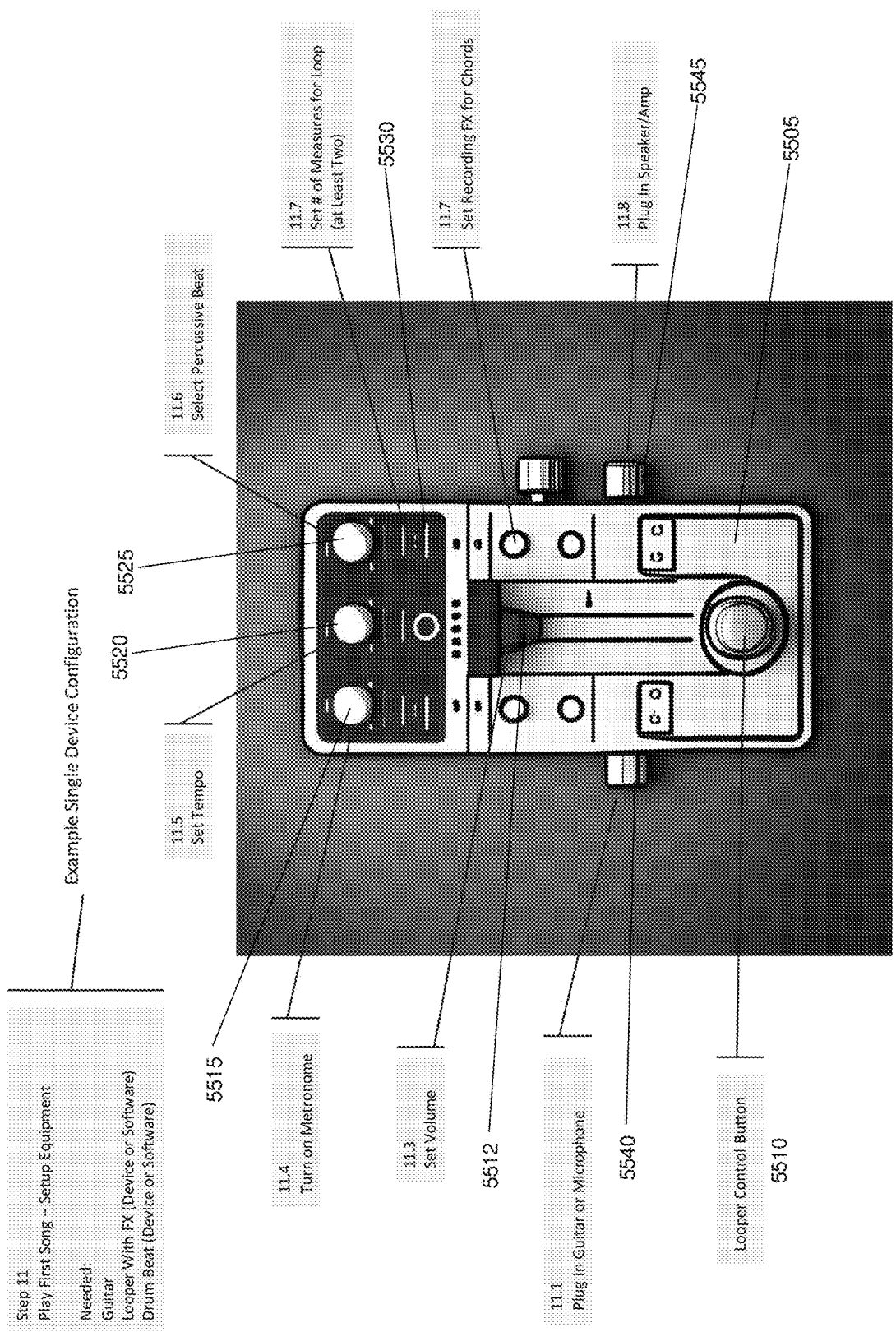
FIGS. 55 and 56 depict an exemplary device for practicing the teaching method in accordance with aspects of the disclosure.
Figure 56:
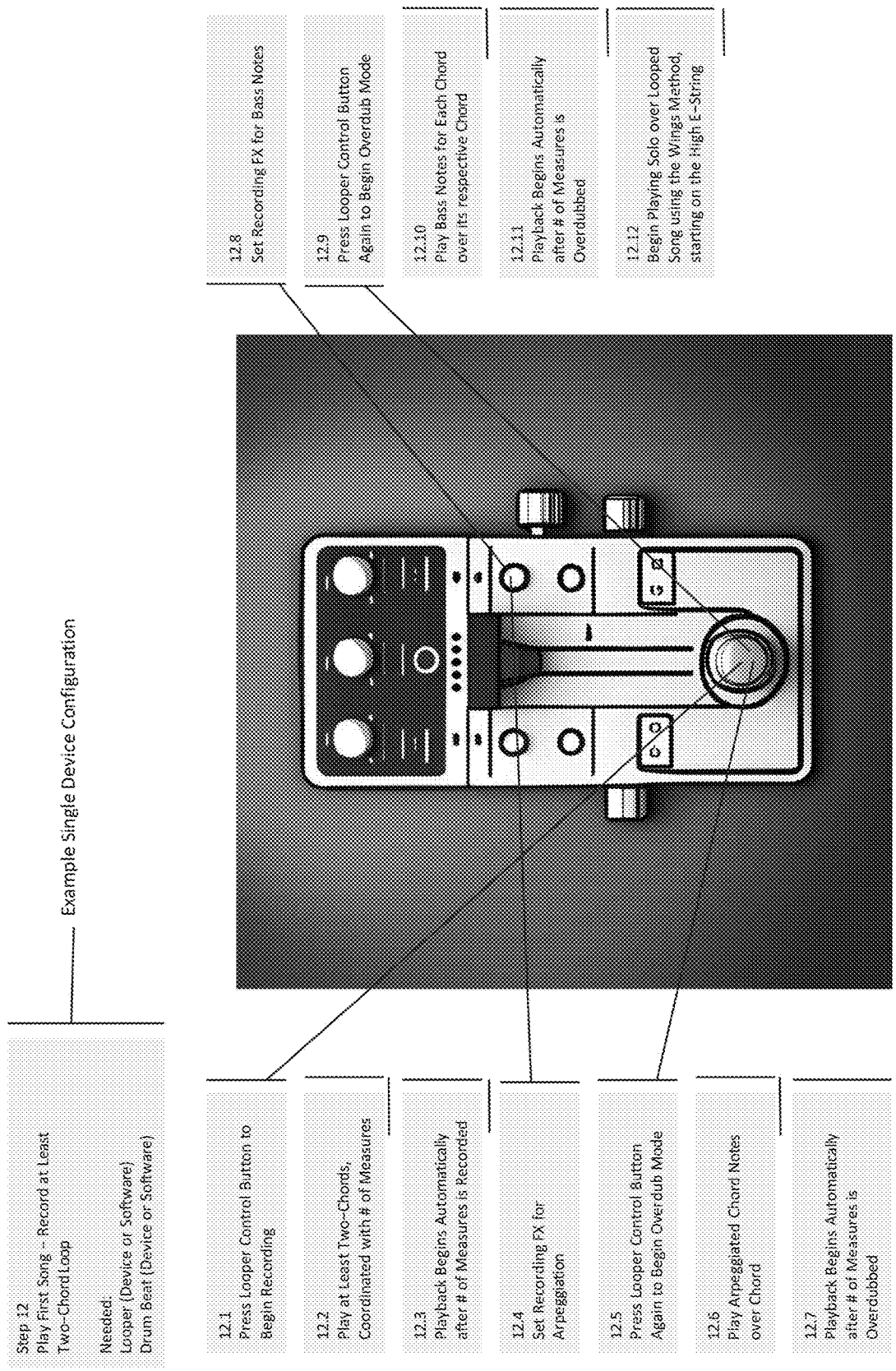

FIGS. 55 and 56 depict an exemplary teaching method and an exemplary device for practicing the teaching method in accordance with aspects of the disclosure. FIG. 55 shows an exemplary set up process for using the teaching methods of the present disclosure. As shown in FIG. 55, a guitar player may utilize a guitar, a looping device (or looper), for example, with on-board special effects, and a drum beat device. In embodiments, the looping device may be embodied as an effects device (e.g., an effects pedal or stomp box) or may be embodied as software used on a computer processing device. Likewise, the drum beat may be embodied as an effects device (e.g., an effects pedal or stomp box) or may be embodied as software used on a computer processing device. In embodiments, the drum beat device may be included in the looping device.

As shown in FIG. 55, an exemplary looping device 5505 includes a control button 5510 for actuating a looping function of the looping device 5505 and a volume adjustor (e.g., a slider) 5512 operable to adjust an output volume of a looped recording. Additionally, the looping device 5505 includes a metronome with an actuating switch 5515 and a tempo adjustor (e.g., a rotary knob) 5520. The exemplary looping device 5505 also includes a percussive beat selector 5525 for selecting a percussive beat from amongst a plurality of percussive beats. The looping device 5505 may also include a measures selector 5530, which is used to select a number of measures for the loop (which may be, for example, at least two measures). The looping device 5505 may also include an effects (or FX) selector 5535, which is operable to select an effect (e.g., delay or chorus) for the looped recording. As shown in FIG. 55, the looping device 5505 also includes an input jack 5540 and an output jack 5545.

With the exemplary set-up process for using the teaching methods of the present disclosure, a user may plug in a guitar (or microphone) into the input jack 5540 and set the volume using the volume adjustor 5512. Next, with the exemplary method, a user may activate the metronome using the metronome actuating switch 5515 and adjust a tempo of the metronome using the tempo adjustor (e.g., rotary knob) 5520. Next, a user can select a percussive beat using the percussive beat selector 5525. A user can set the number of measures for the loop using the measures selector 5530. A user can select an effect for the loop using the effects (or FX) selector 5535. A user may also connect a speaker or amp to the looping device 5505 via the output jack 5545.

As shown in FIG. 56, a user can press the control button 5510 to begin recording, and play at least two chords using a single finger for each chord in accordance with the teaching methodology, coordinated with # of measures. Playback Begins Automatically after # of Measures is Recorded. A user can set recording FX for arpeggiation, and press the control button 5510 again to begin overdub mode of the looper device 5500, and play, e.g., an arpeggiated chord notes over chord using an understanding of the chord construct from the teaching methodology. Playback begins automatically after # of measures is overdubbed. A user can then set recording FX for bass notes, again press the looper control button 5510 to begin overdub mode, play bass notes for each chord over its respective chord using the Wings 1-2-3 methodology. Playback begins automatically after # of measures is overdubbed. Then, a user can begin Playing Solo over Looped Song using the Wings Method, starting on the High E-String, for example.

Figure 57:
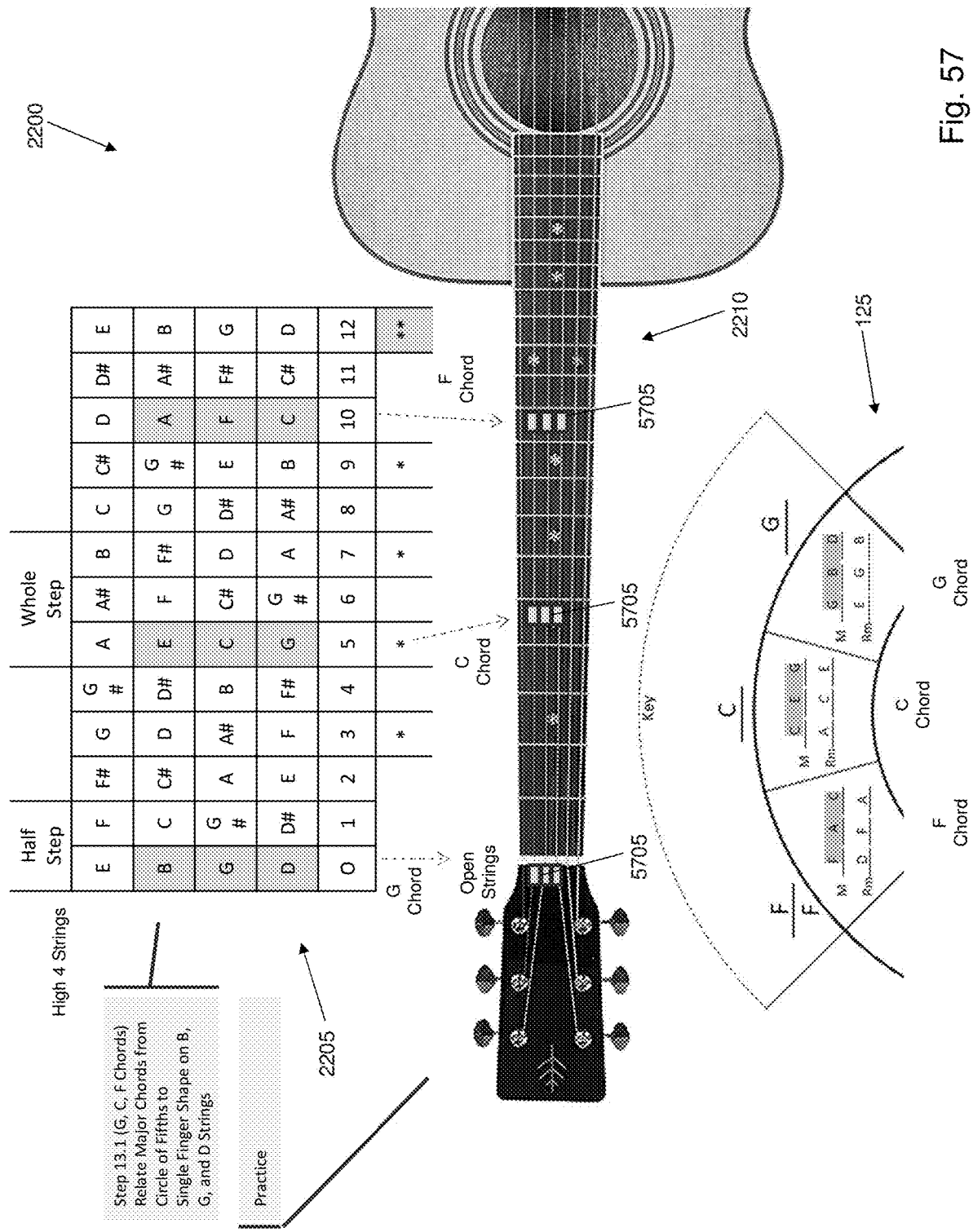
FIG. 57 shows an exemplary depiction of relating major chords from the circle of fifths to a major chord shape on the B-string, the G-String and the D-string of a guitar playable with a single finger in accordance with aspects of the disclosure.

FIG. 57 shows an exemplary depiction of relating major chords from the circle of fifths to a major chord shape on the B-string, the G-string and the D-string of a guitar playable with a single finger in accordance with aspects of the disclosure. As shown in FIG. 57, the fretboard/scale visual aid 2200 includes a portion of the circle of fifths chart 125. As shown in FIG. 57, the major chord shape 5705 is a linear shape across the B-string, the G-string and the D-string at a same fret. As the chord shape 5705 is a linear shape, a user can form this chord shape with a single finger.

Thus, with the major chord shape 5705 at the zero fret, as shown in the fret/note correlation chart 2205, the actuated notes are B, G, and D. As can be observed in FIG. 57, these notes (B, G, and D) are the major notes identified in the G chord section 145 of the circle of fifths chart 125 and form the G major chord. Thus, the fretboard/scale visual aid 2200 of FIG. 57 is operable to relate major chords from the circle of fifths to a major chord shape 5705 on the B-string, the G-string and the D-string of a guitar in accordance with aspects of the disclosure.

As also shown in FIG. 57, with the major chord shape 5705 at the fifth fret, as shown in the fret/note correlation chart 2205, the actuated notes are E, C, and G. As can be observed in FIG. 57, these notes (E, C, and G) are the major notes identified in the C chord section 145 of the circle of fifths chart 125, and form the C major chord. Furthermore, as shown in FIG. 57, with the major chord shape 5705 at the tenth fret, as shown in the fret/note correlation chart 2205, the actuated notes are A, F, and C. As can be observed in FIG. 28, these notes (A, F, and C) are the major notes identified in the F chord section 145 of the circle of fifths chart 125, and form the F major chord. Thus, in accordance with aspects of the disclosure the fretboard/scale visual aid 2200 of the present disclosure teaches the relations of minor chords from the circle of fifths to a major chord shape on the B-string, the G-string and the D-string of a guitar using a single finger.

Figure 58:
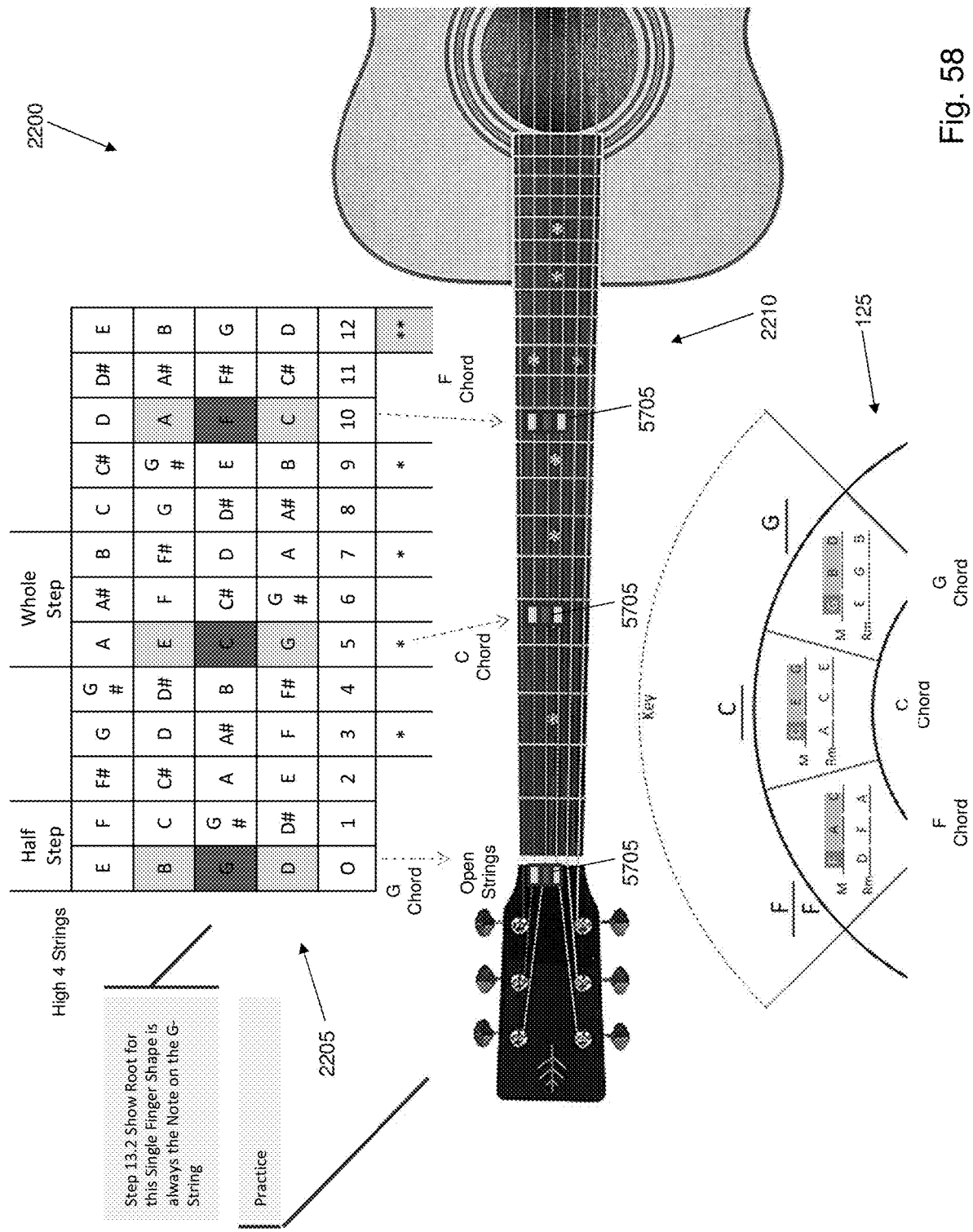
FIG. 58 shows an exemplary depiction of the relation between the root of the major chord shape and the G-string of the guitar in accordance with aspects of the disclosure.

FIG. 58 shows an exemplary depiction of the relation between the root of the major chord shape and the G-string of the guitar in accordance with aspects of the disclosure. As shown in FIG. 58, the root note for this major chord shape 5705 is always on the G-string. For example, as shown in the fret/note correlation chart 2205, with the major chord shape 5705 at the zero fret (thus actuating a G major chord), the actuated note on the G-string is a G, which is the root of the G major chord (as indicated in the G chord section 145 of the circle of fifths chart 125).

Likewise, with the major chord shape 5705 at the fifth fret (thus actuating an C major chord), as shown in the fret/note correlation chart 2205, the actuated note on the G-string is a C, which is the root of the C major chord (as indicated in C chord section 145 of the circle of fifths chart 125). Furthermore, with the major chord shape 5705 at the tenth fret (thus actuating a F major chord), as shown in the fret/note correlation chart 2205, the actuated note on the G-string is an F, which is the root of the F major chord (as indicated in the F chord section 145 of the circle of fifths chart 125).

Figure 59:
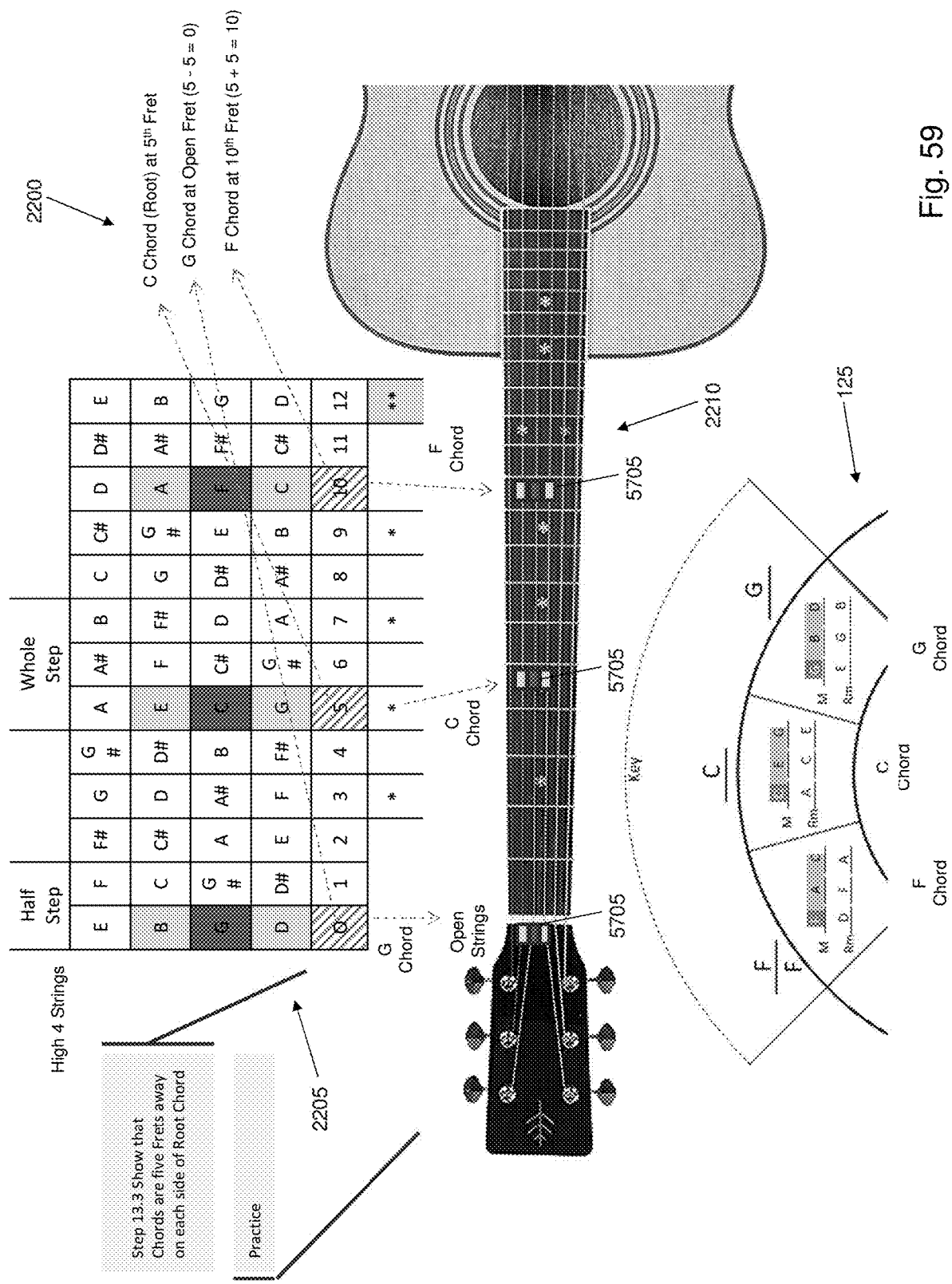
FIG. 59 shows an exemplary depiction of relations between a root chord (e.g., C chord) position using the major chord shape and positions of other chords in key using the major chord shape in accordance with aspects of the disclosure.

FIG. 59 shows an exemplary depiction of relations between a root chord (e.g., C chord) position using the major chord shape and positions of other chords in key using the major chord shape in accordance with aspects of the disclosure. As shown in FIG. 59, the other chords in key are each five frets away on each side of a root chord. That is, with the C major chord as the root chord, the other chords in key (i.e., the G chord and the F chord) are each five frets away on each side of a root chord.

Figure 60:
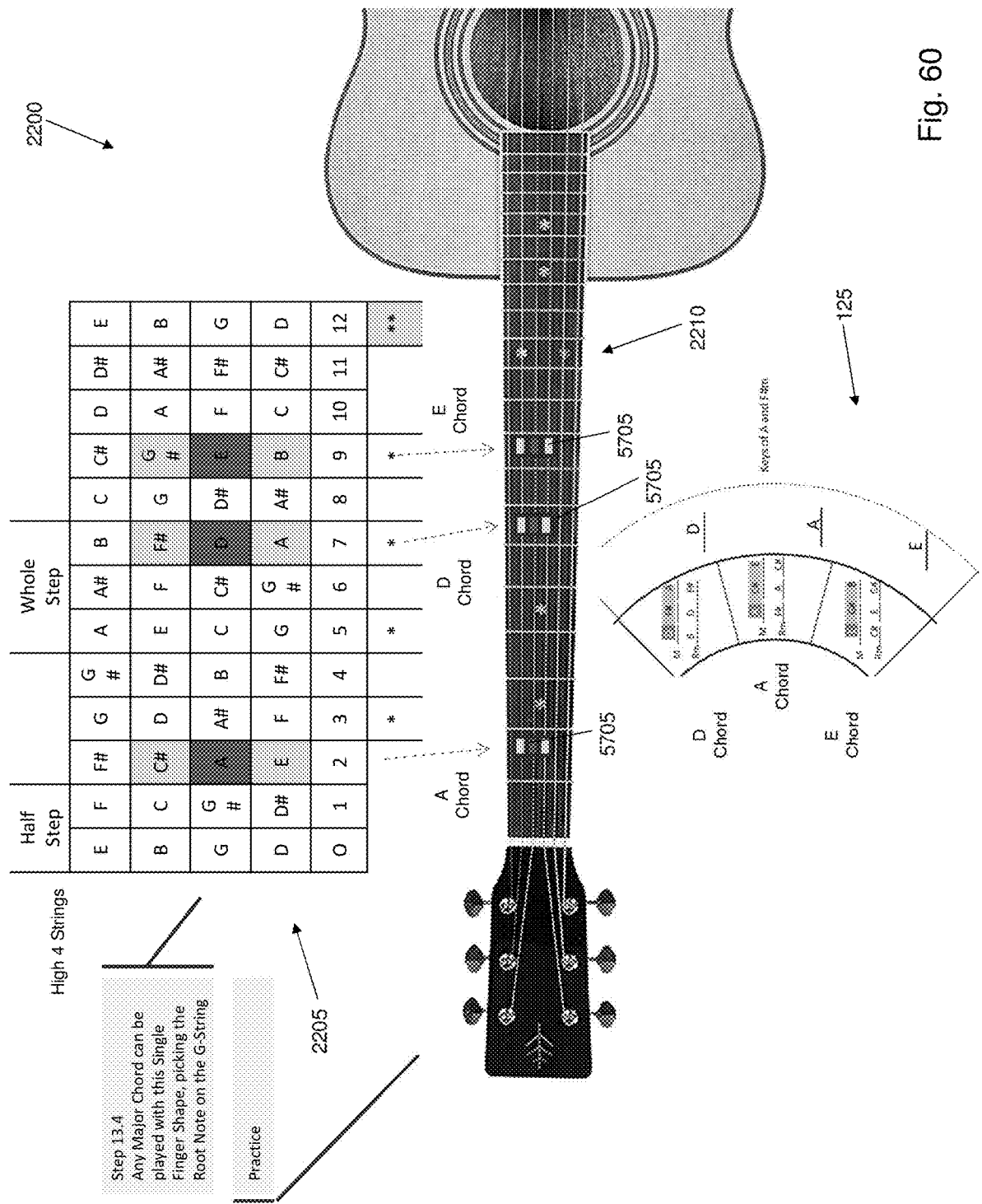
FIG. 60 shows an exemplary depiction of how the major chord shape (with its root note on the G-string) may be used to play any major chord in accordance with aspects of the disclosure.

FIG. 60 shows an exemplary depiction of how the major chord shape (with its root note on the G-string) may be used to play any major chord in accordance with aspects of the disclosure. That is, the fretboard/scale visual aid 2200 is operable to relate major chords from the circle of fifths to a major chord shape on the B-string, the G-string and the D-string of a guitar so as to play any major chord in accordance with aspects of the disclosure. Thus, with the major chord shape 5705 at the second fret, as shown in the fret/note correlation chart 2205, the actuated notes are C #, A, and E. As can be observed in FIG. 60, these notes (C #, A, and E) are the major notes identified in the A chord section 145 of the circle of fifths chart 125, and form the A major chord. Additionally, as shown in the fret/note correlation chart 2205, the actuated note on the G-string is an A, which is the root of the A major chord (as indicated in the A chord section 145 of the circle of fifths chart 125).

As a further example, with the major chord shape 5705 at the seventh fret, as shown in the fret/note correlation chart 2205, the actuated notes are F #, D, and A. As can be observed in FIG. 60, these notes (F #, D, and A) are the major notes identified in the D chord section 145 of the circle of fifths chart 125, and form the D major chord. Additionally, as shown in the fret/note correlation chart 2205, the actuated note on the G-string is a D, which is the root of the D major chord (as indicated in the D chord section 145 of the circle of fifths chart 125).

As yet a further example, with the major chord shape 5705 at the ninth fret, as shown in the fret/note correlation chart 2205, the actuated notes are G #, E, and B. As can be observed in FIG. 60, these notes (G #, E, and B) are the major notes identified in the E chord section 145 of the circle of fifths chart 125, and form the E major chord. Additionally, as shown in the fret/note correlation chart 2205, the actuated note on the G-string is an E, which is the root of the E major chord (as indicated in the E chord section 145 of the circle of fifths chart 125). Thus, in accordance with aspects of the disclosure, the fretboard/scale visual aid 2200 is operable to relate major chords from the circle of fifths to a major chord shape on the B-string, the G-string and the D-string of a guitar so as to educate a guitar player to play any major chord with a single finger in accordance with aspects of the disclosure.

Figure 61:
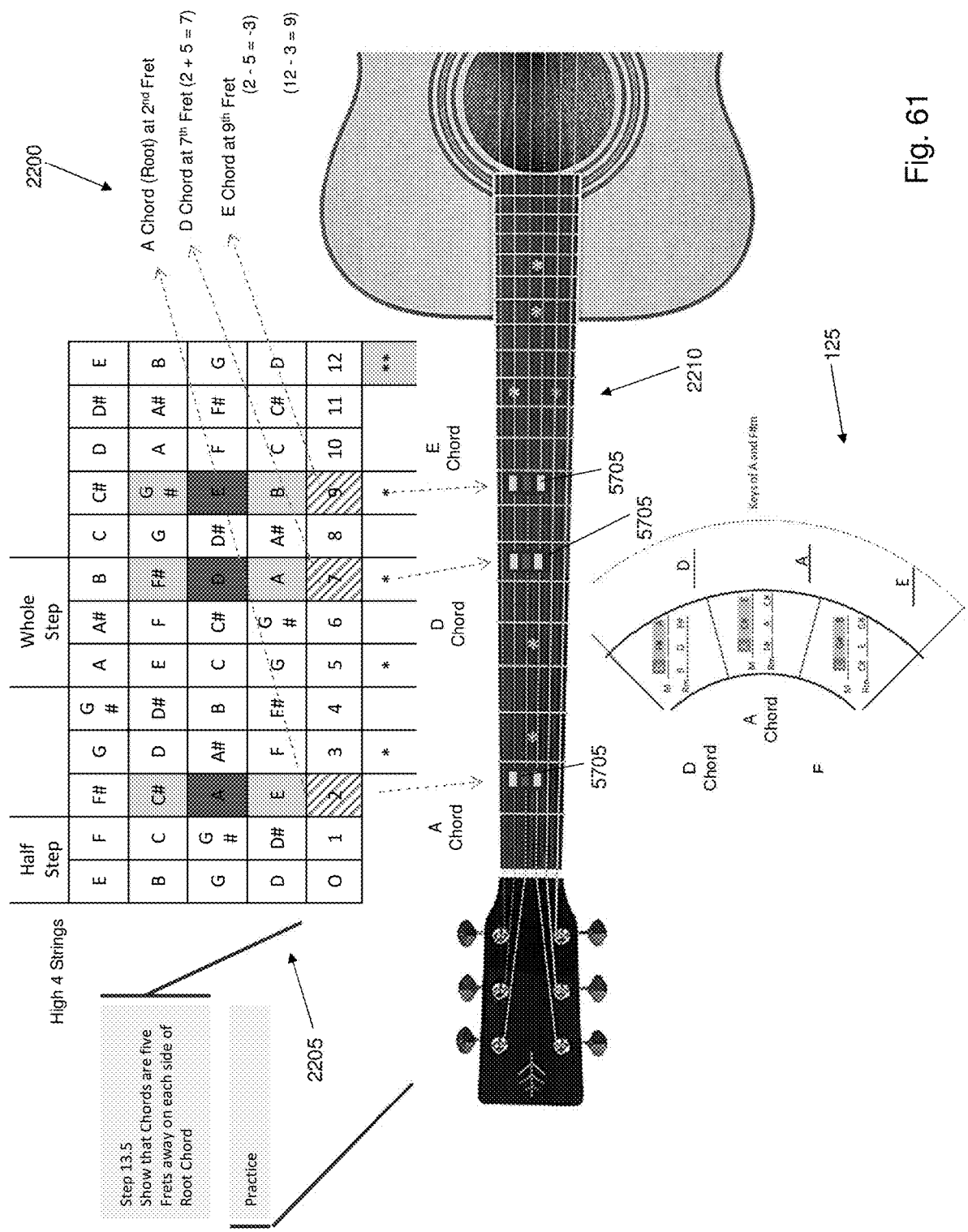
FIG. 61 shows an exemplary depiction of relations between a root chord (e.g., A chord) position using the major chord shape and positions of other chords in key using the major chord shape in accordance with aspects of the disclosure.

FIG. 61 shows an exemplary depiction of relations between a root chord (e.g., A chord) position using the major chord shape and positions of other chords in key using the major chord shape in accordance with aspects of the disclosure. As shown in FIG. 61, the other chords in key are each five frets away on each side of a root chord. That is, with the A major chord as the root chord, the other chords in key (i.e., the D chord and the E chord) are each five frets away on each side of a root chord.

Figure 62:
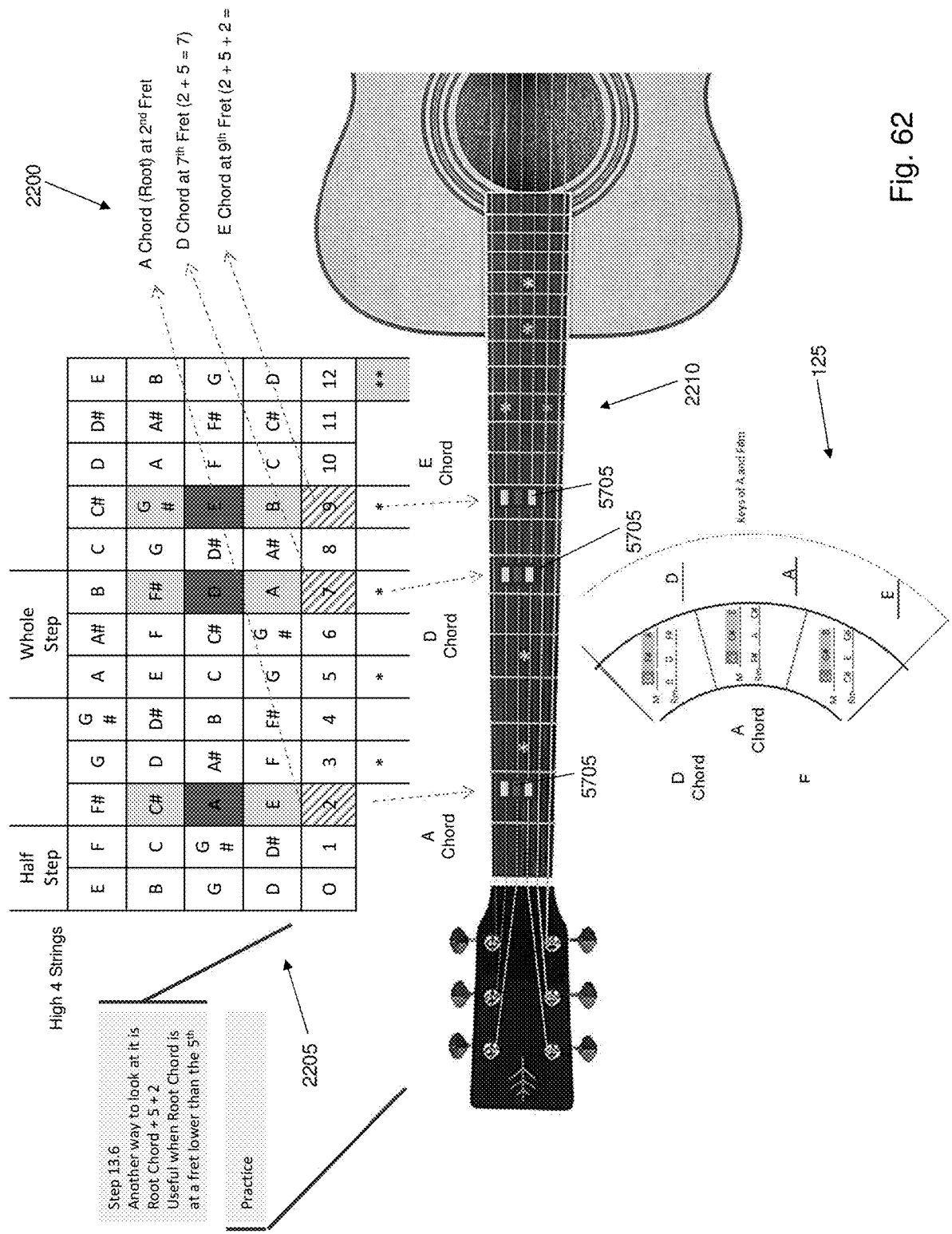
FIG. 62 shows an exemplary depiction of additional relations between a root chord (e.g., A chord) position using the major chord shape and positions of other chords in key using the major chord shape in accordance with aspects of the disclosure.

FIG. 62 shows an exemplary depiction of additional relations between a root chord (e.g., A chord) position using the major chord shape and positions of other chords in key using the major chord shape in accordance with aspects of the disclosure. As shown in FIG. 62, another way to look at it is Root Chord+5+2. That is, the one chord in key is five frets away on an upper side of a root chord, and the other chord in key is two frets further away on the upper side of the root chord. For example, with the A chord as the root chord, the D chord is five frets away on the upper side of a root chord, and the E chord is two frets further away on the upper side of the root chord. This may be useful when a root major chord is at a fret lower than the 5th fret.

FIG. 63 shows additional exemplary processes for major chords (e.g., using a multi-finger chord shape) in accordance with aspects of the disclosure. As shown in FIG. 63, a user can also practice major chords using a multi-finger major chord shape (e.g., multi-finger major chord shape 6405, see below). Thus, in accordance with aspects of the disclosure, a guitar player can also practice the multi-finger major chord shape 6405 using the fretboard/scale visual aid 2200 of the present disclosure to assist in understanding the relations of major chords from the circle of fifths to the major chord shape on the three high strings (i.e., the high E-string, the B-string, and the G-string) of the guitar.

Figure 64:
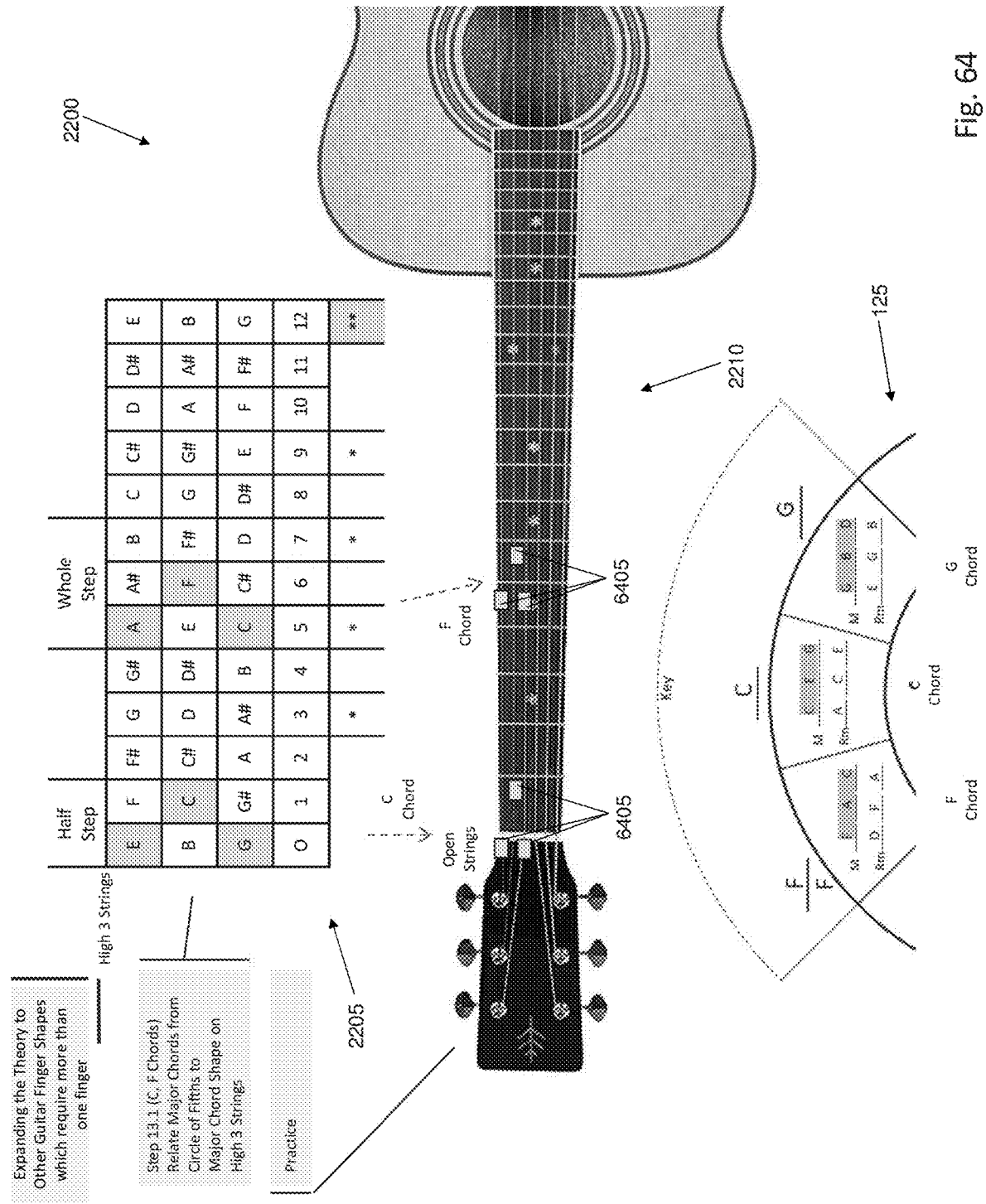
FIGS. 64 and 65 show an exemplary depiction of relating major chords from the circle of fifths to a major chord shape (e.g., a multi-finger chord shape) on the three high strings of a guitar in accordance with aspects of the disclosure.
Figure 65:
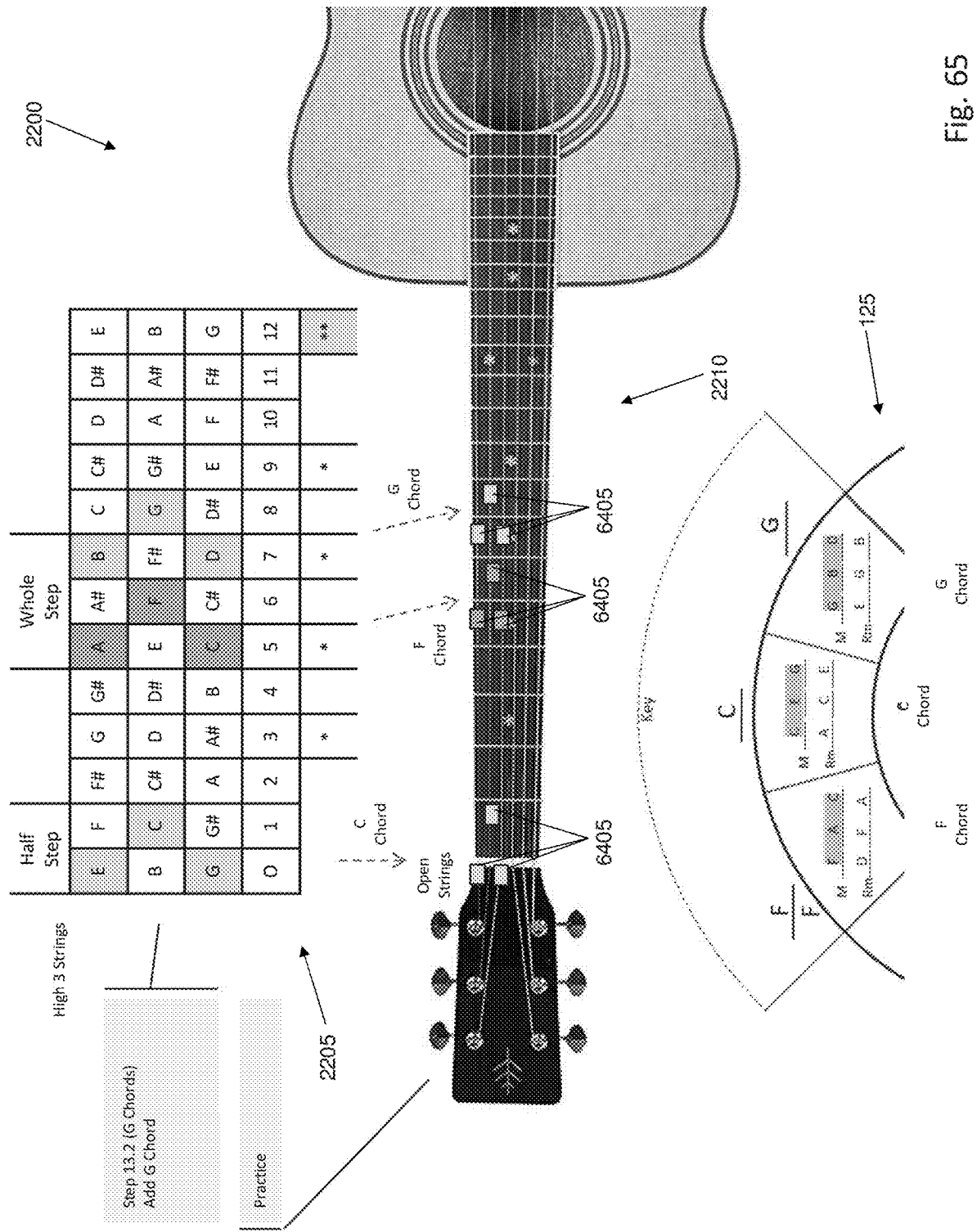
Figure 66:
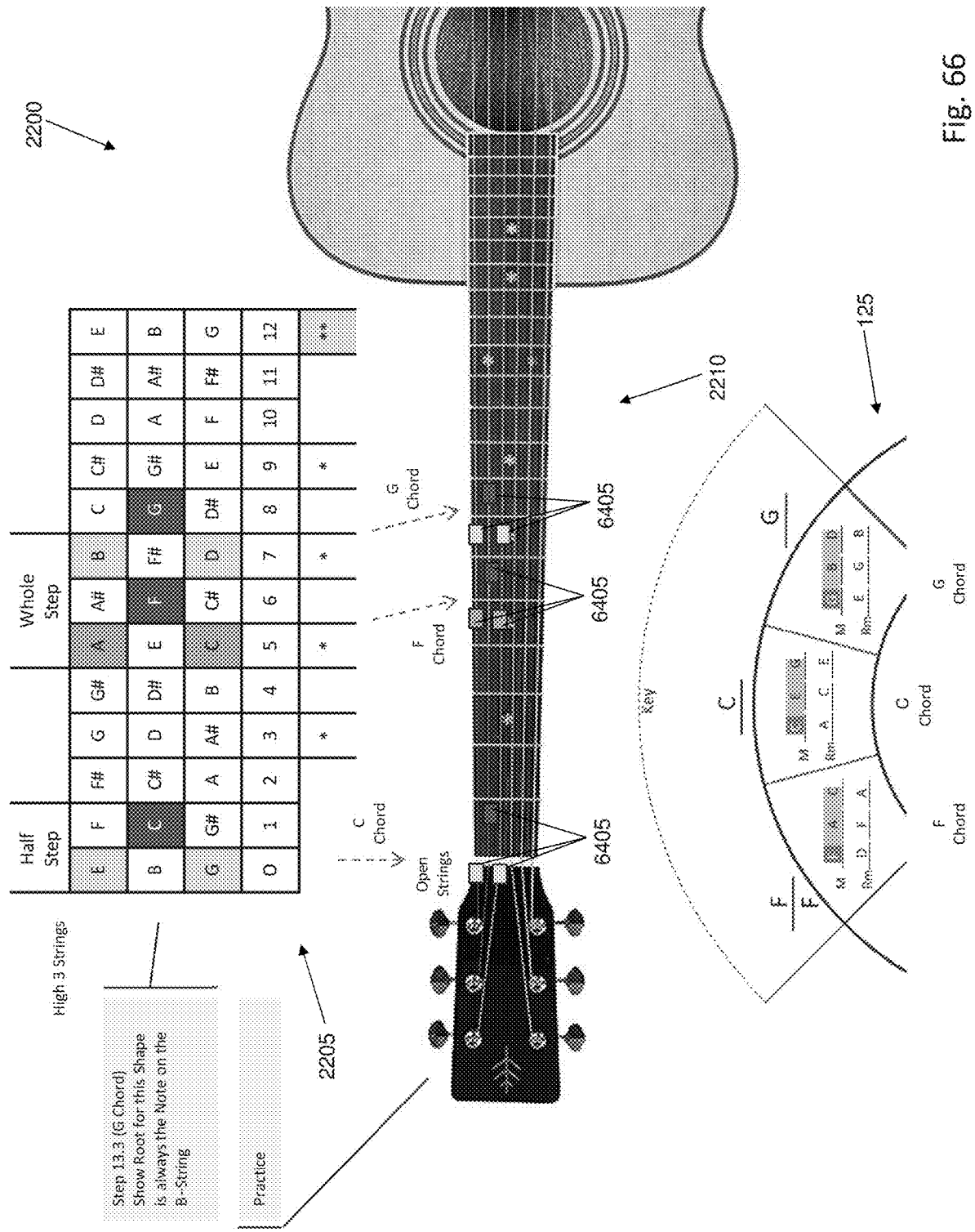
FIG. 66 shows an exemplary depiction of the relation between the root of the major chord shape and the B-string of the guitar in accordance with aspects of the disclosure.

FIGS. 64 and 65 show an exemplary depiction of relating major chords from the circle of fifths to a major chord shape on the three high strings of a guitar in accordance with aspects of the disclosure. FIG. 66 shows an exemplary depiction of the relation between the root of the major chord shape and the B-string of the guitar in accordance with aspects of the disclosure. As shown in FIG. 64, the fretboard/scale visual aid 2200 includes a portion of the circle of fifths chart 145. As shown in FIG. 64, the multi-finger major chord shape 6405 is a "triangle" or "D" shape across the three high strings with two points of the triangle on the high E-string and the G-string at the same fret and the last point of the triangle on the B-string one fret higher. Thus, with the major chord shape 6405 at the zero fret, as shown in the fret/note correlation chart 2205, the actuated notes are E, C, and G. As can be observed in FIG. 64, these notes (E, C, and G) are the major notes identified in the C chord section 145 of the circle of fifths chart 125 and form the C major chord. Thus, the fretboard/scale visual aid 2200 of FIG. 64 is operable to allow a user to relate major chords from the circle of fifths to a major chord shape on the three high strings of a guitar in accordance with aspects of the disclosure.

As also shown in FIG. 65, with the major chord shape 6405 at the fifth fret, as shown in the fret/note correlation chart 2205, the actuated notes are A, F, and C. As can be observed in FIG. 57, these notes (A, F, and C) are the major notes identified in the F chord section 145 of the circle of fifths chart 125, and form the F major chord.

As shown in FIG. 65, with the major chord shape 6405 at the seventh fret, as shown in the fret/note correlation chart 2205, the actuated notes are B, G, and D. As can be observed in FIG. 65, these notes (B, G, and D) are the major notes identified in the G chord section 145 of the circle of fifths chart 125, and form the G major chord. Thus, in accordance with aspects of the disclosure, the fretboard/scale visual aid 2200 of the present disclosure teaches the relations of major chords from the circle of fifths to a major chord shape on the three high strings of a guitar.

FIG. 66 shows an exemplary depiction of the relation between the root of the major chord shape and the B-string of the guitar in accordance with aspects of the disclosure. As shown in FIG. 66, any major chord can be played with this relatively simple and easily achievable triangle or D major chord shape 6405, picking the root note on the B-string. For example, as shown in FIG. 66, the C major chord has its root (i.e., C) on the B-string. Likewise, the F major chord has its root (i.e., F) on the B-string and the G major chord has its root (i.e., G) on the B-string. Thus, in accordance with aspects of the disclosure, a guitar player can practice the major chord shape 6405 using the fretboard/scale visual aid 2200 of the present disclosure to assist in understanding the relations of major chords from the circle of fifths to the major chord shape on the three high strings of the guitar.

Figure 67:
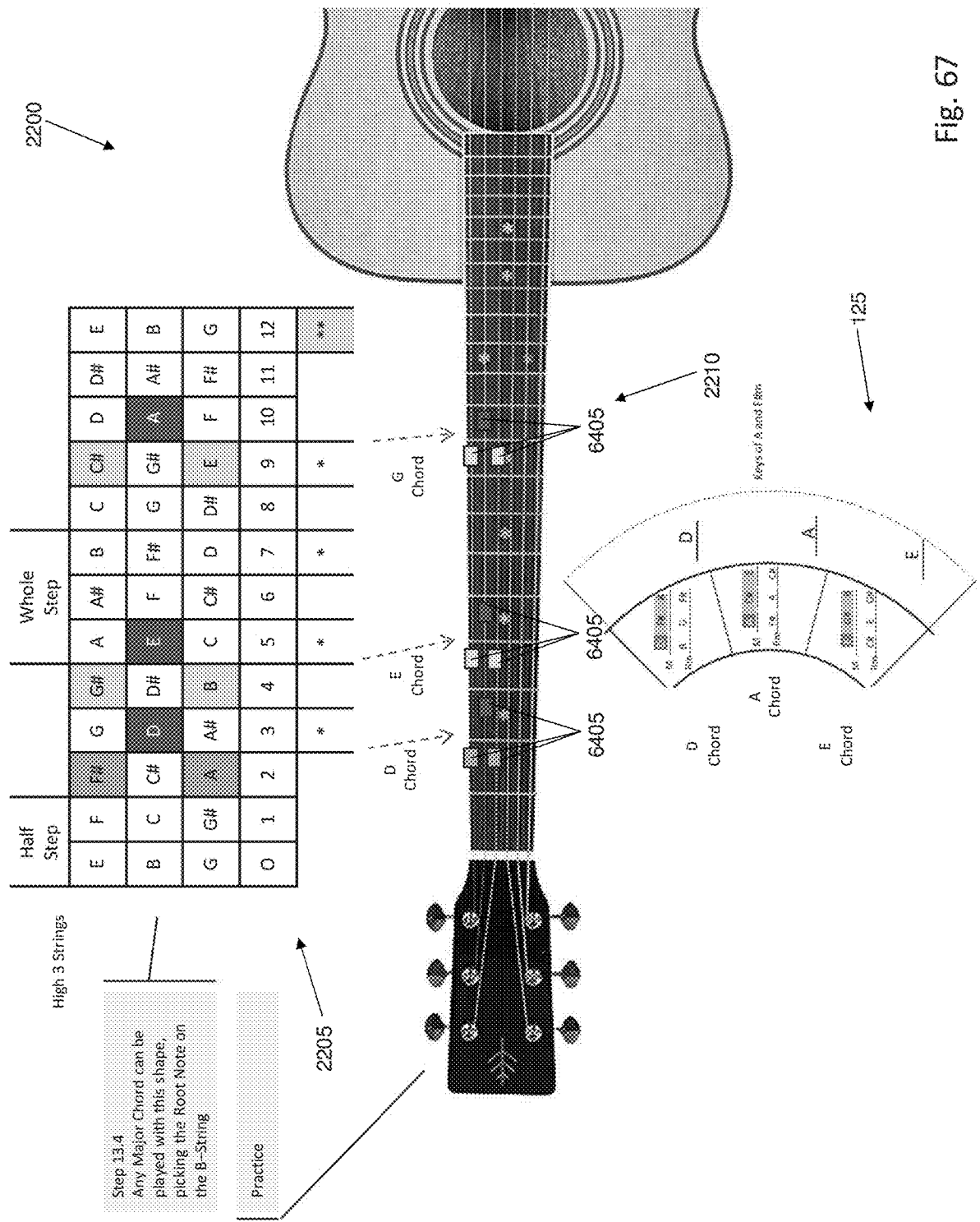
FIG. 67 shows an exemplary depiction of how the major chord shape (with its root note on the B-string) may be used to play any major chord in accordance with aspects of the disclosure.

FIG. 67 shows an exemplary depiction of how the major chord shape (with its root note on the B-string) may be used to play any major chord in accordance with aspects of the disclosure. As shown in FIG. 67, any major chord can be played with this major chord shape 6405, picking the root note on the B-string. Thus, as shown in FIG. 67, a guitar player can play a D major chord, an E major chord, or an A major chord, for example, using the major chord shape 6405. For example, with the major chord shape 6405 at the second fret, as shown in the fret/note correlation chart 2205, the actuated notes are F #, D, and A. As can be observed in FIG. 67, these notes (F #, D, and A) are the major notes identified in the D chord section 145 of the circle of fifths chart 125 and form the D major chord. Thus, the fretboard/scale visual aid 2200 of FIG. 67 is operable to allow a user to relate major chords from the circle of fifths to a major chord shape on the three high strings of a guitar in accordance with aspects of the disclosure.

As also shown in FIG. 67, with the major chord shape 6405 at the fourth fret, as shown in the fret/note correlation chart 2205, the actuated notes are G #, E, and B. As can be observed in FIG. 67, these notes (G #, E, and B) are the major notes identified in the E chord section 145 of the circle of fifths chart 125, and form the E major chord. As a further example, with the major chord shape 6405 at the ninth fret, as shown in the fret/note correlation chart 2205, the actuated notes are C #, A, and E. As can be observed in FIG. 67, these notes (C #, A, and E) are the major notes identified in the A chord section 145 of the circle of fifths chart 125, and form the A major chord.

Figure 68:
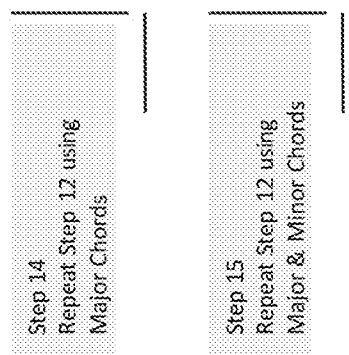
FIG. 68 shows additional exemplary processes for the major and minor chords in accordance with aspects of the disclosure.

FIG. 68 shows additional exemplary processes for the major and minor chords in accordance with aspects of the disclosure. As shown in FIG. 68, a guitar player may practice these major chords using the single-finger major chord shape 5705 and can also practice both the minor chords using the single-finger minor chord shape 2805 and the major chords using the single-finger major chord shape 5705. Thus, in accordance with aspects of the disclosure, a guitar player can practice the single-finger major chord shape 5705 and the single-finger minor chord shape 2805 using the fretboard/scale visual aid 2200 of the present disclosure to assist in understanding the relations of minor chords from the circle of fifths to the minor chord shape on the three high strings (i.e., the high E-string, the B-string, and the G-string) of the guitar and the relations of major chords from the circle of fifths to the major chord shape on the B-string, the G-string, and the E-string (or next three highest strings of the guitar). Also, a user can also practice major chords using a multi-finger major chord shape (e.g., multi-finger major chord shape 6405). Thus, in accordance with aspects of the disclosure, a guitar player can also practice the multi-finger major chord shape 6405 using the fretboard/scale visual aid 2200 of the present disclosure to assist in understanding the relations of major chords from the circle of fifths to the major chord shape on the three high strings (i.e., the high E-string, the B-string, and the G-string) of the guitar. Additionally, the user may user a looping system, for example, as shown in FIGS. 55 and 56 to practice the major chord shape 5705 and the minor chord shape 2805 in various positions on the fret board.

System Environment

Aspects of embodiments of the present disclosure (e.g., a music theory teaching system) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc. In contemplated embodiments, the control systems may be embedded in the chord board to make it stand alone. In contemplated embodiments, the chord board and control system may be virtually implemented on a touch screen.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, touch screen, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, touch screen, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, Bluetooth, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, entirely embedded within the chord board, or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 69:
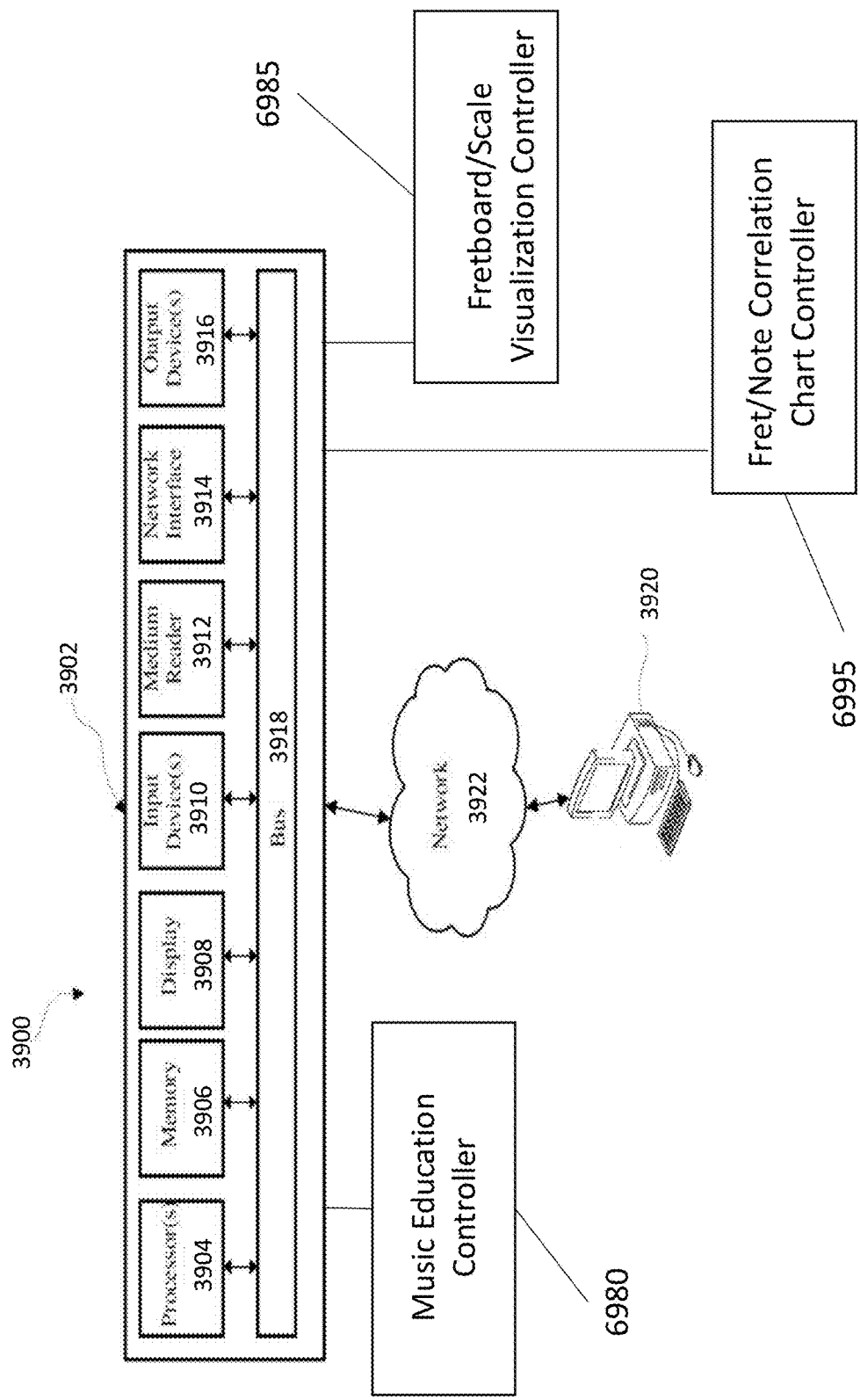
FIG. 69 shows an exemplary environment for practicing aspects of the present disclosure.

FIG. 69 shows an exemplary environment for practicing aspects of the present disclosure. The environment 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks, cloud environment or embedded within the music theory hardware device.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 69, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 69, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 69, the system 3900 may include a music education controller 6980 operable to control an interactive music education worksheet (e.g., using a touch screen of a tablet) in accordance with the present disclosure, a fretboard/scale visual aid controller 6985, and a fret/note correlation chart controller 6995.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 69. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

Although the present specification describes components and functions that may be implemented in particular embodiments with reference to particular standards and protocols (e.g., MIDI, pads), the disclosure is not limited to such standards and protocols. Such standards are periodically superseded by faster or more efficient equivalents having essentially the same functions. Accordingly, replacement standards and protocols having the same or similar functions are considered equivalents thereof.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept. For example, similar approaches may be used to fill out the worksheet for the D-string and the A-string, and derive the triad shapes on different combinations of adjacent strings (e.g., using the B-string, the G-string and the D-string, or using the G-string, the D-string, and the A-string, or using the D-string, the A-string, and the low E-string.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A system for teaching music theory implemented on a computing device having a processor, the system comprising:
a graphical user interface controlled by the processor;
a music theory teaching methodology worksheet provided on the graphical user interface, the music theory teaching methodology worksheet having:
a starting section;
a note teaching section; and
a circle of fifths chart,
wherein each of the starting section, the note teaching section, and the circle of fifths chart comprise fillable fields that are fillable by a user of the worksheet; and
guidance instructions provided on the graphical user interface overlayed over the music theory teaching methodology worksheet and/or audibly for guiding a user to fill in the fillable fields,
wherein the guidance instructions depict one or more guide lines connecting the starting section to the circle of fifths chart or one or more guide lines connecting different regions of the circle of fifths chart and/or audibly describe a relationship of the one or more guide lines connecting the starting section to the circle of fifths chart or the one or more guide lines connecting different regions of the circle of fifths chart.

2. The system of claim 1, wherein the starting section is an "F Chord" section.

3. The system of claim 1, wherein the note teaching section teaches notes of a Western music system.

4. The system of claim 1, wherein the starting section comprises four fillable fields in a single row with an additional fillable field above the right-most fillable field of the single row forming a column.

5. The system of claim 4, wherein fillable fields of the column have a distinguishing feature from a remainder of the fillable fields of the starting section.

6. The system of claim 4, wherein the starting section further comprises numerical note notation labels identifying a first, a third, and a fifth.

7. The system of claim 1, wherein the note teaching section comprises:
a 14-note row with fourteen fillable fields; and
a 12-note row with twelve fillable fields.

8. The system of claim 7, wherein a fourth fillable field and a tenth fillable field of the 14-note row have a distinguishing feature from a remainder of the fillable fields of the 14-note row.

9. The system of claim 7, wherein the note teaching section further comprises guidance information for at least one of the fillable fields to assist a user in completing the worksheet.

10. The system of claim 7, wherein the note teaching section further comprises a half-step marker and a whole-step marker.

11. The system of claim 1, wherein the circle of fifths chart comprises twelve chord sections circumferentially-arranged, with each chord section including a root note fillable field, a major notes section having three fillable fields, and a relative minor notes section having three fillable fields.

12. The system of claim 11, wherein the circle of fifths chart further comprises a chords-in-key identifier, which identifies three adjacent chord sections as a group of chords that are in a particular key.

13. The system of claim 12, wherein the chords-in-key identifier is selectively positionable around the circle of fifths chart.

14. A system for applying a music theory methodology to teaching how to play a guitar with one finger, the system implemented on a computing device having a processor, the system comprising:
a graphical user interface controlled by the processor;
a music theory teaching methodology worksheet provided on the graphical user interface,
wherein the worksheet includes a fretboard/scale visual aid operable to show relations between a fretboard of a guitar and a 12-note chromatic scale,
wherein the fretboard/scale visual aid includes:
a fret/note correlation chart; and
a guitar fretboard display having a displayed guitar, and
wherein the fret/note correlation chart comprises fillable fields that are fillable by a user of the worksheet; and
guidance instructions provided on the graphical user interface overlayed over the music theory teaching methodology worksheet and/or audibly for guiding a user to fill in the fillable fields,
wherein the guidance instructions depict one or more guide lines connecting the fret/note correlation chart to the guitar fretboard display or one or more guide lines connecting the fret/note correlation chart to a circle of fifths chart and/or audibly describe a relationship of the one or more guide lines connecting the fret/note correlation chart to the guitar fretboard display or the one or more guide lines connecting the fret/note correlation chart to a circle of fifths chart.

15. The system of claim 14, wherein the fret/note correlation chart comprises at least one note row, which includes all of the notes of the 12-note chromatic scale (and then repeats the first note) for a particular guitar string.

16. The system of claim 14, wherein the fret/note correlation chart further comprises a fret row, which includes a numerical indicator of a fret of the guitar.

17. The system of claim 14, wherein the fret/note correlation chart further comprises a half-step marker and a whole-step marker.

18. The system of claim 14, wherein the fretboard/scale visual aid further comprises at least a portion of a circle of fifths chart, and wherein the guidance instructions comprise one or more guide lines connecting the fret/note correlation chart to the circle of fifths chart.

19. The system of claim 14, wherein the guitar fretboard display further comprises at least one of a minor chord shape and a major chord shape overlaid on three strings of the displayed guitar showing how minor chords and major chords may be played on the guitar with one finger.

20. The system of claim 14, wherein the fret/note correlation chart further comprises a wing region and 1-2-3 region row, which identify wings and notes thereof and identifies notes of the 1-2-3 region, respectively.

21. The system of claim 20, wherein the fretboard/scale visual aid further includes a wings/1-2-3 range visualization, which depicts a wings region that encompasses the wings and depicts the 1-2-3 region.

22. The system of claim 21, wherein notes identified by each wing are three frets apart from each other.

23. The system of claim 21, wherein the wings are spaced apart from each other by one fret.

24. The system of claim 21, wherein notes of the 1-2-3 region include a first note, a second note, and a third note, wherein a single fret is skipped between the first note and the second note, and a single fret is skipped between the second note and third note.

25. A method for teaching music theory implemented on a computing device having a processor, the method comprising:
   providing a music theory teaching methodology worksheet on a graphical user interface controlled by the processor, the music theory teaching methodology worksheet having:
      a starting section;
      a note teaching section; and
      a circle of fifths chart,
      wherein each of the starting section, the note teaching section, and the circle of fifths chart comprise fillable fields that are fillable by a user of the worksheet; and
   providing guidance instructions on the graphical user interface overlayed over the music theory teaching methodology worksheet and/or audibly for guiding a user to fill in the fillable fields,
   wherein the guidance instructions comprise one or more guide lines connecting the starting section to the circle of fifths chart or one or more guide lines connecting different regions of the circle of fifths chart and/or audibly describe a relationship of the one or more guide lines connecting the starting section to the circle of fifths chart or the one or more guide lines connecting different regions of the circle of fifths chart; and
   guiding a user via the guidance instructions to fill in the fillable fields of the music theory teaching methodology worksheet.

26. The method of claim 25, wherein the starting section comprises four fillable fields in a single row with an additional fillable field above the right-most fillable field of the single row forming a column.

27. The method of claim 25, wherein the note teaching section comprises:
   a 14-note row with fourteen fillable fields; and
   a 12-note row with twelve fillable fields.

28. The method of claim 25, wherein the circle of fifths chart comprises twelve chord sections circumferentially-arranged, with each chord section including a root note fillable field, a major notes section having three fillable fields, and a relative minor notes section having three fillable fields.

* * * * *